United States Patent [19]

Huang

[11] Patent Number: 5,983,162

[45] Date of Patent: Nov. 9, 1999

[54] COMPUTER IMPLEMENTED EMPIRICAL MODE DECOMPOSITION METHOD, APPARATUS AND ARTICLE OF MANUFACTURE

[75] Inventor: Norden E. Huang, Bethesda, Md.

[73] Assignee: The United States of America as represented by the Administrator of the National Aeronautics and Space Administration, Washington, D.C.

[21] Appl. No.: 08/872,586

[22] Filed: Jun. 10, 1997

Related U.S. Application Data

[60] Provisional application No. 60/023,411, Aug. 14, 1996, and provisional application No. 60/023,822, Aug. 12, 1996.

[51] Int. Cl.$^6$ ........................................... G06F 19/00
[52] U.S. Cl. ............................ 702/4; 702/15; 702/16
[58] Field of Search ........................... 702/3, 4, 15, 16, 702/17

[56] References Cited

U.S. PATENT DOCUMENTS

| | | | |
|---|---|---|---|
| 4,853,903 | 8/1989 | Linville, Jr. et al. | 702/17 |
| 4,860,265 | 8/1989 | Laster et al. | 702/17 |

OTHER PUBLICATIONS

Norden E. Huang and Clifford D. Leitao, "Large–Scale Gulf Stream Frontal Study Using Geos 3 Radar Altimeter Data", Journal of Geophysical Research, vol. 83, No. C9, Sep. 20, 1978.

Norden E. Huang and Steven R. Long, "An Experimental Study of the Surface Elevation Probability Distribution and Statistics of Wind–Generated Waves", J. Fluid Mech., vol. 101, pp. 179–200 (1980).

Norden E. Huang, Steven R. Long and Zhen Shen, "The Mechanism for Frequency Downshift in Nonlinear Wave Evolution", Advances in Applied Mechanics, vol. 32, pp. 59–117 (Apr., 1996).

*Primary Examiner*—Donald E. McElheny, Jr.

[57] ABSTRACT

A computer implemented physical signal analysis method is invented. This method includes two essential steps and the associated presentation techniques of the results. All the steps exist only in a computer: there are no analytic expressions resulting from the method. The first step is a computer implemented Empirical Mode Decomposition to extract a collection of Intrinsic Mode Functions (IMF) from nonlinear, nonstationary physical signals. The decomposition is based on the direct extraction of the energy associated with various intrinsic time scales in the physical signal. Expressed in the IMF's, they have well-behaved Hilbert Transforms from which instantaneous frequencies can be calculated. The second step is the Hilbert Transform. The final result is the Hilbert Spectrum. Thus, the invention can localize any event on the time as well as the frequency axis. The decomposition can also be viewed as an expansion of the data in terms of the IMF's. Then, these IMF's, based on and derived from the data, can serve as the basis of that expansion. The local energy and the instantaneous frequency derived from the IMF's through the Hilbert transform give a full energy-frequency-time distribution of the data which is designated as the Hilbert Spectrum.

59 Claims, 69 Drawing Sheets

(22 of 69 Drawing Sheet(s) Filed in Color)

EMD-IMF without intermittency option

EMD-IMF with intermittency option

Time (sec)

Time (sec)

Seismometer 400

Ocean Wave Sensor 410

Wave Sensor 420

Tidal Gauge 430

Orbital Satellite System 440

COMPUTER IMPLEMENTED EMPIRICAL MODE DECOMPOSITION METHOD, APPARATUS AND ARTICLE OF MANUFACTURE

CROSS REFERENCES TO RELATED APPLICATIONS

This application claims the benefit of priority under 35 U.S.C. §119(e) to U.S. Provisional application Ser. No. 60/023,411 filed on Aug. 14, 1996 and Ser. No. 60/023,822 filed on Aug. 12, 1996.

This invention was made by an employee of the United States Government and therefore may be used by and for the Government for governmental purposes without the payment of any royalties thereon or therefor.

COLOR DRAWING NOTIFICATION

The file of this patent contains at least one drawing executed in color. Copies of this patent with color drawing (s) will be provided by the Patent and Trademark Office upon request and payment of the necessary fee.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

This invention generally relates to a computer implemented geophysical signal analysis method and apparatus. More particularly, this invention relates to a computer implemented method and apparatus for analyzing nonlinear, nonstationary geophysical signals.

2. Description of Related Art

Analyzing geophysical signals is a difficult problem confronting many industries. These industries have harnessed various computer implemented methods to process data taken from geophysical phenomena such as earthquakes, ocean waves, tsunamis, ocean surface elevation and wind. Unfortunately, previous methods have not yielded results which are physically meaningful.

Among the difficulties is that representing geophysical processes with geophysical signals may present one or more of the following problems:

(a) The total data span is too short;

(b) The data are nonstationary; and (c) The data represent nonlinear processes.

Although problems (a)–(c) are separate issues, the first two problems are related because a data section shorter than the longest time scale of a stationary process can appear to be nonstationary. Because many geophysical events are transient, the data representative of those events are nonstationary. For example, a transient event such as an earthquake will produce nonstationary data when measured. Nevertheless, the nonstationary character of such data is ignored or the effects assumed to be negligible. This assumption may lead to inaccurate results and incorrect interpretation of the underlying physics as explained below.

A variety of techniques have been applied to nonlinear, nonstationary geophysical signals. For example, many computer implemented methods apply Fourier spectral analysis to examine the energy-frequency distribution of such signals.

Although the Fourier transform that is applied by these computer implemented methods is valid under extremely general conditions, there are some crucial restrictions: the system must be linear, and the data must be strictly periodic or stationary. If these conditions are not met, then the resulting spectrum will not make sense physically.

A common technique for meeting the linearity condition is to approximate the geophysical phenomena with at least one linear system. Although linear approximation is an adequate solution for some applications, many physical phenomena are highly nonlinear and do not admit a reasonably accurate linear approximation.

Furthermore, imperfect probes/sensors and numerical schemes may contaminate data representative of the phenomenon. For example, the interactions of imperfect probes with a perfect linear system can make the final data nonlinear.

Many recorded geophysical signals are of finite duration, nonstationary, and nonlinear because they are derived from geophysical processes that are nonlinear either intrinsically or through interactions with imperfect probes or numerical schemes. Under these conditions, computer implemented methods which apply Fourier spectral analysis are of limited use. For lack of alternatives, however, such methods still apply Fourier spectral analysis to process such data.

In summary, the indiscriminate use of Fourier spectral analysis in these methods and the adoption of the stationary and linear assumptions may give misleading results some of which are described below.

First, the Fourier spectrum defines uniform harmonic components globally. Therefore, the Fourier spectrum needs many additional harmonic components to simulate nonstationary data that are nonuniform globally. As a result, energy is spread over a wide frequency range. For example, using a delta function to represent the flash of light from a lightning bolt will give a phase-locked wide white Fourier spectrum. Here, many Fourier components are added to simulate the nonstationary nature of the data in the time domain, but their existence diverts energy to a much wider frequency domain. Constrained by the conservation of energy principle, these spurious harmonics and the wide frequency spectrum cannot faithfully represent the true energy density of the lighting in the frequency and time space.

More seriously, the Fourier representation also requires the existence of negative light intensity so that the components can cancel out one another to give the final delta function. Thus, the Fourier components might make mathematical sense, but they often do not make physical sense when applied.

Although no physical process can be represented exactly by a delta function, some geophysical data such as the near field strong earthquake energy signals are of extremely short duration. Such earthquake energy signals almost approach a delta function, and they always give artificially wide Fourier spectra.

Second, Fourier spectral analysis uses a linear superposition of trigonometric functions to represent the data. Therefore, additional harmonic components are required to simulate deformed wave profiles. Such deformations, as will be shown later, are the direct consequence of nonlinear effects. Whenever the form of the data deviates from a pure sine or cosine function, the Fourier spectrum will contain harmonics. Furthermore, both nonstationarity and nonlinearity can induce spurious harmonic components that cause unwanted energy spreading and artificial frequency smearing in the Fourier spectrum. The consequence is incorrect interpretation of physical phenomenon due to the misleading energy-frequency distribution for nonlinear and nonstationary data representing the physical phenomenon.

Below are several types of nonlinear, nonstationary geophysical signals which are very difficult to analyze with traditional computer implemented techniques. The invention presented herein, however, is particularly well-suited to processing such geophysical signals with a computer.

Earthquake Signals

Earthquakes are typically recorded by seismometers such as the seismometer 400 which may be implemented with the Ranger seismometer manufactured by kinemetrics Model WR-1 Wide-Band shown in FIG. 21 which records ground accelerations to produce a signal representative of the earthquake.

Fortunately, all earthquakes are transient lasting only a few tenths to a few seconds at most; consequently, earthquake signals are nonstationary. Most earthquake signals are still processed with various computer implemented methods that apply algorithms based on Fourier analysis (Hu, et al. *Earthquake Engineering*, Chapman & Hall, London, 1996). Such earthquake signals are processed to better understand, for example, crust structure geophysics, near field earthquakes and site specific ground motions.

Crust structure geophysics is a term for the geophysical structure of the earth which includes the crust and inner core. Due to the different geophysical properties of the local crust material, the earthquake signal can be used to determine the mode of earthquake wave propagation, their dispersion characteristics, and the free oscillations. These properties can be used to infer the structure of the crust, and the elastic properties and density of the crust medium through which the wave propagated.

Most seismologists are interested in the earthquake signals to infer the geophysical properties of the earth as explained above. Earthquake engineers, however, are interested in the destructive power of the earthquakes. Therefore, the seismologists prefer sampling the earthquake signal from a long distance, up to thousand of miles say, to infer the geophysical properties of the crust along the path of wave propagation. On the other hand, earthquake engineers are most interested in the immediate neighborhood of the earthquake epicenter (near field earthquakes), within a few kilometers say, where the destruction would be the most severe.

For any given earthquake, the ground response is site specific and depends on the following factors: (1) nature of the earthquake (whether it is a shear or a thrust), (2) the propagation path, (3) the local ground geo-engineering properties (whether it is rock or sediment), and (4) the local topographic geometry (e.g., whether in a valley or on the top of a hill). These factors influence the severity of the ground motion from a given earthquake at specific locations.

Conventional methods, however, cannot reveal detailed information in the dispersion properties, the wave form deformation, and the energy-frequency distribution of earthquakes because the data representing the earthquake is nonlinear and nonstationary. Revealing this information is necessary to correctly understand crust structure geophysics and to accurately deduce site specific ground motions.

Furthermore, most near field strong earthquake ground motions are nonstationary because of their extremely short duration. Seismic records representing such earthquakes always give artificially wide Fourier spectra because of this nonstationarity. This wide frequency distribution will dilute the energy content everywhere on the frequency axis and distort the true energy-frequency distribution. The result is that the energy density at critical resonant frequencies for specific building structures will be underestimated. The rule of thumb for the resonant frequency is given as $1/(0.1N)$ cycle per second, where N is the number of the stories of the building. Therefore, for a ten-story building, the resonant frequency is near 1 Hz. For high-rises, the frequency will be even lower.

For example, the seismic record of the El Centro earthquake is shown in FIG. 10($a$). The corresponding Fourier spectrum for the El Centro earthquake is illustrated in FIGS. 12($a$) and 12($b$). The Fourier spectrum shows a conspicuous lack of energy in the low frequency range (less than 1 Hz), as shown in the detailed spectra covering only 0 to 5 Hz frequency range in FIG. 12($b$). The low frequency range, which is critical to analyzing the effects on the high rise structures, is severely under-represented.

This peakiness of energy located at a very narrow frequency range can cause resonance oscillation of buildings, and has been observed at Mexico City during the 1985 earthquake to have caused great destruction.

The oscillation could not be duplicated by any linear model. Therefore, computer implemented Fourier analysis methods are not appropriate for analyzing earthquake signals.

Although earthquake wave motion has been approximated as a linear process, the strong ground motion may not be linear. This nonlinearity is revealed by the distorted wave forms in the data (Newmark and Rosenblueth, *Fundamentals of Earthquake Engineering*, Prentice Hall, Englewood Cliffs, N.J, 1971). The rich higher harmonics, a typical consequence of Fourier analysis when applied to nonlinearly deformed signals, have also contributed to clouding the characteristics of the real signal and the dynamics of the underlying physical systems.

Furthermore, to apply Fourier analysis, some kind of window should be used to eliminate the end effects and to facilitate the computer implemented computations. For a truly nonstationary process, there is no time scale to guide the choice of the window size. A long time window (eg. 10 seconds) is necessary for resolving low frequencies (near 0.1 Hz) that are critical for analyzing the resonant effects on modern high-rise structures. Too long a window, however, will be plagued by nonstationarity. In other words, within a short window the data may look stationary locally. But the short window will have very poor frequency resolution, for the frequency resolution in Hz is given by $1/T$, where T is the window length. Such difficulties have never been fully resolved by applying Fourier spectral analysis to earthquake signals.

As explained above, both nonstationarity and nonlinearity can induce artificial frequency smearing and obscure the true energy density picture and the underlying physics of the system being studied.

Water Wave Signals

The dynamics of ocean waves are measured from ocean sensors located at field stations such as the ocean wave sensor 410 which may be implemented by using the NDBC 3m discus ocean wave sensor illustrated in FIG. 22 which records an ocean wave signal representing ocean surface elevation as a function of time. As example of an ocean wave signal is shown in FIG. 13($a$). Ocean waves are studied for ship design, ship routing, coastal and off-shore structure design, harbor operations, and even weather forecasting.

Ocean wave signals are typically random and nearly nonstationary. In the past, ocean wave signals were analyzed by applying computer implemented Fourier analysis. In fact, the studies of the wave spectra from Fourier analysis have been a main subject of ocean wave research (see, for example, Huang, et al., 1990a, Wave Spectra, *The Sea*, 9, 197–237).

Traditional computer implemented analysis methods, however, are not well suited to studying ocean wave signals because ocean waves are typically nonlinear and nonstationary. For example, the corresponding Wavelet spectrum for ocean wave signals which is generated by applying a Morlet Wavelet transform to the ocean wave signals of FIG. 13(a) is shown in FIG. 14(b). The Wavelet spectrum gives a nearly continuous distribution, and wide spread of energy consisting primarily of harmonics in the frequency axis. This energy spread is due to the nonlinear and nonstationary character of ocean waves. This energy spread also contributes to the difficulty in analyzing the results of traditional computer implemented techniques applying the Wavelet transform.

Water wave signals detected from mechanically generated water waves by a wave sensor 420 as shown in FIG. 23 have been studied to analyze nonlinear water wave evolution processes (eg. Huang, et al., The Mechanism for Frequency Downshift in Nonlinear Wave Evolution, Advances in Applied Mechanics, Vol. 32, pp. 59–117 1996).

Due to weak nonlinear interactions, the frequency of the water waves will downshift as they propagate, a process necessary for the waves to become longer and grow higher under the wind.

In the narrow-band wave field, the downshift has been shown as the consequence of the Benjamin-Fier instability (Benjamin and Fier, The Disintegration of Wavetrains on Deep Water, Part I, Theory, J. Fluid Mech., 27, 417–430, 1967). Although water wave evolution is generally assumed to be gradual and continuous, several authors have theorized that the evolution is not continuous and gradual, but local and discrete.

The resolution power of previous data analysis techniques, however, has rendered proof of this theory nearly impossible. As explained above, known computer implemented data analysis techniques which apply Fourier analysis are incapable of accurately interpreting nonlinear, nonstationary processes such as water wave propagation and evolution.

Tsunami Signals

Tsunamis are detected with tidal gauges such as the tidal gauge 430 shown in FIG. 24 which record water elevation as a function of time. An example of a tsunami signal, which necessarily includes a tidal signal, is shown in FIG. 16(a).

Although tidal signals are generally stationary, tsunami waves are transient, nonlinear and nonstationary. Tidal gauges necessarily measure both the tide and the tsunami. The combined signal, therefore, is nonstationary and nonlinear.

Filtering cannot remove the tsunami signal cleanly because the tsunami signals and the tidal signals usually have many harmonic components in the same frequency range. Therefore, tsunami signals and combined tsunami-tidal signals lack an effective computer implemented data analysis method which is able to handle the nonlinear and nonstationary character of the data representative of these geophysical processes.

Ocean Altitude and Ocean Circulation

Satellite altimetry is a powerful technique for large scale ocean circulation studies (Huang, et al. 1978, "Ocean Surface Measurement Using Elevation From GEOS-3 Altimeter", J. Geophys. Res., 83, 4,673–4,682; Robinson, et al., 1983, "A Study of the Variability of Ocean Currents in the Northwestern Atlantic Using Satellite Altimetry", J. Phys. Oceanogr., 13, 565–585). An orbital satellite system 440 as shown in FIG. 25 can produce extremely accurate data representing the altitude of the ocean surface.

The accepted view of the equatorial dynamics is the propagation of Kelvin waves forced by variable wind stress (Byod, 1980, "The Nonlinear Equatorial Kelvin Waves", J. Phys. Oceanogr., 10, 1–11 and Zheng, et al., 1995, "Observation of Equatorially Trapped Waves in the Pacific Using Geosat Altimeter Data", Deep-Sea Res., (in press). In this model, the wave propagation will leave a surface elevation signature of the order of 10 cm, which can be measured by the satellite altimeter 440.

Because of the importance of the equatorial region in determining the global climate pattern, altimeter data have been used extensively to study the dynamics of this region (Miller, et al., 1988, "GEOSAT Altimeter Observation of Kelvin Waves and the 1986–1987 El Niño" Science, 239, 52–54; Miller, et al., 1990, "Large-Scale Meridional Transport in the Tropic Pacific Ocean During the 1986–87 El Niño from GEOSAT", J. Geophys. Res. 95, 17,905–17,919. ; Zheng, et al., 1994, "The Effects of Shear Flow on Propagation of Rossby Waves in the Equatorial Oceans", J. Phys. Oceanogr., 24, 1680–1686 and Zheng, et al., 1995, "Observation of Equatorially Trapped Waves in the Pacific Using Geosat Altimeter Data", Deep-Sea Res., (in press)). A typical time series on the Equator sea surface elevation data at 174° East longitude is shown in FIG. 19(a).

Limited by the data length and complicated by ocean dynamics, all the past investigators have faced serious problems in processing this nonstationary altimeter data. Therefore, weather forecasting which accurately accounts for ocean effects has been impossible with traditional computer implemented data analysis methods.

According to the above background, the state of the art does not provide a useful computer implemented tool for analyzing nonlinear, nonstationary data such as geophysical signals.

SUMMARY OF THE INVENTION

The invention employs a computer implemented Empirical Mode Decomposition method which decomposes physical signals representative of a physical phenomenon into components. These components are designated as Intrinsic Mode Functions (IMFs) and are indicative of intrinsic oscillatory modes in the physical phenomenon.

Contrary to almost all the previous methods, this new computer implemented method is intuitive, direct, a posteriori, and adaptive, with the basis of the decomposition based on and derived from the physical signal. The bases so derived have no close analytic expressions, and they can only be numerically approximated in a specially programmed computer by utilizing the inventive methods disclosed herein.

More specifically, the general method of the invention includes two main components or steps to analyze the physical signal without suffering the problems associated with computer implemented Fourier analysis, namely inaccurate interpretation of the underlying physics caused in part by energy spreading and frequency smearing in the Fourier spectrum. The first step is to process the data with the Empirical Mode Decomposition (EMD) method, with which the data are decomposed into a number of Intrinsic Mode Function (IMF) components. In this way, the signal will be expanded by using a basis that is adaptively derived from the signal itself.

The second step of the general method of the present invention is to apply the Hilbert Transform to the decomposed IMF's and construct an energy-frequency-time distribution, designated as the Hilbert Spectrum, from which occurrence of physical events at corresponding times (time localities) will be preserved. There is also no close analytic form for the Hilbert Spectrum. As explained below, the invention avoids this problem by storing numerical approximations in the specially programmed computer by utilizing the inventive method.

The invention also utilizes instantaneous frequency and energy to analyze the physical phenomenon rather than the global frequency and energy utilized by computer implemented Fourier spectral analysis.

Furthermore, a computer implementing the invention, e.g., via executing a program in software, to decompose physical signals into intrinsic mode functions with EMD and generate a Hilbert spectrum is also disclosed. Because of the lack of close form analytic expression of either the basis functions and the final Hilbert spectrum; computer implementation of the inventive methods is an important part of the overall method.

Still further, the invention may take the form of an article of manufacture. More specifically, the article of manufacture is a computer-usable medium, including a computer-readable program code embodied therein wherein the computer-readable code causes a computer to execute the inventive method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Furthermore, all the mathematic expressions are used as a short hand to express the inventive ideas clearly and are not limitative of the claimed invention.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1A:
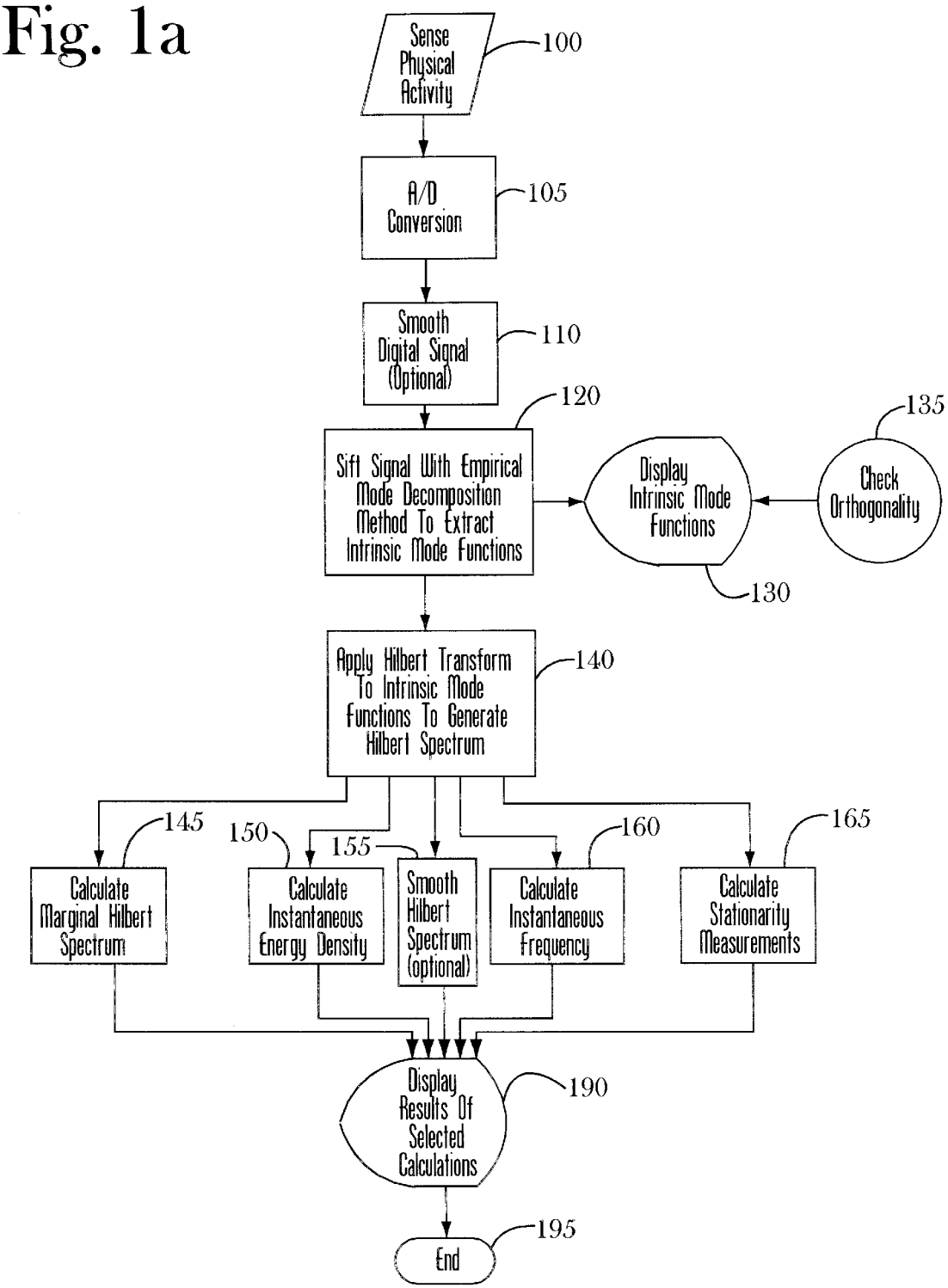
FIG. 1(a) is a high-level flowchart describing the overall inventive method which may be implemented on the computer system shown in FIG. 2.

Before describing the computer implemented Empirical Mode Decomposition method in detail, the definition and physical meaning of intrinsic mode functions will be discussed.

Intrinsic Mode Function

A Intrinsic Mode Function (IMF) is a function that satisfies the following two conditions:

(a) in the whole data set, the number of extrema and the number of zero-crossings must either be equal or differ at most by one, and (b) at any point, the mean value of the envelope defined by the local maxima and the envelope defined by the local minima is zero.

The first condition shares some similarity to the traditional narrow band requirements for a stationary Gaussian process. The second condition is a totally new idea. Conceptually, the second condition modifies the classical global requirement to a local one. Furthermore, the second condition has the desirable result that the instantaneous frequency will not have unwanted fluctuations induced by asymmetric wave forms. Mathematically, the second condition should ideally be 'the local mean of the data being zero.' For nonstationary data, the 'local mean' requires a 'local time scale' to compute the mean, which is impossible to define. Fortunately, the local time scale need not be defined to fulfil the second condition, as will be discussed below.

To apply these concepts to physical data, the invention utilizes the local mean of the signal envelopes to force the local symmetry. The signal envelopes are defined by the local maxima and the local minima. This is an approximation which avoids the definition of a local averaging time scale. With the physical approach and the approximation adopted here, the inventive method does not always guarantee a perfect instantaneous frequency under all conditions. Nevertheless, it can be shown that, even under the worst conditions, the instantaneous frequency so defined is still consistent with the physics of the system being studied and represents the system being studied much more accurately than previous techniques based on Fourier analysis.

The term "Intrinsic Mode Function" is adopted because it represents the oscillation mode embedded in the data. With this definition, the IMF in each cycle, defined by the zero-crossings, involves only one mode of oscillation. In other words, each IMF represents only one group of oscillation modes or time scales and no riding waves are allowed.

Before presenting the inventive EMD method for decomposing the data into IMFs, a qualitative assessment of the intrinsic oscillatory modes may be roughly determined by simply examining the data by eye. From this examination, one can immediately identify the different scales directly in two ways: the time lapse between the successive alternations of local maxima and minima and the time lapse between the successive zero-crossings reveals the different scales. The interlaced local extrema and zero-crossings give us complicated data: one undulation is riding on top of another, and they, in turn, are riding on still other undulations, and so on. Each of these undulations defines a characteristic scale or oscillation mode that is intrinsic to the data: hence, the term "Intrinsic Mode Function" is adopted.

To reduce the data into the needed IMFs, the invention utilizes a computer implemented Empirical Mode Decomposition Method which is described below.

Empirical Mode Decomposition (EMD): The Sifting Process

First, the Empirical Mode Decomposition method which deals with both nonstationary and nonlinear data will be discussed. Then, the physical meaning of this decomposition will be presented.

The essence of the EMD method is to identify empirically the intrinsic oscillatory modes by their characteristic time scales in the data, and then decompose the data accordingly. The decomposition is based on the following assumptions:

a. the signal has at least two extrema: one maximum and one minimum, and b. the characteristic time scale is defined by the time lapse between the extrema.

In other words, the invention adopts the time lapse between successive extrema as the definition of the time scale for the intrinsic oscillatory mode because it gives a much finer resolution of the oscillatory modes and because it can be applied to data with non-zero mean (either all positive or all negative values, without zero-crossings). A systematic way to extract the intrinsic mode functions is the computer implemented Empirical Mode Decomposition method or Sifting Process which is described as follows.

FIG. 1(a) illustrates the overall inventive method including the Sifting Process in step 120. First, the physical activity, process or phenomenon is sensed by an appropriate sensor in step 100. Appropriate sensors for detecting the physical activity and generating a physical signal representative thereof are discussed in the practical examples below.

After sensing in step 100, the analog signal is converted to the digital domain suitable for computer processing in the A/D conversion step 105.

Next, an optional smoothing step 110 may be applied to the physical signal. The optional smoothing step 110 may be applied to smooth the signal with, for example, a weighted running average to remove excessive noise.

Thereafter, the Sifting Process is applied in step 120 to sift the signal with the Empirical Mode Decomposition method and thereby extract the intrinsic mode function(s). The intrinsic mode functions can then be displayed as shown in step 130 and checked for orthogonality in step 135.

Before continuing with the main flow in FIG. 1(a), the details of the Sifting Process will be explained with reference to the high level flowchart in FIGS. 2(a), 2(b) and the series of graphs showing illustrative results of the Sifting Process in FIGS. 3(a)–(f).

Figure 1B:
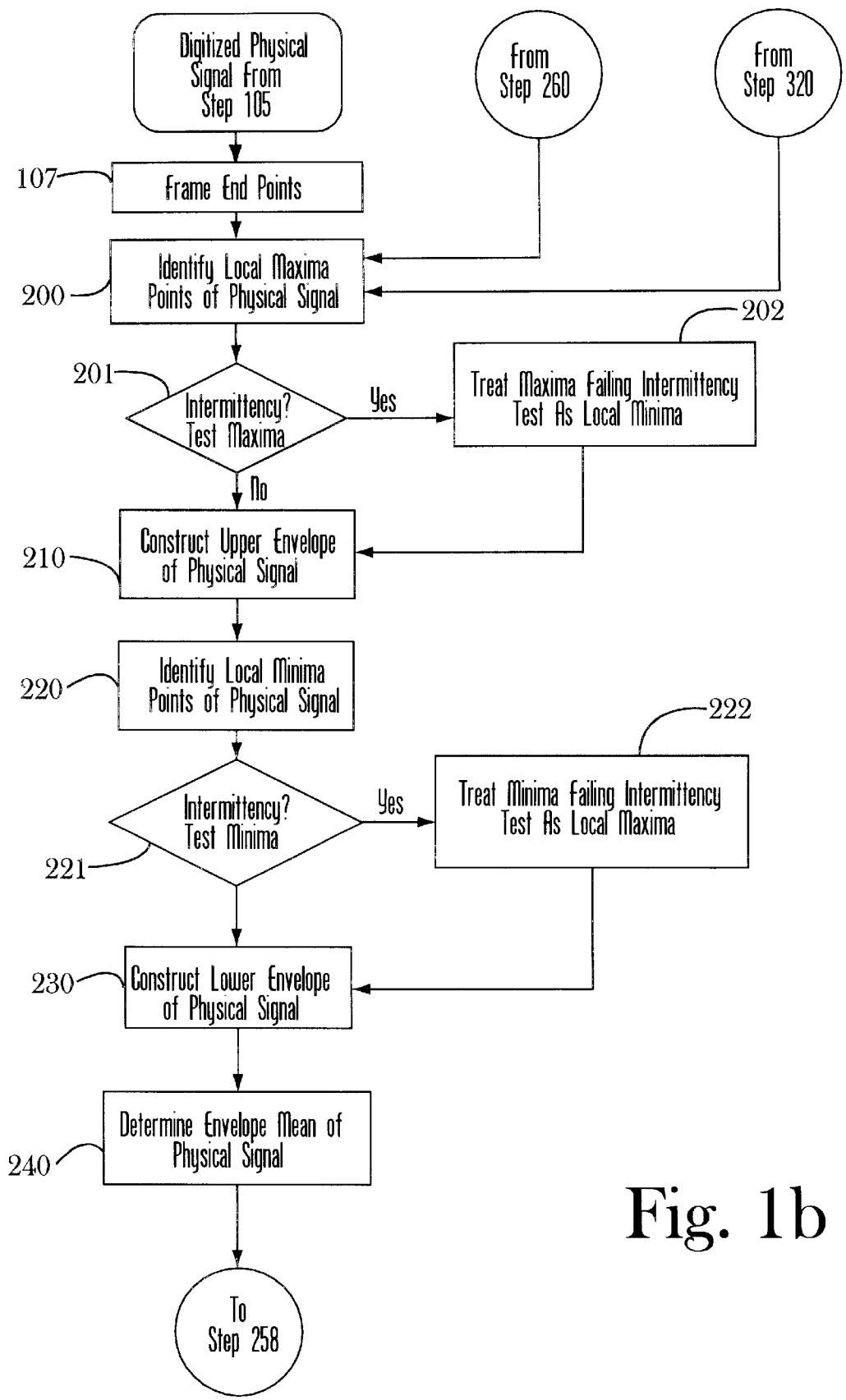
FIG. 1(b) is a high-level flowchart describing the Sifting Process which may be implemented on the computer system shown in FIG. 2.
Figure 3A:
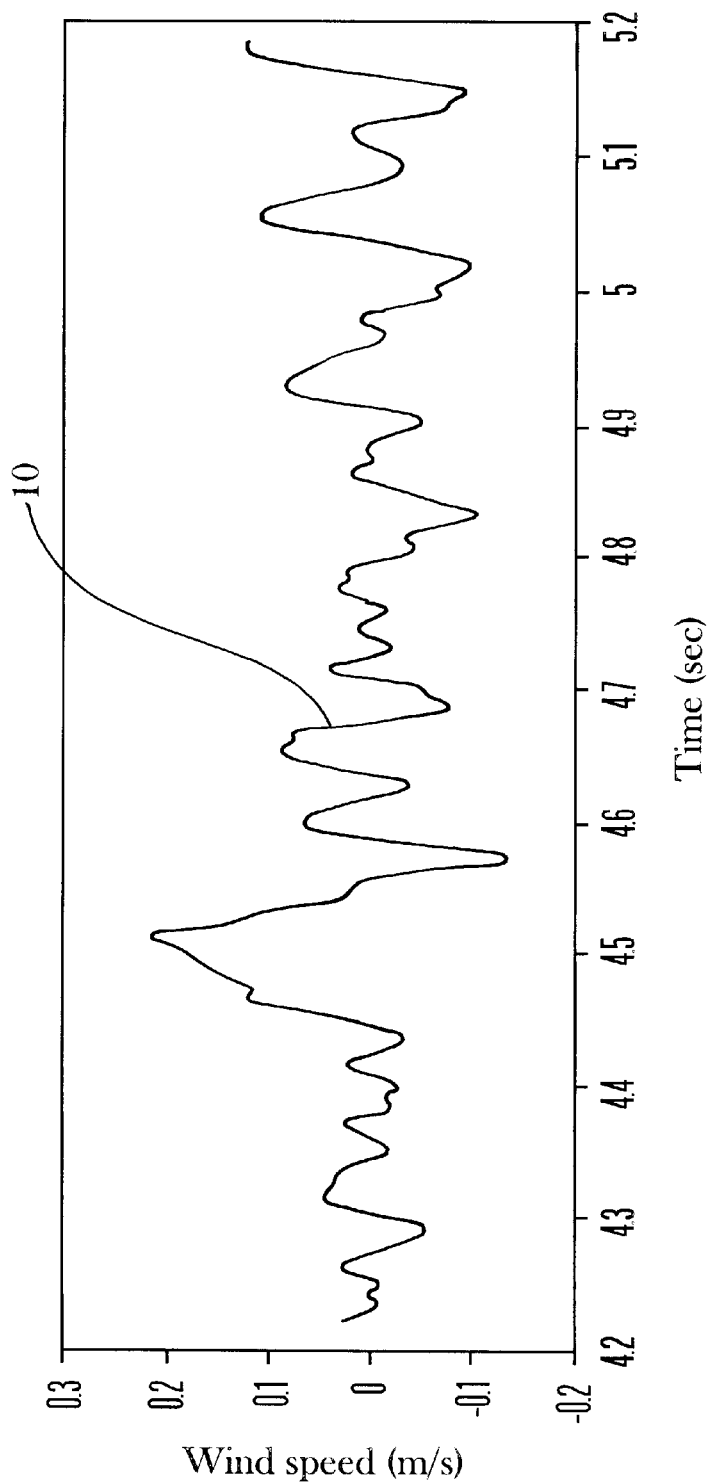
FIG. 3(a) shows wind speed data in the form of a graph plotting wind speed as a function of time for explaining the computer implemented Empirical Mode Decomposition method of the invention.

As shown in FIG. 1(b), the digitized physical signal from step 105 is first windowed by framing the end points in step 107. Then, the Sifting Process begins at step 200 by identifying local maximum values of the digitized, framed physical signal from step 107. FIG. 3(a) shows a typical physical signal 10 which, in this example, represents wind speed spanning a time interval of one second.

Before construction of the envelope in steps 210 and 230, optional intermittency tests (201,221) may be introduced to alleviate the alias associated with intermittence in the data that can cause mode mixing.

Optional intermittency test 201 checks the distance between successive maxima to see if this distance between is within a pre-assigned value n times the shortest distance between waves. If no, then an intermittency exists and the method proceeds to step 202. If yes, then there is no intermittency and the upper envelope is constructed in step 210 as further described below.

Similarly optional intermittency test 221 checks the distance between successive minima to see if this distance is within a pre-assigned value n times the shortest distance between waves. If no, then an intermittency exists and the method proceeds to step 222. If yes, then there is no intermittency and the upper envelope is constructed in step 230 as further described below.

Figure 3B:
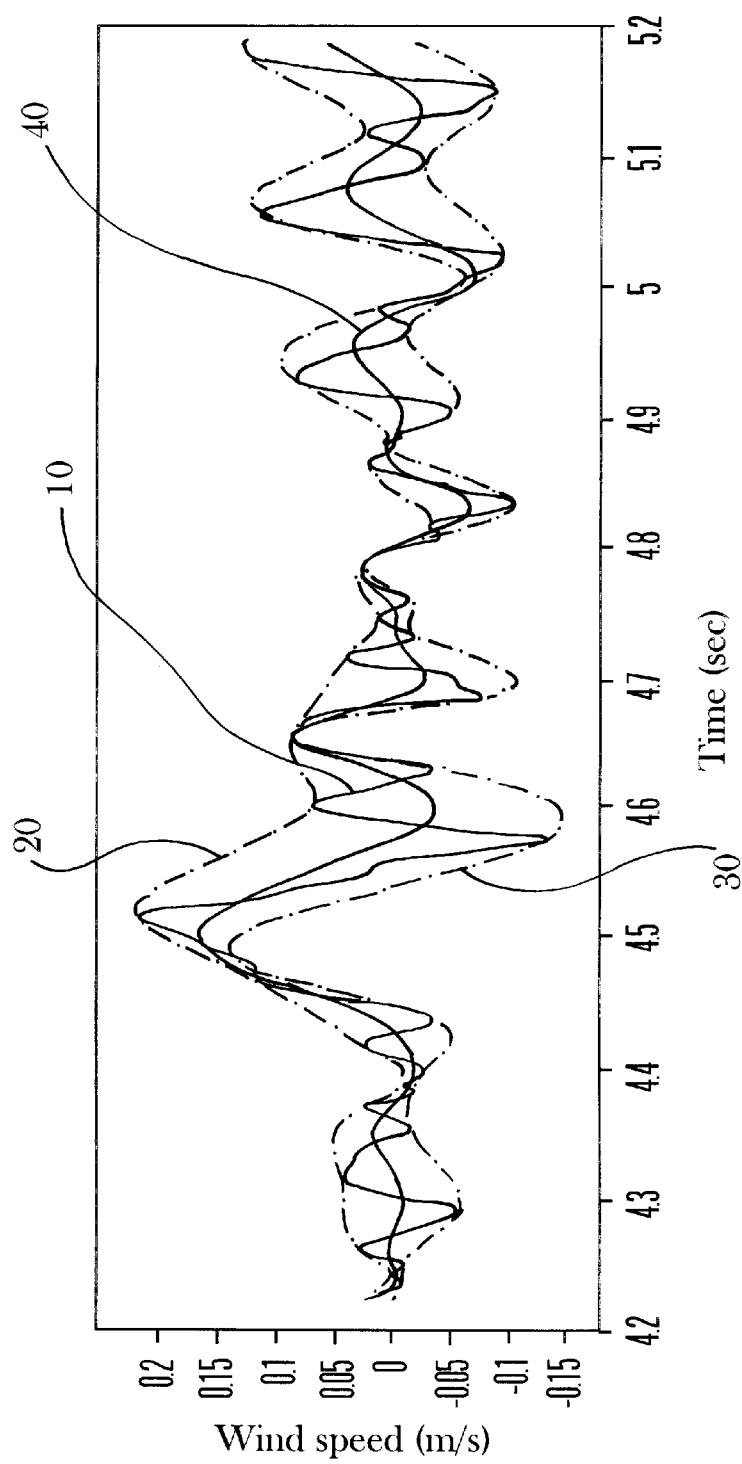
FIG. 3(b) is a graph illustrating the upper envelope, lower envelope, envelope mean and original wind speed data which are utilized to explain the computer implemented Empirical Mode Decomposition method of the invention.
Figure 3C:
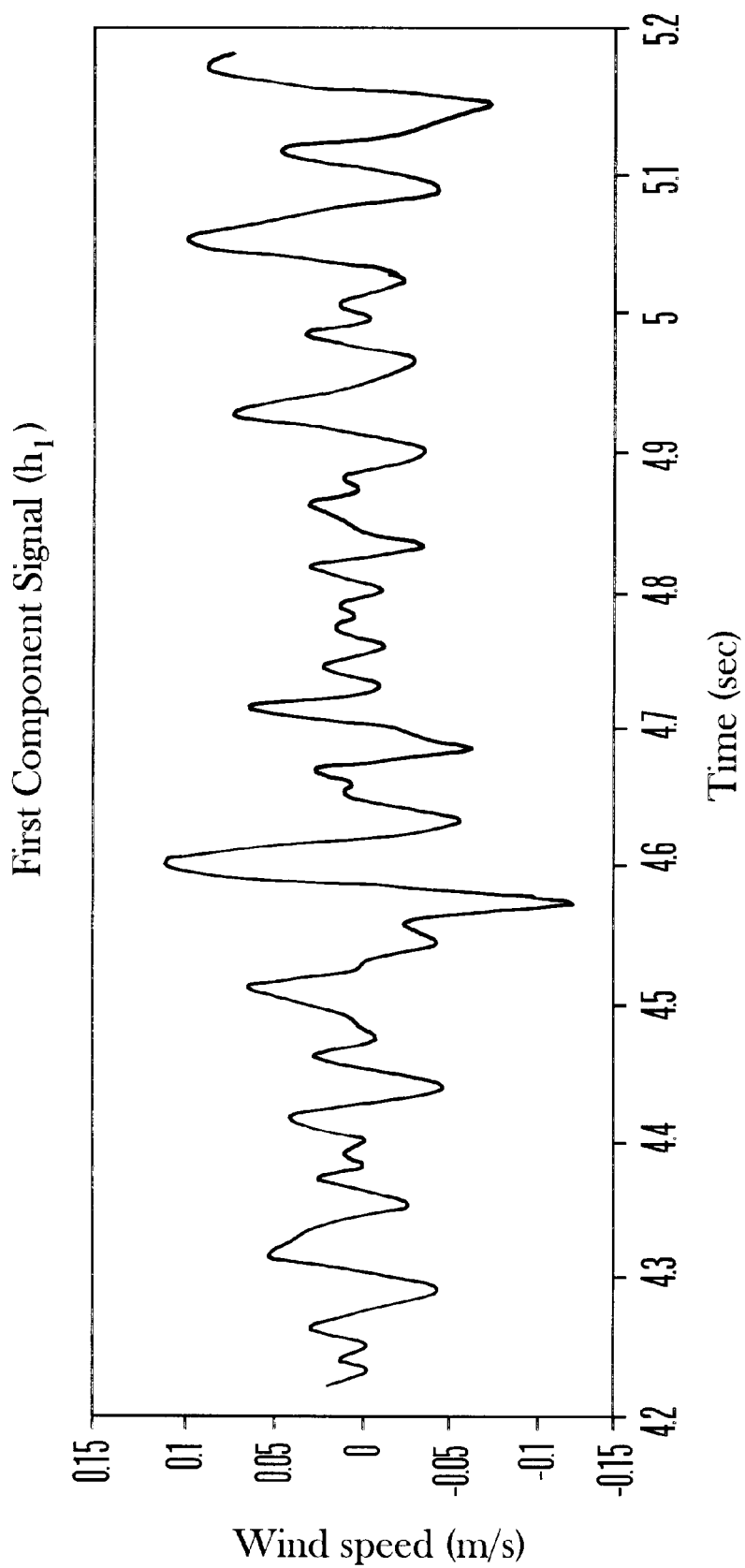
FIGS. 3(c)–(e) are graphs of the first, second and third component signals h1, h11, h12, respectively which are generated by the Sifting Process of the invention.
Figure 3D:
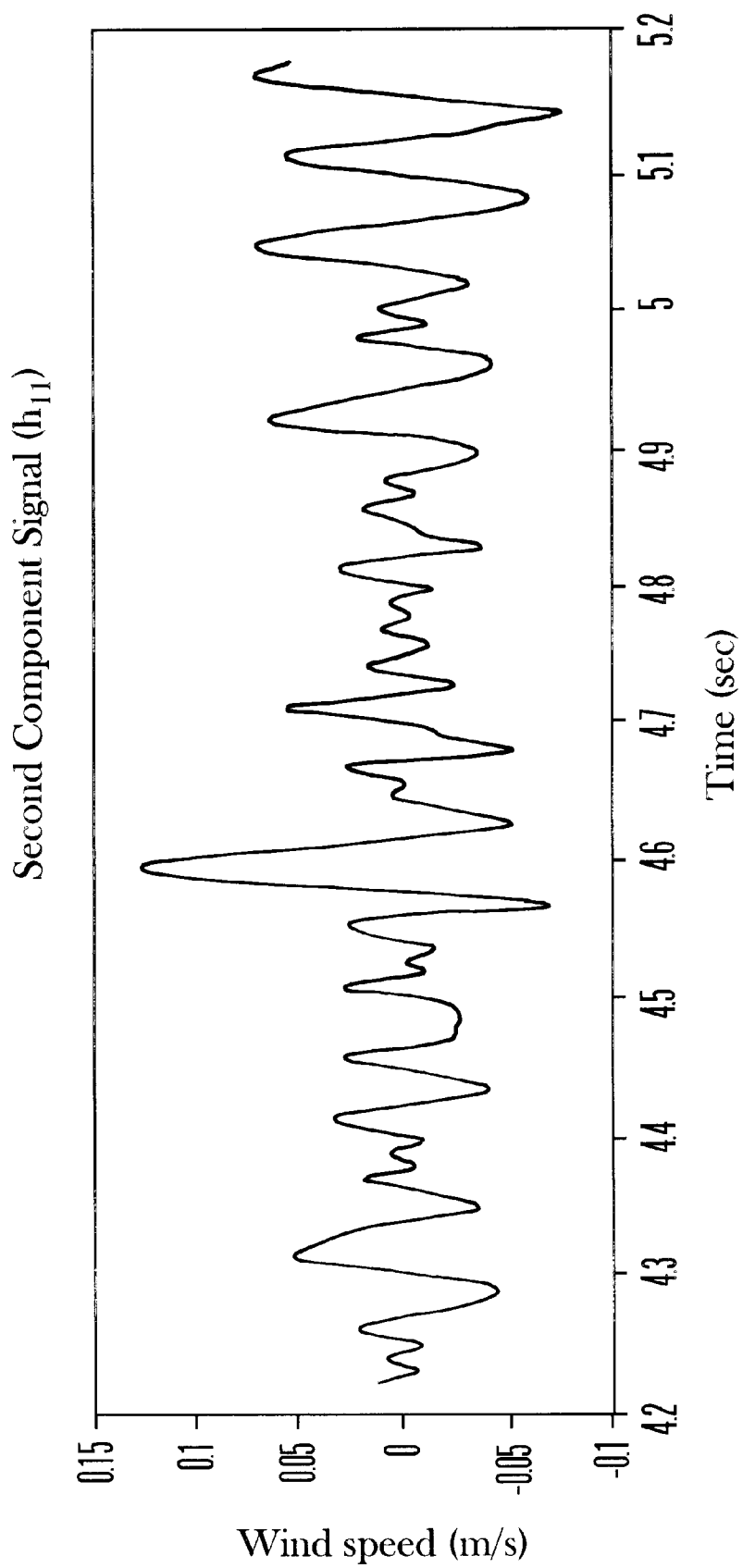
Figure 3E:
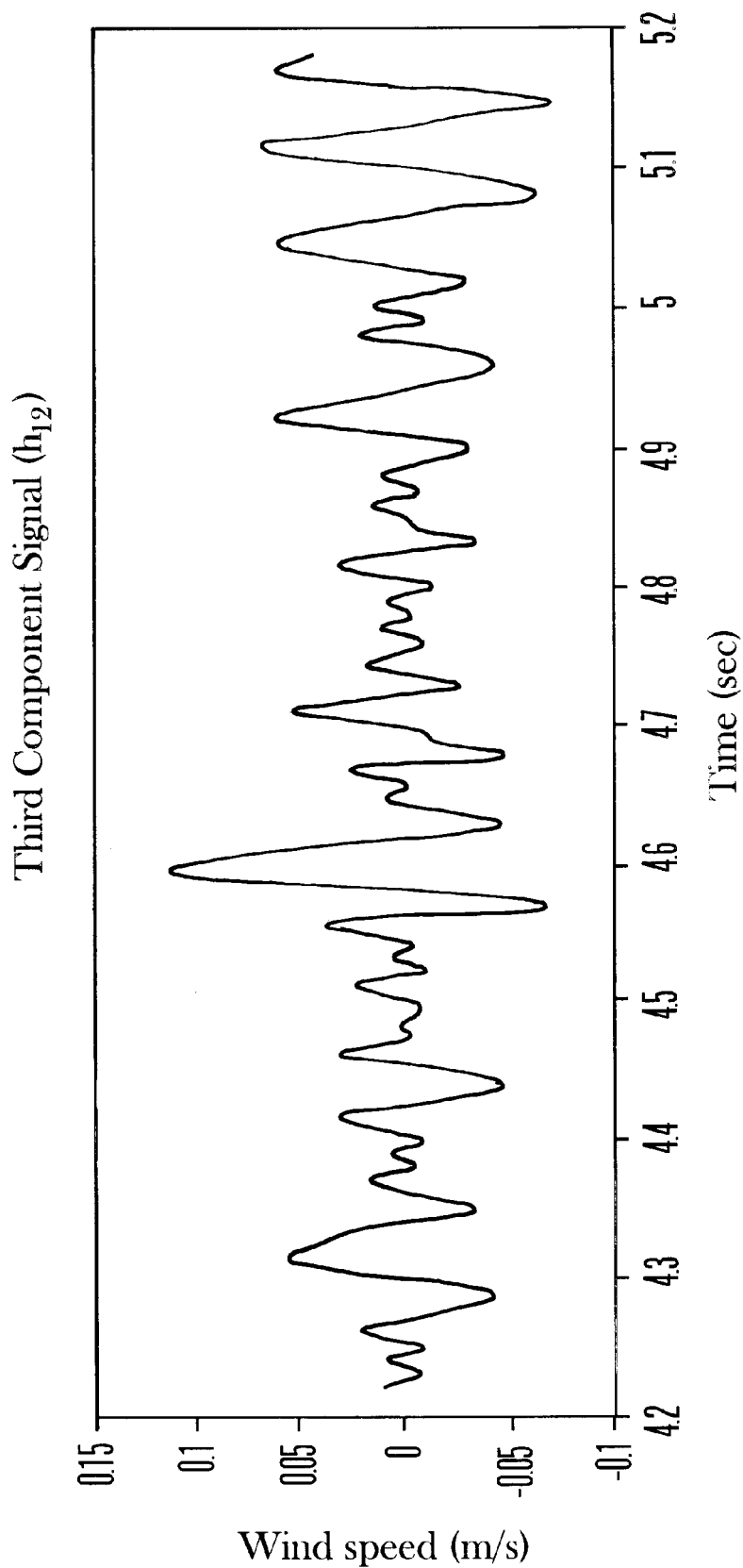
Figure 3F:
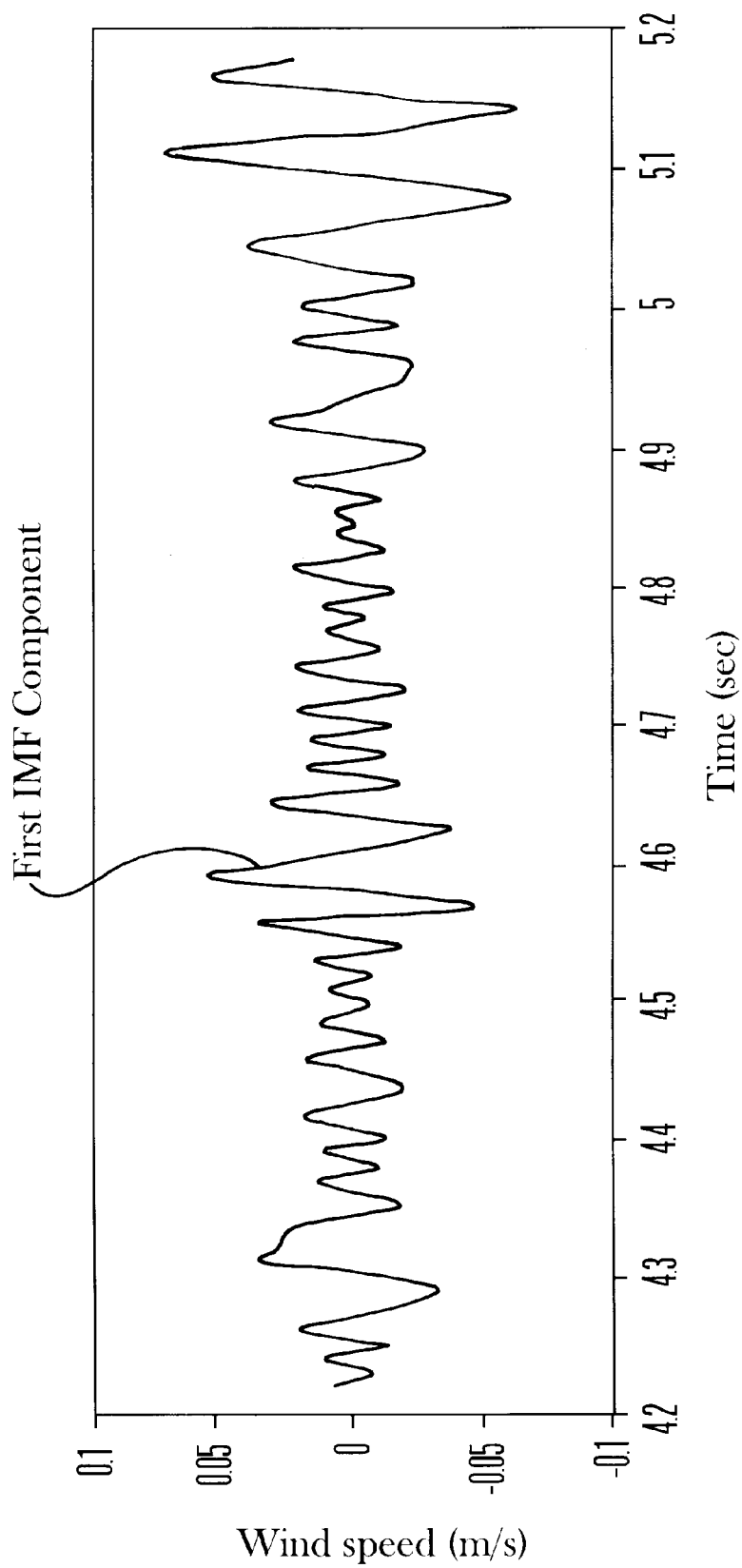
FIG. 3(f) is a graph of the first intrinsic mode function component which is generated by the Sifting Process of the invention.
Figure 3G:
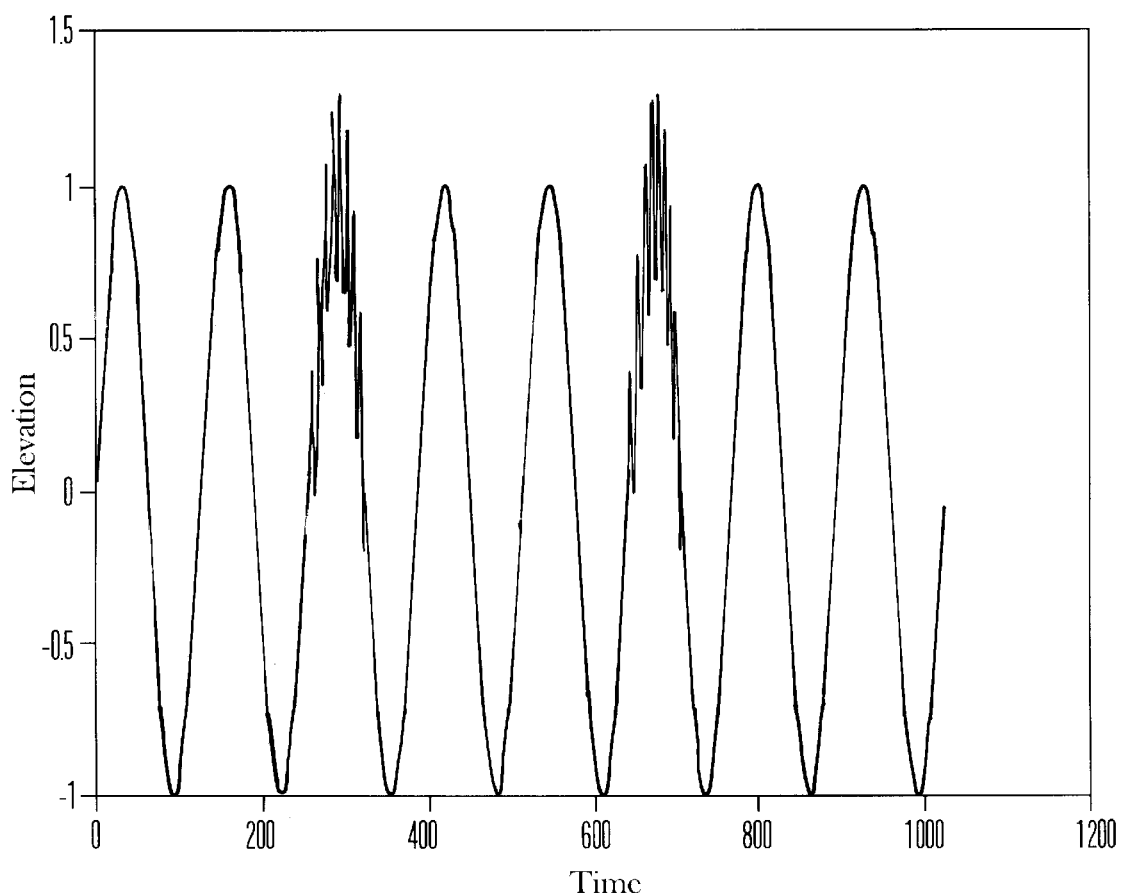
FIG. 3(g) is a graph of data with intermittency for illustrating an optional intermittency test of the invention.
Figure 3H:
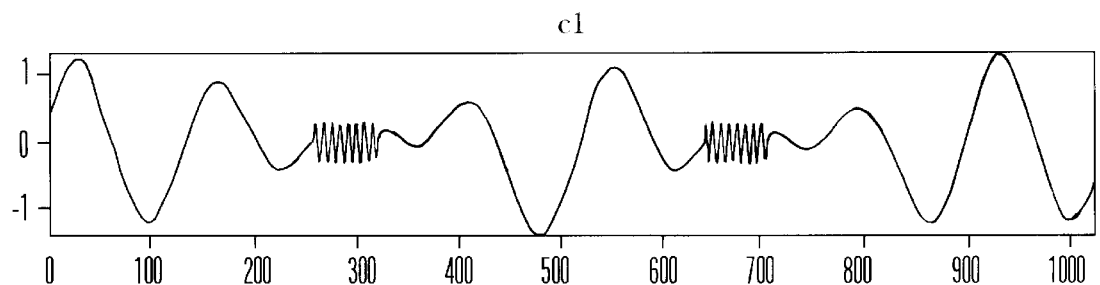
FIGS. 3(h)–(j) are graphs of the first, second, and third intrinsic mode functions when the Sifting Process is applied to the data of FIG. 3(g) without applying the intermittency test option.
Figure 3I:
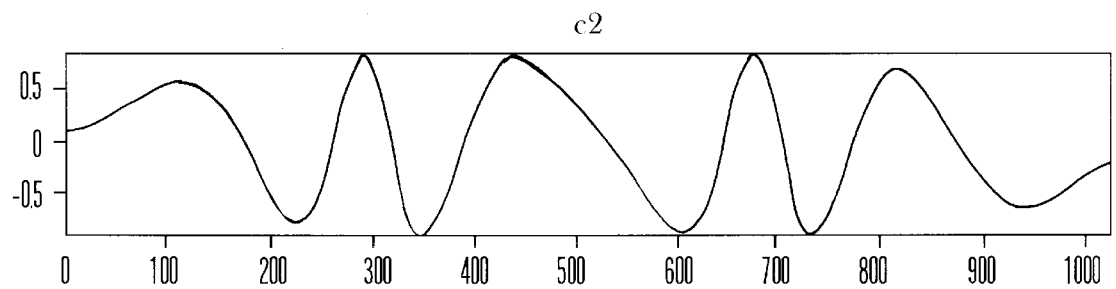
Figure 3J:
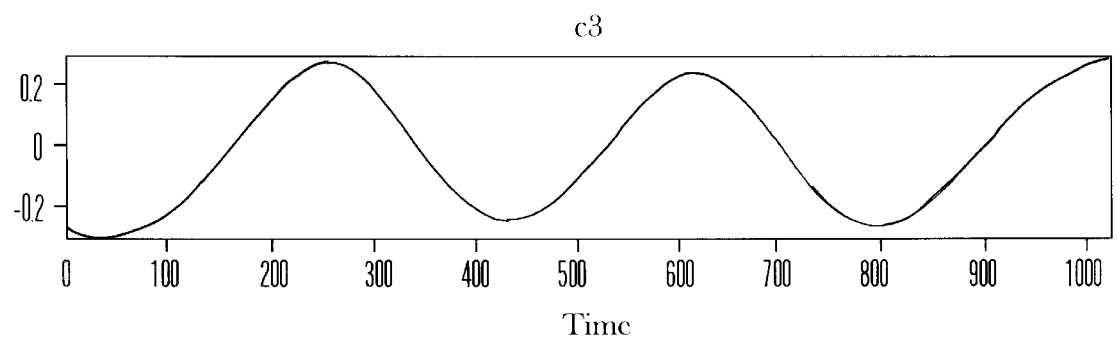

An example of such intermittency is given in FIG. 3(g), in which small scale waves appear only intermittently. By strict application of the Sifting Process, the resulting IMFs are given in FIGS. 3(b)–(j), in which two drastically different time scales are present in the first IMF component as shown in FIG. 3(h). This mixing of modes breaks up the main wave train by the small intermittent oscillations.

Figure 3K:
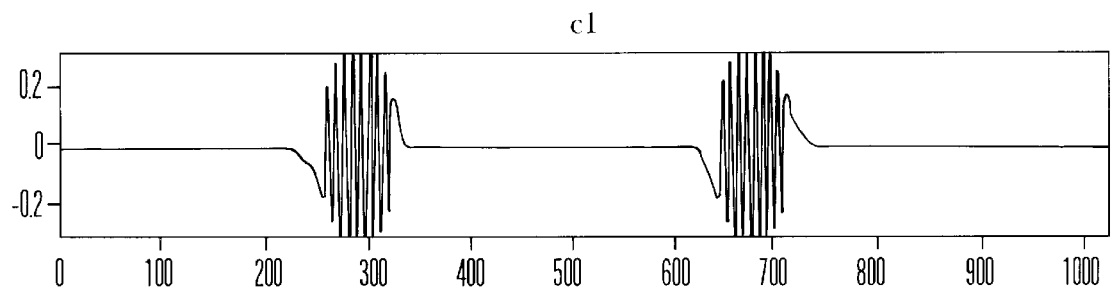
FIGS. 3(k)–(m) are graphs of the first, second, and third intrinsic mode functions when the Sifting Process is applied to the data of FIG. 3(g) which applies the intermittency test option.
Figure 3L:
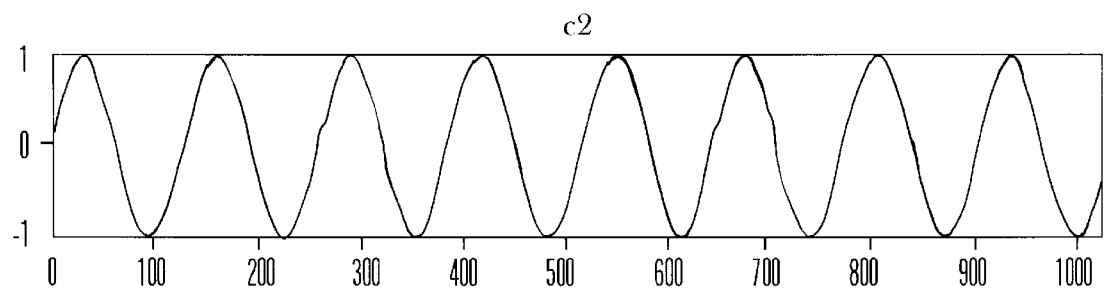
Figure 3M:
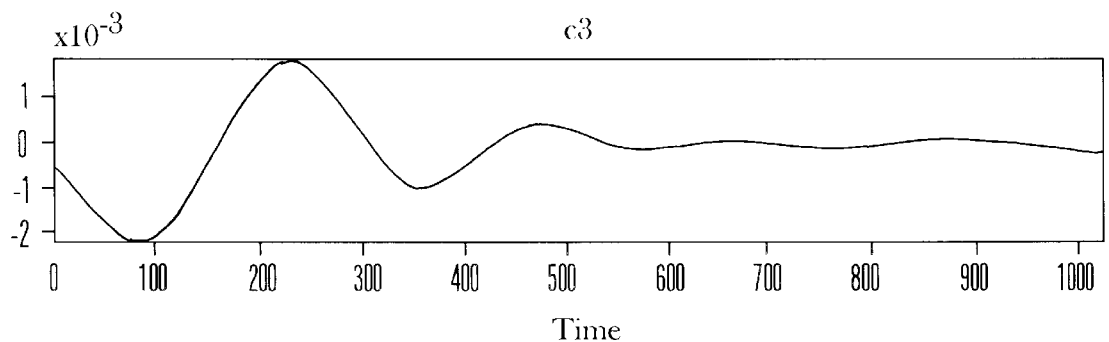

If intermittency tests (201,222) are employed which utilize a preassigned value of n-times the shortest distance between waves, the resulting IMFs are shown in FIGS. 3(k)–(m), in which the modes are clearly and physically separated. The effective step to eliminate the mode mixing is achieved by treating the local extrema which failed the intermittency test as local maxima and minima (steps 202 and 212), respectively. Therefore, the upper and lower envelope will be identical as the original data reference line.

These intermittency tests (201,221) and the further steps (202,222) are optional. By selecting an artificially large n value utilized in steps 201 and 221 to test for intermittency, the test will be effectively passed. Otherwise, the test can be bypassed at the initial selection of the program.

Then, the method constructs an upper envelope 20 of the physical signal 10 in step 210. The upper envelope 20 is shown in FIG. 3(b) using a dot-dashed line. This upper envelope 20 is preferably constructed with a cubic spline that is fitted to the local maxima.

Next, the local minimum values of the physical signal 10 are identified in step 220. To complete the envelope, a lower envelope 30 is constructed from the local minimum values in step 230. The lower envelope 30 is also shown in FIG. 3(b) using a dot-dash line.

Like the upper envelope 20, the lower envelope 30 is preferably constructed with a cubic spline that is fitted to the local minima.

The upper and lower envelopes 20, 30 should encompass all the data within the physical signal 10. From the upper and lower envelopes 20, 30, an envelope mean 40 is determined in step 240. The envelope mean 40 is the mean value of the upper and lower envelopes 20, 30. As can be seen in FIG. 3(b), the envelope mean 40 bisects the physical signal 10 quite well.

Then, the method generates the first component signal $h_1$ in step 250 by subtracting the envelope mean 40 from the physical signal 10. This computer implemented step may also be expressed as:

$$X(t)-m_1=h_1. \tag{1}$$

Where the envelope mean 40 is $m_1$ and the physical signal 10 is X(t).

FIG. 3(c) shows the first component signal $h_1$. Ideally, the first component signal $h_1$ should be an IMF, for the construction of $h_1$ described above seems to have made $h_1$ satisfy all the requirements of an IMF. In reality, however, a gentle hump that resides on a slope region of the data can become an extremum when the reference coordinate is changed from the original rectangular coordinate to a curvilinear coordinate. For example, the imperfection of the envelopes 20, 30 can be seen by observing the overshoots and undershoots at the 4.6 and 4.7 second points in FIG. 3(b).

An example of this amplification can be found in the gentle hump between the 4.5 and 4.6 second range in the data in FIG. 3(a). After the first round of sifting, the gentle hump becomes a local maximum at the same time location in the first component signal $h_1$ shown in FIG. 3(c). New extrema generated in this way actually recover the proper modes lost in the initial examination. Thus, the Sifting Process extracts important information from the signal which may be overlooked by traditional techniques. In fact, the Sifting Process can recover low amplitude riding waves, which may appear as gentle humps in the original signal, with repeated siftings.

Still another complication is that the envelope mean 40 may be different from the true local mean for nonlinear data. Consequently, some asymmetric wave forms can still exist no matter how many times the data are sifted. This must be accepted because, after all, the inventive method is an approximation as discussed before.

Other than these theoretical difficulties, on the practical side, serious problems of the spline fitting can occur near the ends, where the cubic spline fitting can have large swings. Left by themselves, the end swings can eventually propagate inward and corrupt the whole data span especially in the low frequency components. A numerical method has been devised to eliminate the end effects details of which will be given later. Even with these problems, the Sifting Process can still extract the essential scales from the data.

The Sifting Process serves two purposes: to eliminate riding waves and to make the wave profiles more symmetric. Toward these ends, the Sifting Process has to be repeated. Because only the first component signal $h_1$ has been generated so far, the decision step 260, which tests successive component signals to see if they satisfy the definition of an IMF, is bypassed during the first iteration.

Thus, step 265 is performed which treats the component signal as the physical signal in the next iteration. The next iteration is then performed by executing steps 200–250. In step 250, the second component signal $h_{11}$ is generated by subtracting the envelope mean from the physical signal (in this iteration, the first component signal $h_1$ is treated as the physical signal). In more formal terms:

$$h_1-m_{11}=h_{11}. \tag{2}$$

FIG. 3(d) shows the second component signal $h_{11}$. Although the second sifting shows great improvement in the signal with respect to the first sifting, there is still a local maximum below the zero line. After a third sifting, the result (third component signal $h_{12}$) is shown in FIG. 3(d). Now all the local maxima are positive, and all the local minima are negative, but to ensure this configuration is stable, the Sifting Process should be further repeated. In general, the Sifting Process is repeated at least 3 more times and, in general, K times to produce $h_{1k}$. If no more new extrema are generated, then $h_{1k}$ is an IMF. In formal terms:

$$h_{1(k-1)}-m_{1k}=h_{1k}; \tag{3}$$

The resulting first IMF component is shown in FIG. 3(f) after 9 siftings. The first IMF component of the physical signal may be designated as such in step 270 and stored in step 275 in memory 415:

$$c_1=h_{1k}, \tag{4}$$

As mentioned above, all these manipulations are carried out numerically in a computer 410. There is no explicit close form analytic expression for any of the computer implemented steps.

As described above, the process is indeed like sifting of the data by the computer 410 because it separates the finest (shortest time scale) local mode from the data first based only on the characteristic time scale. The Sifting Process, however, has two effects:

a. to eliminate riding waves, and b. to ensure the envelopes generated by maxima and minima are symmetric.

While the first condition is necessary for the instantaneous frequency to be meaningful (as discussed below), the second condition is also necessary in case the neighboring wave amplitudes have too large a disparity.

Unfortunately, the effects of the second condition, when carried to the extreme, could obliterate the physically meaningful amplitude fluctuations. Therefore, the Sifting Process should be applied with care, for carrying the process to an extreme could make the resulting IMF a pure frequency modulated signal of constant amplitude.

To guarantee that the IMF component retains enough physical sense of both amplitude and frequency modulations, a stopping criterion is employed to stop the generation of the next IMF component.

Figure 1C:
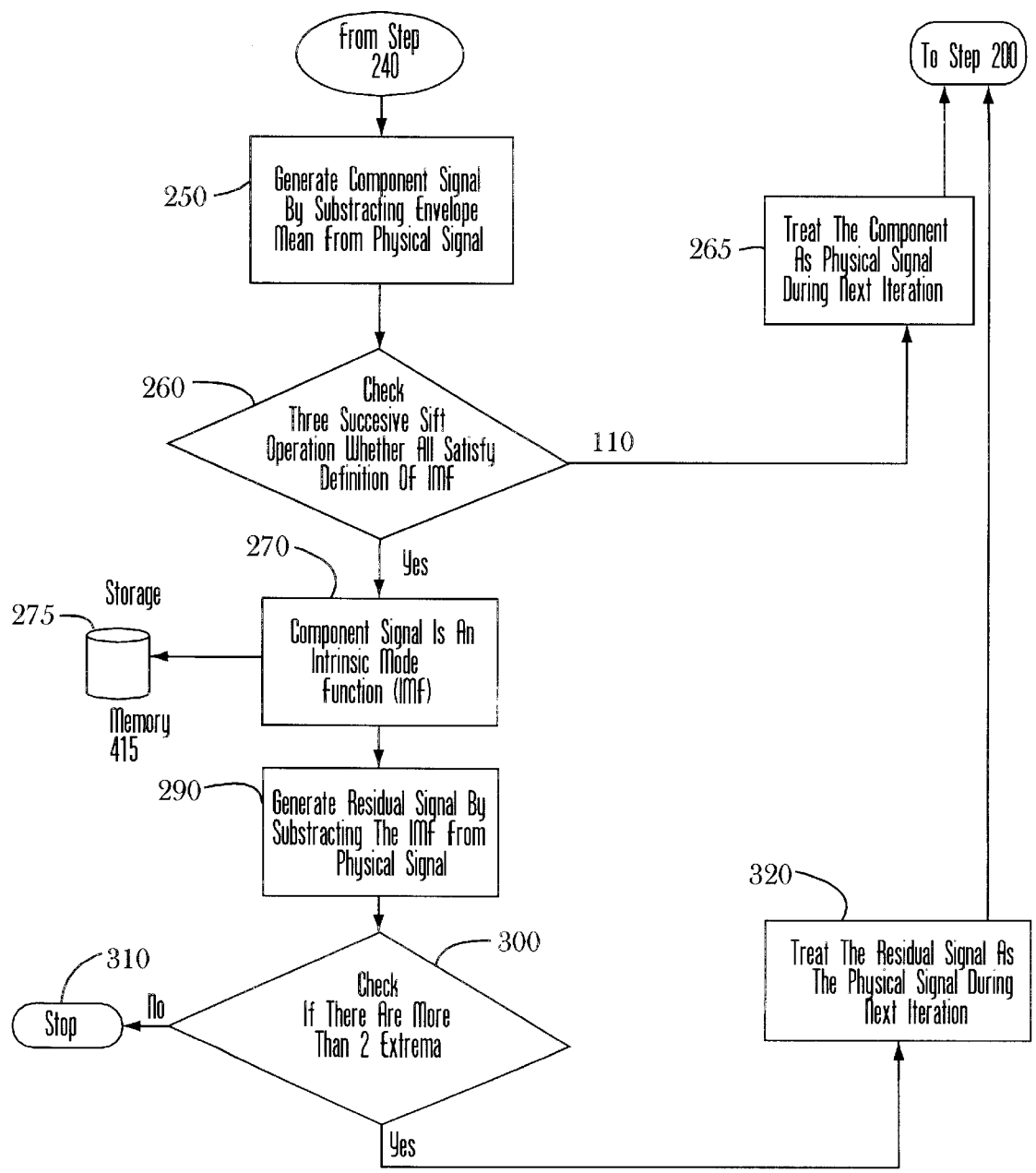
FIG. 1(c) is a continuation of the high-level flowchart in FIG. 1(b) describing the Sifting Process which may be implemented on the computer system shown in FIG. 2.

This stopping criterion is part of the computer implemented method and is shown as step 260 in FIG. 1(*c*). Step 260 is a decision step that decides whether the stopping criteria has been satisfied. The preferred stopping criteria determines whether three successive component signals satisfy the definition of IMF. If three successive component signals all satisfy the definition of IMF, then the Sifting Process has arrived at an IMF and should be stopped by proceeding to step 270. If not, step 260 starts another iteration by proceeding to step 265 as described above.

Alternatively, another stopping criteria could be used that determines whether successive component signals are substantially equal. If successive component signals are substantially equal, then the Sifting Process has arrived at an IMF and should be stopped by proceeding to step 270. If not, step 260 starts another iteration by proceeding to step 265 as described above.

Determining whether successive component signals are substantially equal in the alternative stopping criteria limits the size of the standard deviation, sd, computed from the two consecutive sifting results as follows:

$$sd = \sum_{t=0}^{T} \left[ \frac{|(h_{1(k-1)}(t) - h_{1k}(t))|^2}{h_{1(k-1)}^2(t)} \right]. \quad (5)$$

A very rigorous and preferred value for sd is set is desired, then a trade-off such as a less rigorous value for sd may be used.

Overall, the first IMF component $c_1$ should contain the finest scale or the shortest period component of the physical signal 10.

Before extracting the next IMF component, a test should be conducted to determine if the Sifting Process should stop. The stopping criteria is shown in Step 300. Step 300 determines whether the component signal has more than 2 extrema. If not, all of the IMF's have been extracted and the Sifting Process is stopped by proceeding to step 310. If so, then additional IMF's may be extracted by continuing the process in step 320.

Step 270 recognizes that an IMF component has been successfully generated by the Sifting Process by setting the component signal equal to an intrinsic mode function. More specifically, step 270 causes the computer 410 to store the component signal h1k as an intrinsic mode function in memory 415.

Then, the first IMF is separated from the physical signal in step 290 to generate a residual signal. In particular, a residual signal is generated by subtracting the intrinsic mode function from the physical signal. In formal terms:

$$X(t) - c_1 = r_1. \quad (6)$$

Because the residue, $r_1$, still includes information of longer period components, it is treated as the new physical data and subjected to the same Sifting Process as described above. Step 320 performs this function by treating the residual signal as the physical signal in the next iteration. Thereafter, the next iteration is performed beginning with the execution of step 200 as described above.

The Sifting Process is analogous to a mechanical sieve, except it is implemented here in specially programmed computer and applied to any digital data numerically rather than mechanically.

The Sifting Process is repeated for all the subsequent $r_j$'s. This iterative procedure may be expressed as:

$$r_1 - c_2 = r_2,$$

$$\ldots,$$

$$r_{n-1} - c_n = r_n. \quad (7)$$

Step 300 stops the Sifting Process by proceeding to stop step 310 if the residual signal $r_n$ has no more than 2 extrema. Otherwise, the method proceeds to step 320.

In other words, Step 310 stops the Sifting Process if the residual signal $r_n$ is monotonically increasing or decreasing. This stopping criterion is based on the fact that an IMF cannot be extracted from a monotonic function. If $r_n$ is not monotonically increasing/decreasing, then a next iteration is performed beginning with step 320.

Even for data with zero mean, the final residue still can be different from zero. For data with a trend, the final residue should be that trend.

In summary, the Sifting Process decomposes the physical signal X(t) into a series of intrinsic mode functions and a residue which may be expressed as:

$$X(t) = \sum_{i=1}^{n} c_i + r_n. \quad (8)$$

In other words, the invention extracts a series of IMFs by sifting the physical signal with a computer implemented Empirical Mode Decomposition method. This IMF series cannot be generated or derived by any analytic method. It can only be extracted by the invention through a specially programmed computer through the Sifting Process.

Computer for Implementing Inventive Method

Figure 2:
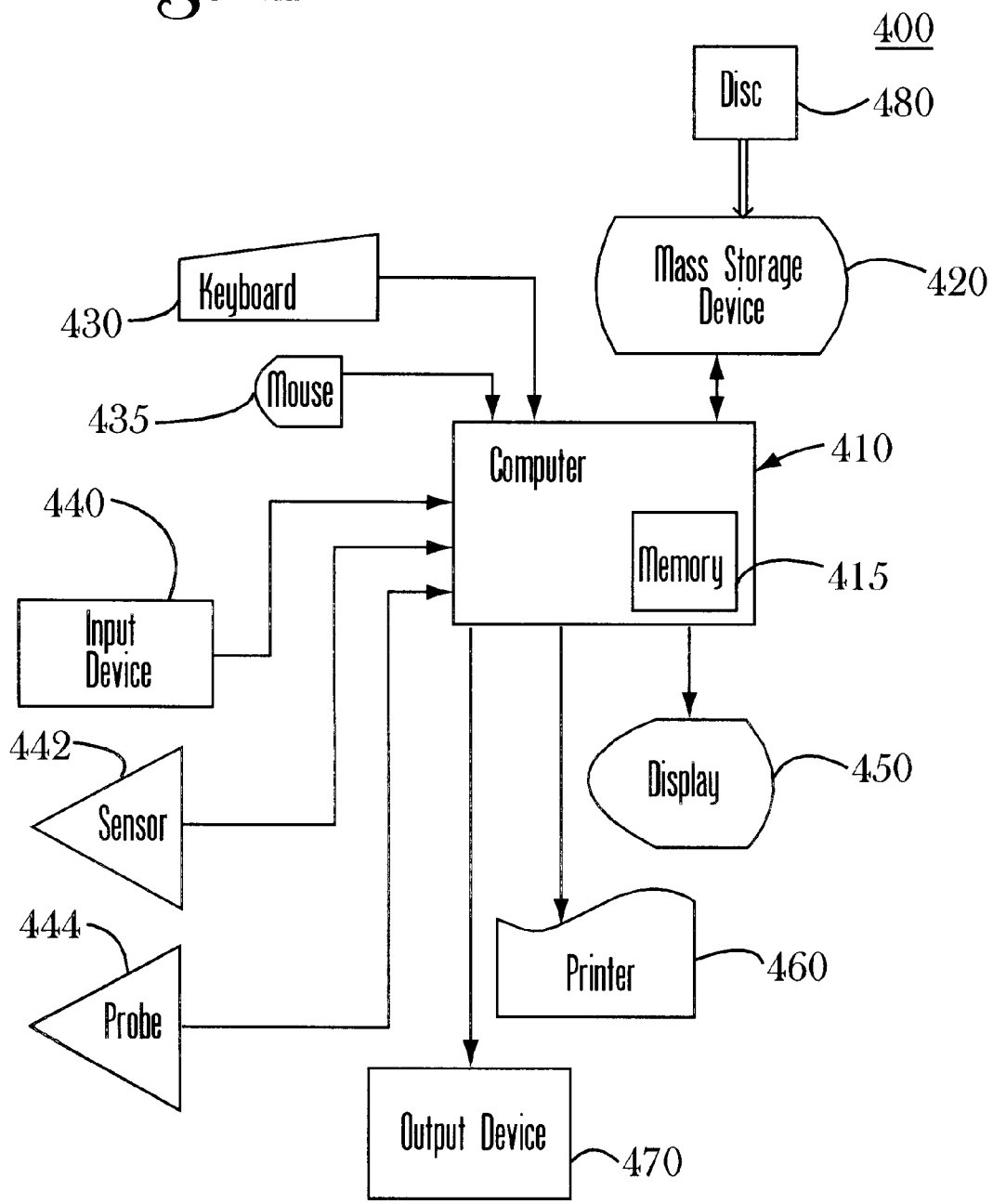
FIG. 2 is a high-level block diagram of a computer system which may be programmed with the inventive method with the result being a special purpose computer.

A computer suitable for programming with the inventive method is diagrammatically shown in the block diagram of FIG. 2. The computer 410 is preferably part of a computer system 400. To allow human interaction with the computer 410, the computer system includes a keyboard 430 and mouse 435. The computer programmed with the inventive method is analogous to a mechanical sieve: it separates digital data into series of IMF's according to their time scales in a manner analogous to a mechanical sieve which separates aggregated sand according to their physical size.

Because the invention is applied to analyze physical signals, the computer system 400 also includes an input device 440, sensor 442 and/or probe 444 which are used to sample a physical phenomenon and generate physical signal representative thereof. More particular examples of such inputs (440, 442 and 444) are described in relation to FIGS. 21–25.

To output the results of the computer implemented method, the computer system 400 also includes a display 450 such as a cathode ray tube or flat panel display, printer 460 and output device 470. Each of these outputs (450, 460, 470) should have the capability to generate color outputs because, for example, the Hilbert Spectrum may be in color.

Furthermore, the computer system 400 also includes a mass storage device 420. The mass storage device 420 may be a hard disk, floppy disc, optical disc, etc. The mass storage device 420 may be used to store a computer program which performs the invention when loaded into the computer 410. As an alternative, the input device 440 may be a network connection or off-line storage which supplies the computer program to the computer 410.

More particularly, the computer program embodiment of the invention may be loaded from the mass storage device 420 into the internal memory 415 of the computer 410. The result is that the general purpose computer 410 is transformed into a special purpose machine that implements the invention.

Even more particularly, each step of inventive method will transform at least a portion of the general purpose computer 410 into a special purpose computer module implementing that step. For example, when the sifting step 120 is implemented on the computer 410, the result is a computer implemented sifting apparatus (sifter) that performs the sifting functions of sifting step 120.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Article of Manufacture

Still further, the invention disclosed herein may take the form of an article of manufacture. More specifically, the article of manufacture is a computer-usable medium, including a computer-readable program code embodied therein wherein the computer-readable code causes computer 410 to execute the inventive method.

A computer diskette such as disc 480 in FIG. 2 is an example of such a computer-usable medium. When the disc 480 is loaded into the mass storage device 480, the computer-readable program code stored therein is transferred into the computer 410. In this way, the computer 410 may be instructed to perform the inventive methods disclosed herein.

Illustration of Sifting Process

Figure 4A:
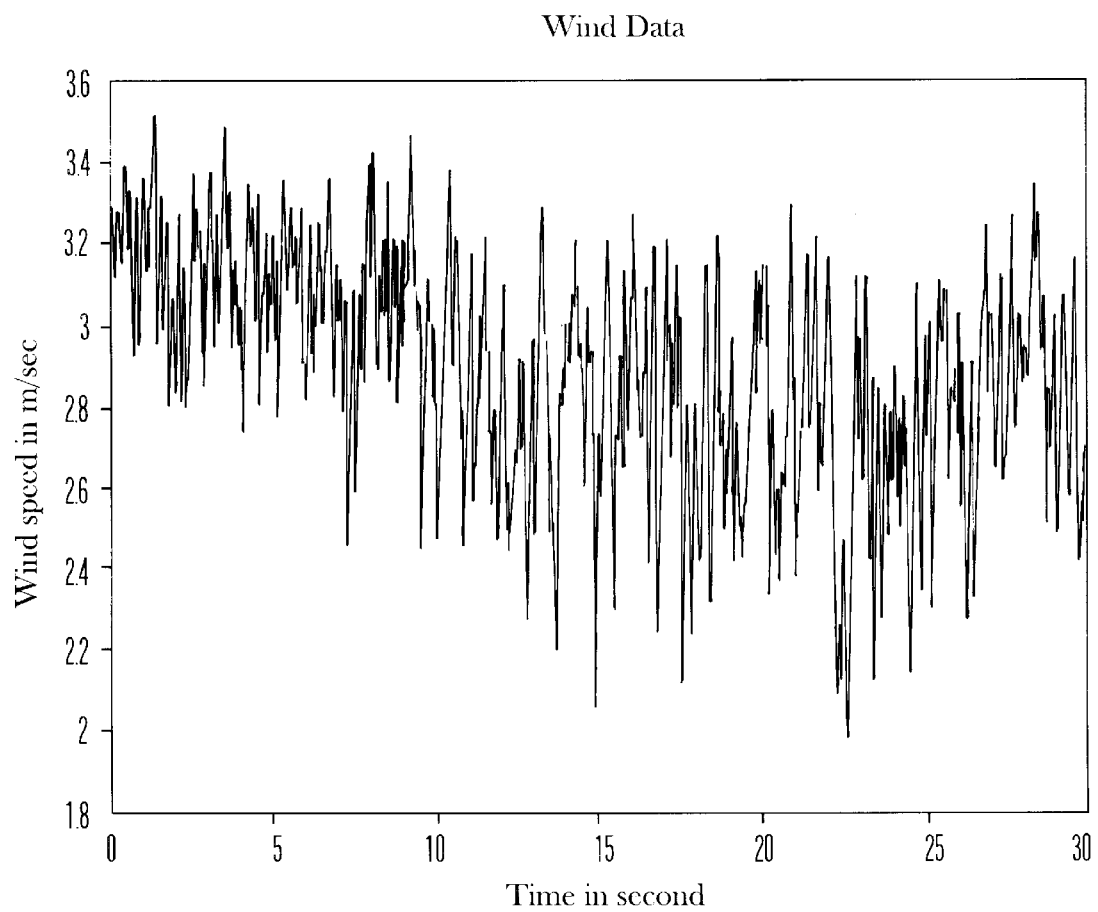
FIG. 4(a) is a graph of a wind speed signal which is for explaining the computer implemented Empirical Mode Decomposition method of the invention.

To further illustrate the Sifting Process, consider FIG. 4(a) which shows a physical signal representing wind data collected in a laboratory wind-wave tunnel with a high frequency resporise Pitot tube located 10 cm above the mean water level. The wind speed was recorded under the condition of an initial onset of water waves from a calm surface. Clearly, the physical signal is quite complicated with many local extrema but no zero-crossings such that the time series represents all positive numbers.

Although the mean can be treated as a zero reference, defining it is difficult, for the whole process is transient. This example illustrates the advantage of adopting the successive extrema for defining the time scale and the difficulties of dealing with noristationary data. In fact, a physically meaningful mean for such data is impossible to define using standard methods, the EMD eliminates this difficulty.

Figure 4B:
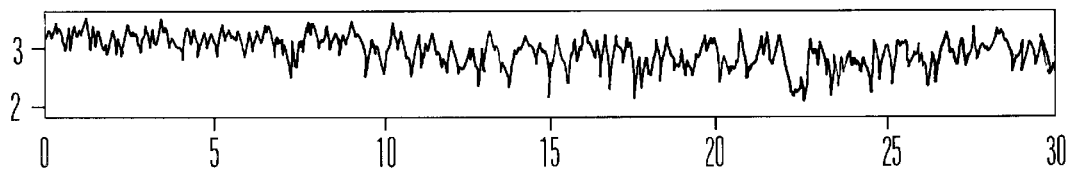
FIGS. 4(b)–(k) show the wind speed signal and the nine intrinsic mode functions which are extracted from the wind speed signal by the EMD method of the invention.
Figure 4C:
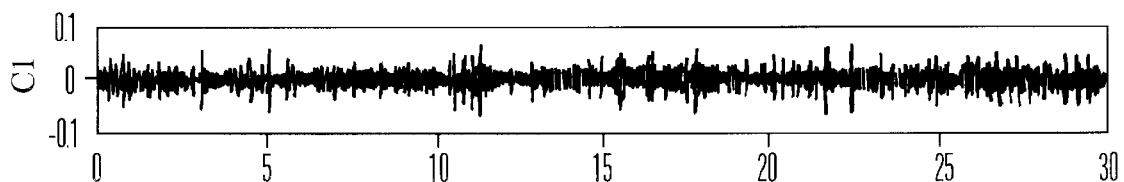
Figure 4D:
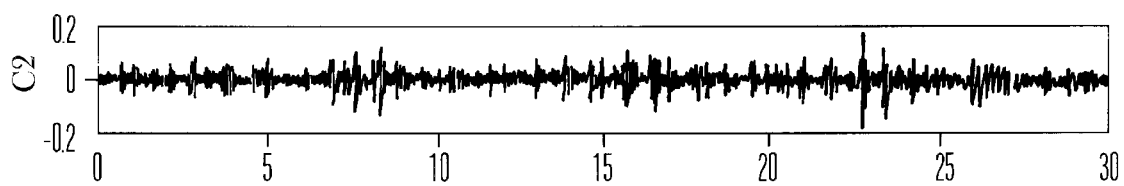
Figure 4E:
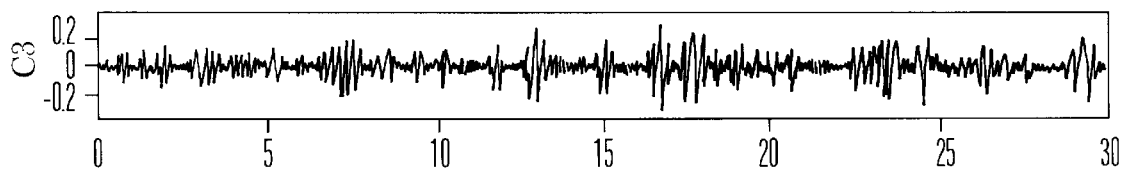
Figure 4F:
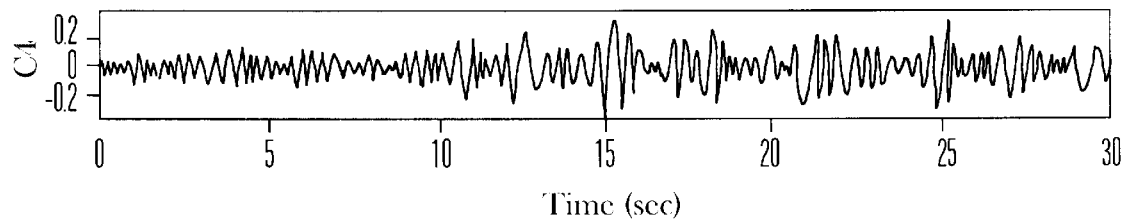
Figure 4G:
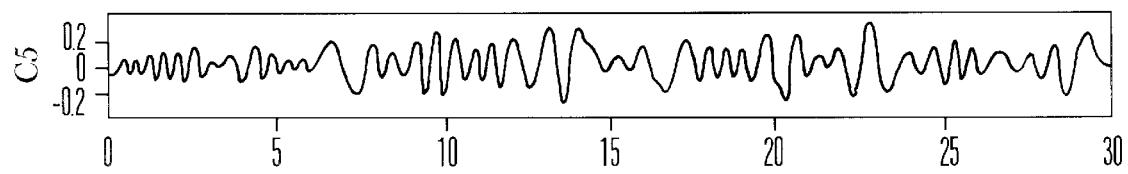
Figure 4H:
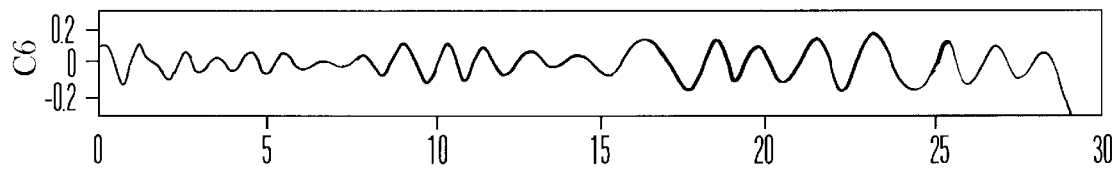
Figure 4I:
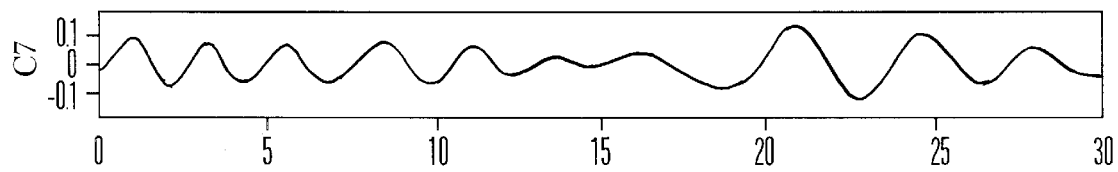
Figure 4J:
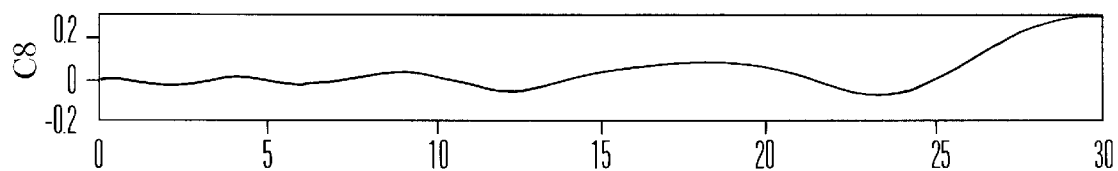
Figure 4K:
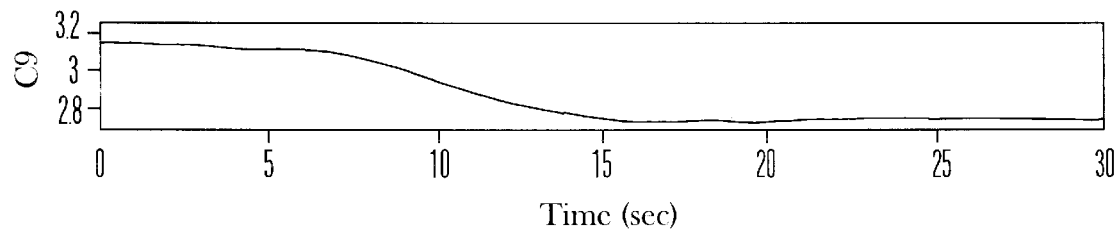

FIG. 4(b) shows the wind speed signal of FIG. 4(a) on a different scale for comparison purposes. FIGS. 4(c)–(k) show all the IMFs obtained from repeatedly sifting the wind speed signal in FIG. 4(b). The efficiency of the invention is also apparent: the Sifting Process produces a total of 9 intrinsic mode function components while the Fourier transform needs components which number as many as half of the total number of points in a given window to represent the wind data with the same accuracy.

The separation of the wind speed data into locally non-overlapping time scale components is clear from FIGS. 4(c)–(k). In some components, such as $c_1$ and $c_3$, the signals are intermittent, then the neighboring components might include oscillations of the same scale, but signals of the same time scale would never occur at the same locations in two different IMF components.

The components of the EMD are usually physical, for the characteristic scales are physically meaningful.

Figure 5A:
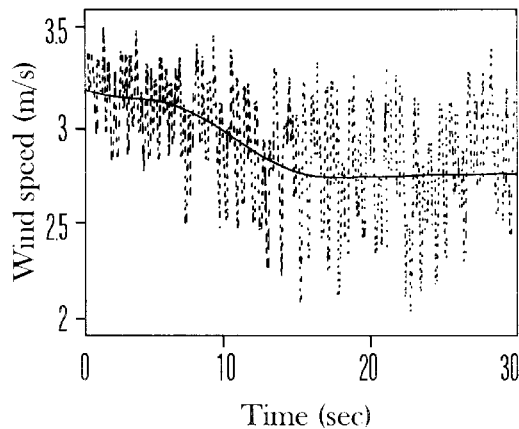
FIGS. 5(a)–(i) are a series of graphs illustrating the successive reconstruction of the original wind speed data from the intrinsic mode functions.

To confirm the validity and completeness of the Sifting Process, the wind speed signal can be reconstructed from the IMF components. FIGS. 5(a)–(i) show this reconstruction process starting from the longest period IMF to the shortest period IMF in sequence. For example, FIG. 5(a) shows the wind speed signal and the longest period component, $C_9$, which is actually the residue trend, not an IMF.

By itself, the fitting of the trend is quite impressive, and it is very physical: the gradual decrease of the mean wind speed indicates the lack of drag from the calm surface initially and the increasing of drag after the generation of wind waves. As the mean wind speed deceases, the amplitude of the fluctuation increases, another indication of wind-wave interactions.

Figure 5B:
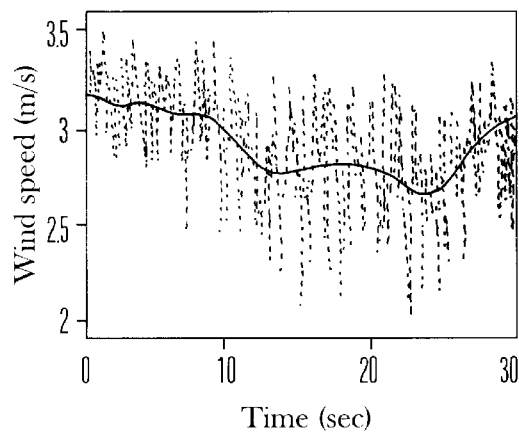
Figure 5C:
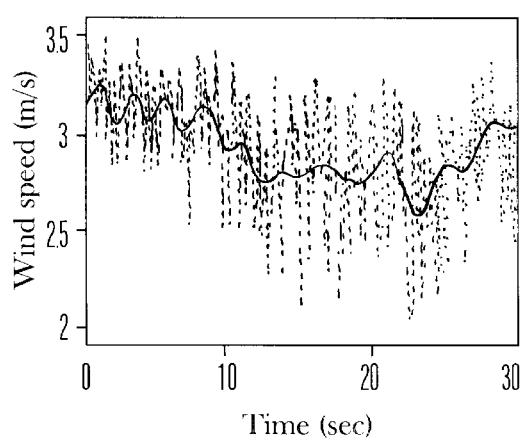
Figure 5D:
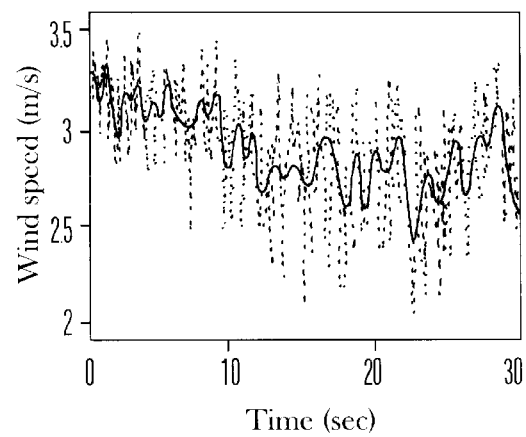
Figure 5E:
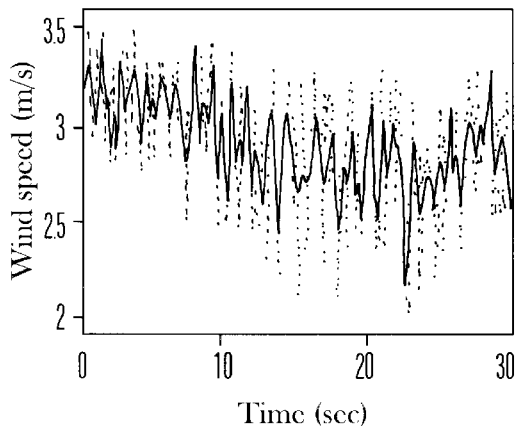
Figure 5F:
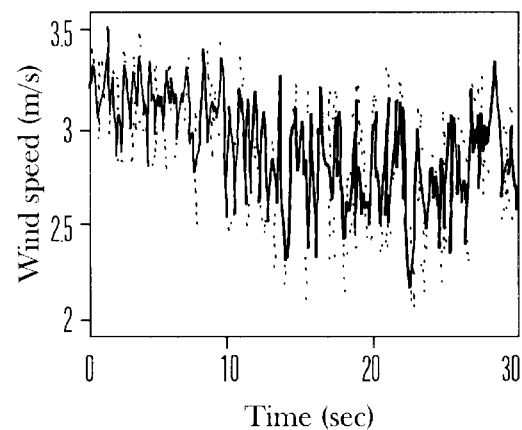
Figure 5G:
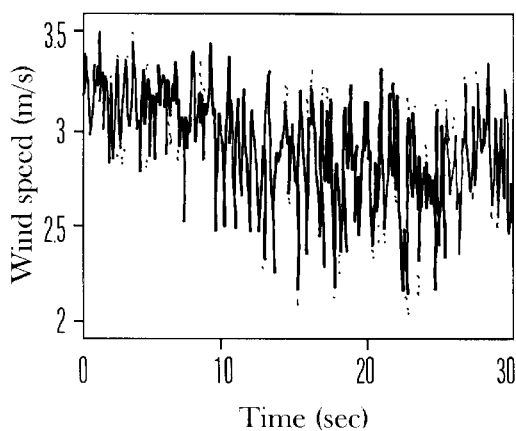
Figure 5H:
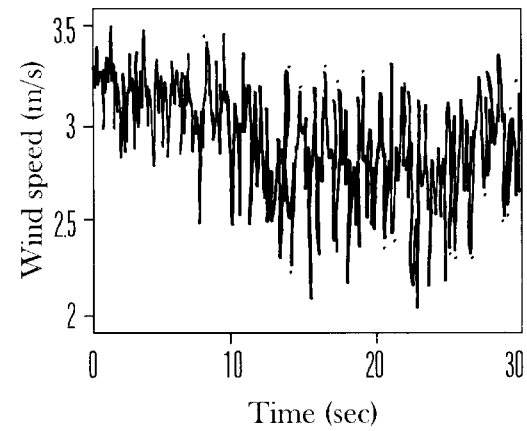
Figure 5I:
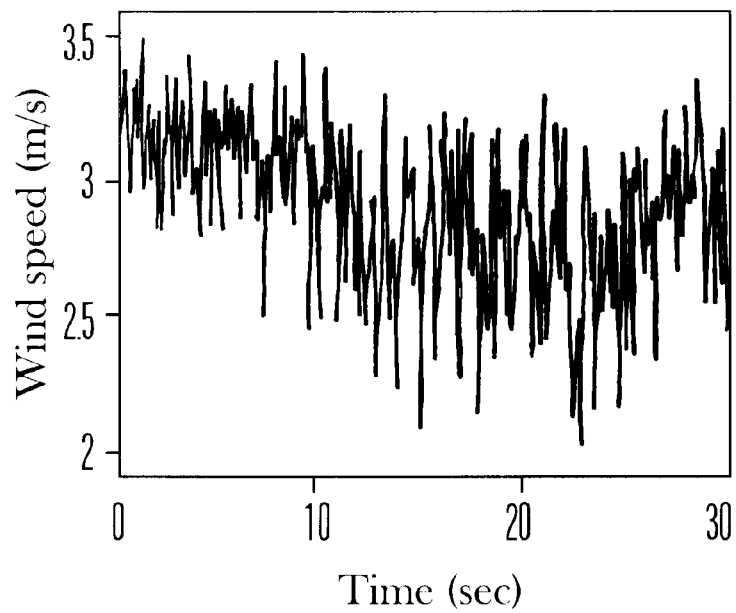
Figure 5J:
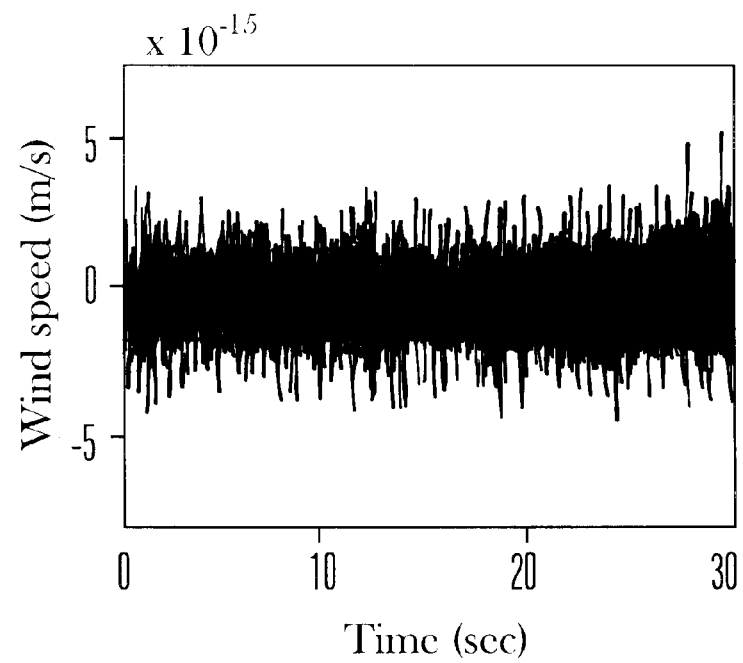
FIG. 5(j) illustrates the final difference between the original wind speed data and the reconstructed time series from the IMFs.

By adding the next longest period component, $c_8$, the trend of the sum, $c_9+c_8$, takes a remarkable turn, and the fitting to the wind speed signal looks greatly improved as shown in FIG. 5(b). Successively adding more components with increasing frequency results in the series of FIGS. 5(c)–(i). The gradual change from the monotonic trend to the final reconstruction is illustrative by itself. By the time the sum of IMF components reaches $C_3$ in FIG. 5(g), essentially all the energy contained in the wind speed signal is recovered. The components with the highest frequencies add little more energy, but they make the data look more complicated. In fact, the highest frequency component is probably not physical, for the digitizing rate of the Pitot tube is too slow to capture the high frequency variations. As a result, the data are jagged artificially by the digitizing steps at this frequency. The difference between the original data and the re-constituted set from the IMF's is given in FIG. 5(j). The magnitude of the difference is $10^{-15}$, which is the limit of the computer 410.

The Hilbert Spectrum

Having obtained the Intrinsic Mode Function components, the next step in the computer implemented method is to apply the Hilbert Transform to each component and generate the Hilbert Spectrum as shown in step 140 in FIG. 1(a).

A brief tutorial on the Hilbert transform with emphasis on its physical interpretation can be found in Bendat and Piersol, 1986, *"Random Data: Analysis and Measurement Procedures"*, 2nd Ed., John Wiley & Sons, New York, N.Y. Essentially, the Hilbert $$Y(t) = \frac{1}{\pi} P \int_{-\infty}^{\infty} \frac{X(t')}{t-t'} dt' \qquad (9)$$

transform is the convolution of X(t) with 1/t. This convolution emphasizes the local properties of X(t). In more formal terms, given a time series X(t), the Hilbert Transform Y(t) can be expressed as where P indicates the Cauchy principal value.

With this definition, X(t) and Y(t) form a complex conjugate pair. This complex conjugate pair Z(t) may be expressed as:

$$Z(t)=X(t)+iY(t)=a(t)e^{i\theta(t)}, \quad (10)$$

in which $$a(t) = [X^2(t) + Y^2(t)]^{\frac{1}{2}}, \quad (11)$$

$$\theta(t) = \arctan\frac{X(t)}{Y(t)}. \quad (12)$$

After performing the Hilbert transform to each IMF component, we can express the time series data $$X(t) = \sum_{j=1}^{n} a_j(t)e^{i\int \omega_j(t)dt}. \quad (13)$$

In Equation (13), the residue, $r_n$, is purposefully omitted, for it is either a monotonic function, or a constant. Although the Hilbert transform can treat the monotonic trend as part of a longer oscillation, the energy involved in the residual trend could be overpowering. In consideration of the uncertainty of the longer trend, and in the interest of information contained in the other low energy and higher frequency components, the final non-IMF component should be left out. It, however, could be included, if physical considerations justify its inclusion.

Note that Equation (13) gives both amplitude and frequency of each component as functions of time. It should be pointed out that no analytical method can generate the expression in Equation (13). Instead, all the components may be extracted only by a specially programmed computer applying the inventive Sifting Process and the Hilbert transform. The variable amplitude and frequency have not only greatly improved the efficiency of the expansion, but also enabled the expansion to accommodate nonstationary data. With IMF expansion, the amplitude and the frequency modulations are also clearly separated.

Equation (13) also enables the computer implemented method to represent the amplitude and frequency as functions of time in a three-dimensional plot, in which the amplitude can be contoured on the frequency-time plane. This frequency-time distribution of the amplitude is designated as the Hilbert Amplitude Spectrum, H(ω, t), or simply Hilbert Spectrum. Thus we have:

$$H(\omega, t) = \sum_{j=1}^{n} a_j(t)e^{i\int \omega_j(t)dt} \quad (14)$$

In which H(ω, t) is the Hilbert spectrum of the frequency (ω) and time (t) and $a_j(t)$ is the j-th component of the IMF. In the presentation, the amplitude (with or without smoothing) can be expressed in color maps, black-grey maps, or contour maps. Color maps, however, greatly increase the operator's ability to fully analyze the spectrum. In some cases, a color map will permit the operator to discern relationships and trends that would not be apparent in black-grey maps thereby making a color display a necessary component in some cases.

If amplitude squared is more desirable to represent energy density, then the squared values of amplitude can be substituted to produce a Hilbert Energy Spectrum just as well.

Figure 6A:
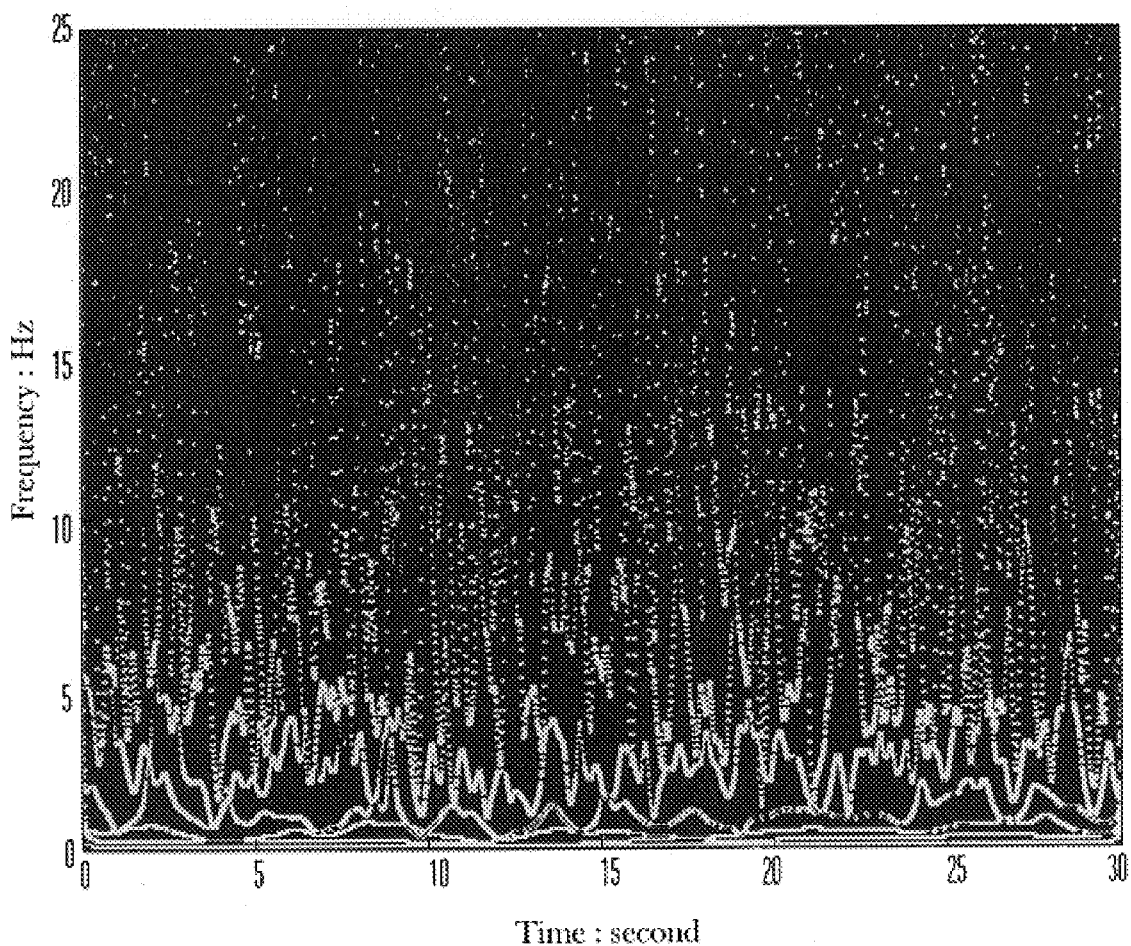
FIG. 6(a) is the Hilbert Spectrum generated by the invention from the wind speed data of FIG. 4(a)
Figure 6B:
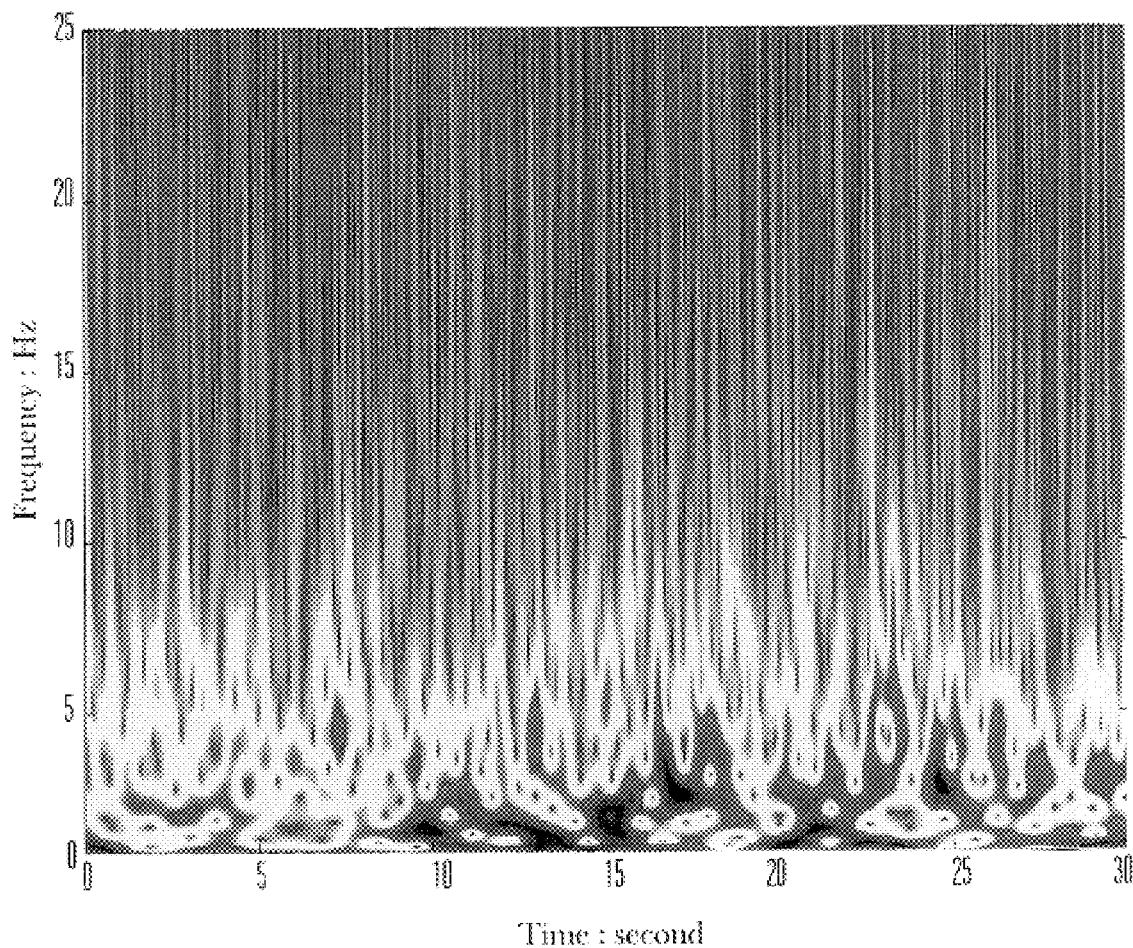
FIG. 6(b) is the conventional Morlet Wavelet spectrum generated from the wind speed data of FIG. 4(a)

Various forms of Hilbert spectra presentations can be generated by the computer in the display step 190: both color coded maps and contour maps may be employed to present the Hilbert spectra with or without smoothing. The Hilbert Spectrum in the color map format for the wind data is shown in FIG. 6(a). The Hilbert spectrum in FIG. 6(a) gives a very different appearance when compared with the corresponding Wavelet spectrum shown in FIG. 6(b). While the Hilbert Spectrum in FIG. 6(a) appears only in the skeleton form with emphasis on the frequency variations of each IMF, the Wavelet analysis result gives a smoothed energy contour map with a rich distribution of higher harmonics.

Figure 6C:
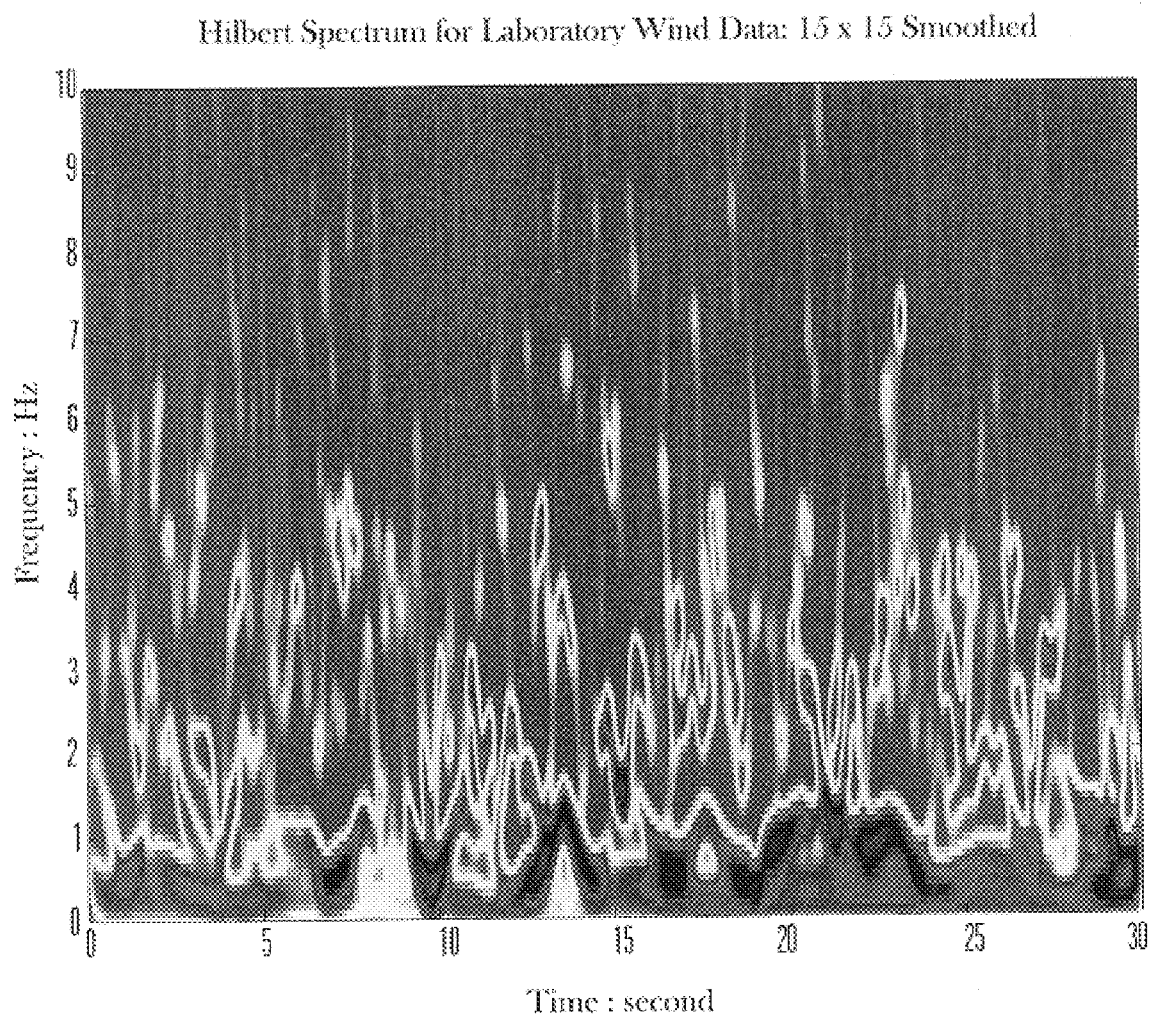
FIG. 6(c) shows the Hilbert Spectrum of FIG. 6(a) after smoothing by a 15×15 weighted Gaussian smoothing filter.

If a more continuous form of the Hilbert Spectrum is preferred, a smoothing method can be optionally applied in step 155. The first type of a smoothing method which may be used in the invention is a weighted spatial filter which averages over a range of cells. For example, a 15 by 15 weighted Gaussian filter may be employed in step 155 as is known in the art to smooth this data. FIG. 6(c) shows the result of applying the 15 by 15 weighted Gaussian filter.

Although smoothing step 155 degrades both frequency and time resolutions, the energy density and its trends of evolution as functions of frequency and time are easier to identify. In general, if more quantitative results are desired, the original skeleton presentation is better. If more qualitative results are desired, the smoothed presentation is better. As a guide, the first look of the data is better in the smoothed format.

The alternative of the spatial smoothing is to select a lower frequency resolution and leave the time axis undisturbed. The advantages of this approach are the preservation of events' locations and a more continuous frequency variation. Furthermore, a lower frequency resolution saves computation time for the computer implemented method.

To optimize such computation time, the optimal frequency resolution in the Hilbert spectrum can be computed as follows. Let the total data length be T, and the digitizing rate of the sensor be Δt. Then, the lowest frequency that can be extracted from the data is 1/T Hz, which is also the limit of frequency resolution for the data. The highest frequency that can be extracted from the data is 1/(n Δt) Hz, in which n represents the minimum number of Δt needed to define the frequency accurately.

Because the Hilbert transform defines instantaneous frequency by differentiation, more data points are needed to define an oscillation. The absolute minimum number of data points is five for a whole sine wave. Although a whole sine wave is not needed to define its frequency, many points within any part of the wave are needed to find a stable derivative. Therefore, the maximum number of the frequency cells, N, of the Hilbert spectrum should be $$N = \frac{\frac{1}{n\Delta t}}{\frac{1}{T}} = \frac{T}{n\Delta t}. \quad (15)$$

In order to make the derivative stable, the data is averaged over three adjacent cell values for the final presentation.

To illustrate, consider the wind data of FIG. 4(a) which was digitized at a rate of 0.01 seconds and has a total length of 30 seconds. Therefore, the highest frequency that can be extracted is 25 Hz. The total cell size could be 600, but they have been averaged to 200 in FIG. 6(a).

Marginal Spectrum

The marginal spectrum offers a measure of total amplitude (or energy) contribution from each frequency value. In other words, the marginal spectrum represents the cumulated amplitude over the entire data span.

As shown in FIG. 1(a), the marginal spectrum is calculated by the computer implemented method in step 145 after applying the Hilbert Transform in step 140. The marginal spectrum is the Hilbert Spectrum integrated through all time. In this simplification, the time coordinate is lost as in the Fourier spectral analysis, which leaves a summary of the frequency content of the event. Therefore, this presentation should only be used when the phenomena being analyzed is stationary. Formally, the marginal spectrum h(ω) is defined as:

$$h(\omega) = \int_0^T H(\omega, t) dt. \tag{16}$$

Because there is no analytic expression for H(w.t), the integration can only be performed in a computer as a sum.

Figure 7:
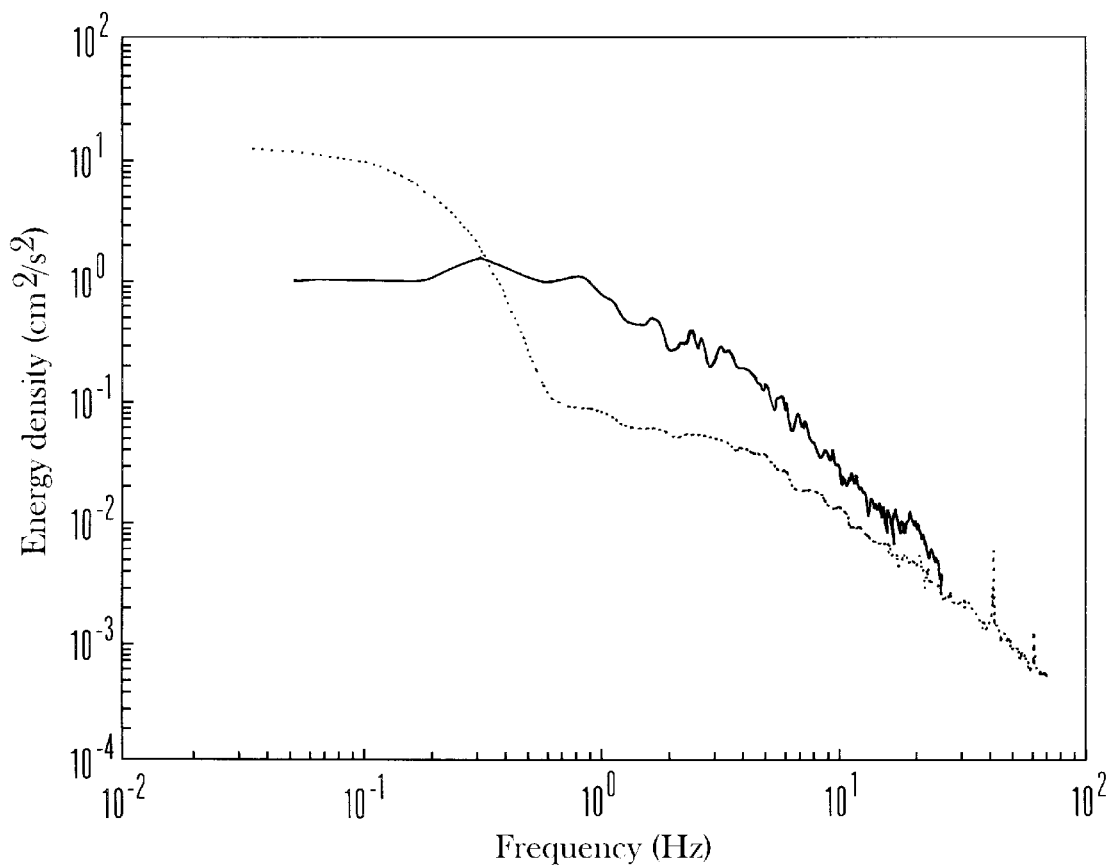
FIG. 7 is a comparison of the marginal Hilbert spectrum (solid line) and the fourier spectrum (dotted line) which were generated from the wind speed signal of FIG. 4(a)

An example of a marginal spectrum is shown in FIG. 7. More particularly, FIG. 7 shows the corresponding marginal spectrum of the Hilbert Spectrum given in FIG. 6(a).

The frequency in either H(ω, t) or h(ω) has a totally different meaning from results generated by applying Fourier spectral analysis. In the Fourier representation, the existence of energy at a frequency, ω, means a component of a sine or a cosine wave persisted through the time span of the data.

In contrast, the existence of energy at the frequency, ω, means only that, in the whole time span of the data, there is a higher likelihood for such a wave to have appeared locally. In fact, the Hilbert Spectrum is a weighted non-normalized joint amplitude-frequency-time distribution. The weight assigned to each time-frequency cell is the local amplitude. Consequently, the frequency in the marginal spectrum indicates only the likelihood of an oscillation with such a frequency exists. The exact occurrence time of that oscillation is given in the full Hilbert spectrum.

To illustrate this difference, the corresponding Fourier Spectrum of the wind speed signal is also given in FIG. 7 using a dotted line. As can be observed, there is little similarity between the Fourier spectrum and the marginal spectrum. While the Fourier spectrum is dominated by the DC term because of the non-zero mean wind speed, the marginal spectrum gives a nearly continuous distribution of energy. The Fourier spectrum is meaningless physically, because the data is not stationary. In contrast, the marginal spectrum provides a physically meaningful interpretation of the wind speed signal.

Instantaneous Frequency

There are two types of frequency modulation: the inter-wave and the intra-wave modulations. The first type is familiar because the frequency of the oscillation gradually changes as the waves disperse. Technically, in dispersive waves, the frequency is also changing within one wave, but that is generally not emphasized either for convenience, or for lack of a more precise frequency definition. The second type is less familiar, but it is also a common phenomenon: if the frequency changes from time to time within a wave, its profile can no longer be a simple sine or cosine function. Therefore, any wave profile deformation from the simple sinusoidal form implies intra-wave frequency modulation.

In the past, such phenomena were treated as harmonic distortions. Nevertheless, such deformations should be viewed as intra-wave frequency modulation because the intra-wave frequency modulation is a more physically meaningful term.

In order to understand these frequency modulations, the invention applies a unique definition of instantaneous frequency. This definition stems from the EMD method and requires the signal to be reduced into IMF components. After extracting the IMF components, an instantaneous frequency value can be assigned to each IMF component. Consequently, for complicated data in which more than one IMF may be extracted by EMD, there can be more than one instantaneous frequency at a time locally.

With the Hilbert Transform, a unique definition of instantaneous frequency may be applied by the computer implemented method as illustrated by step 160. Step 160 calculates the instantaneous frequency which is formally defined as follows:

$$\omega(t) = \frac{d\theta(t)}{dt}. \tag{17}$$

By calculating instantaneous frequency, step 160 of the invention permits the frequency value to be defined for every point with the value changing from point to point.

The validity and the implications of the instantaneous frequency for nonlinear signals may be analyzed by examining an idealized Stokes wave in deep water. The wave profile of such a Stokeian wave is modeled by $$X(t) = \cos(\omega t + \epsilon \sin \omega t) \tag{18}$$

Therefore, it is a intra-wave frequency modulated signal. Approximately, equation (18) can be shown to be:

$$X(t) = (1+\epsilon/2)\cos \omega t + \epsilon \cos 2\omega t + \ldots \tag{19}$$

Figure 9A:
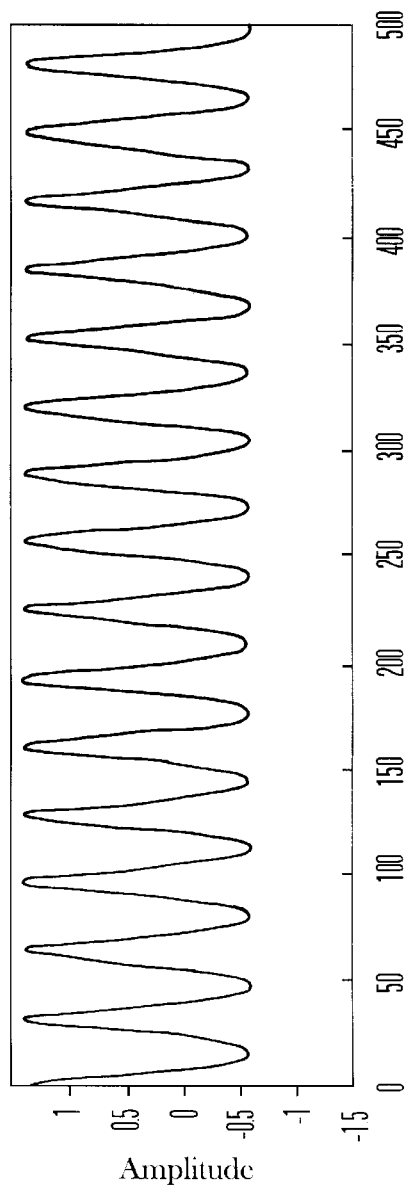
FIG. 9(a) shows the profile of a Stokes wave in deep water which may be processed by the invention.

The wave profile is also shown in FIG. 9(a). Because the intra-wave frequency can only be approximated by harmonics in Fourier analysis, we can still have the same profile, but not the same frequency content. The wave form shows sharpened crests and rounded off troughs, which make the crests and troughs asymmetric with respect to the mean surface.

Figure 9B:
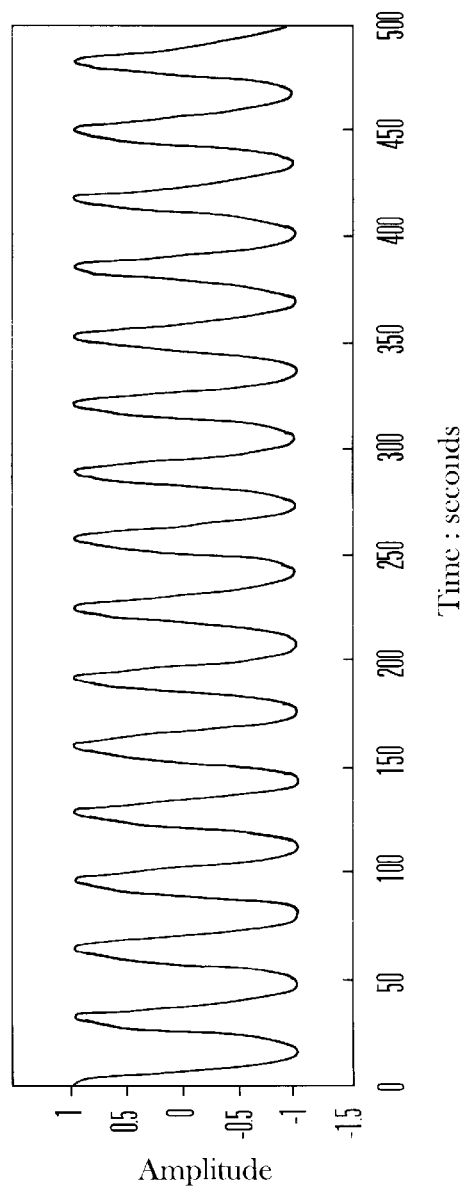
FIG. 9(b) shows the IMF generated by the invention from the Stokes wave shown in FIG. 9(a)
Figure 9C:
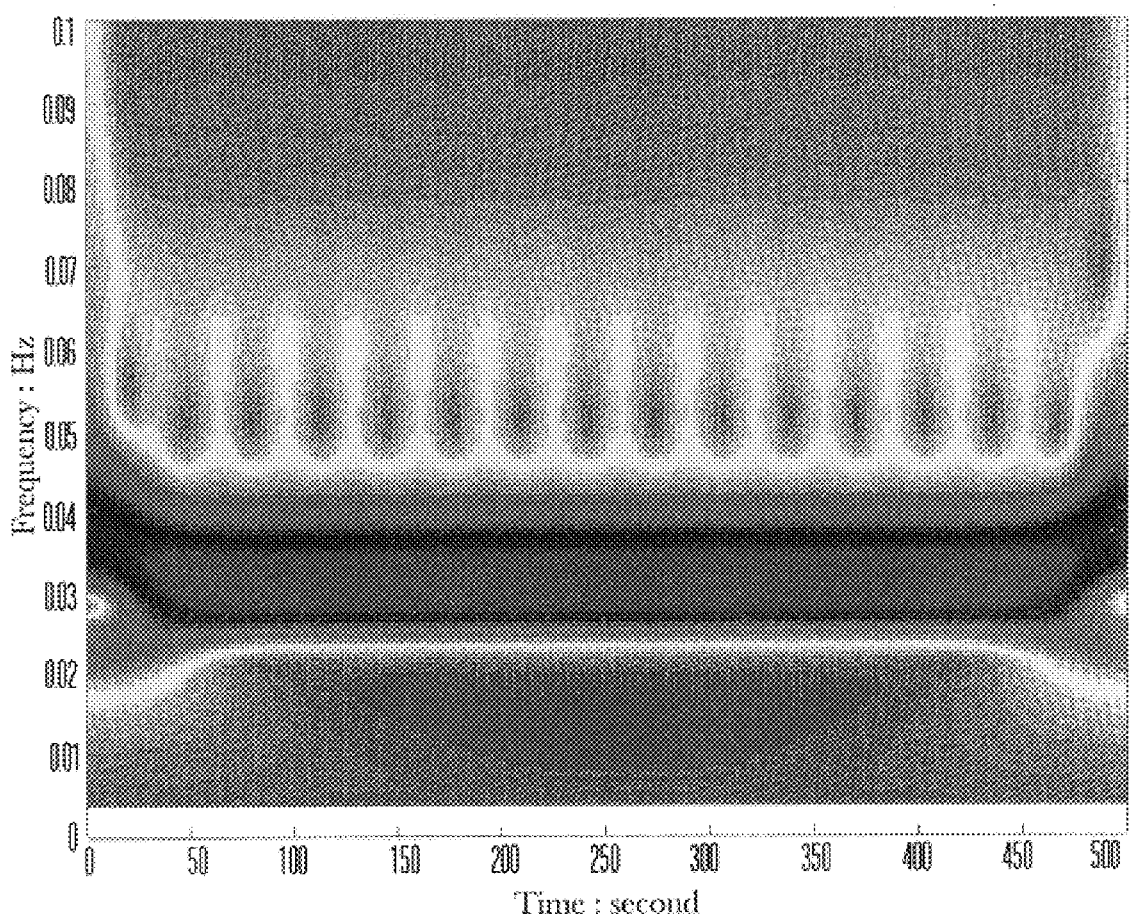
FIG. 9(c) is a conventional Morlet Wavelet spectrum of the Stokes wave shown in FIG. 9(a)

Processed with computer implemented EMD, this data yields only one IMF component as shown in FIG. 9(b), with a constant offset component (not shown). Although this wave has only one characteristic scale or IMF, the Wavelet analysis result shown in FIG. 9(c). FIG. 9(c) has many harmonics with two visible bands of energy corresponding to the highest order of approximations of the possible harmonics.

Figure 9D:
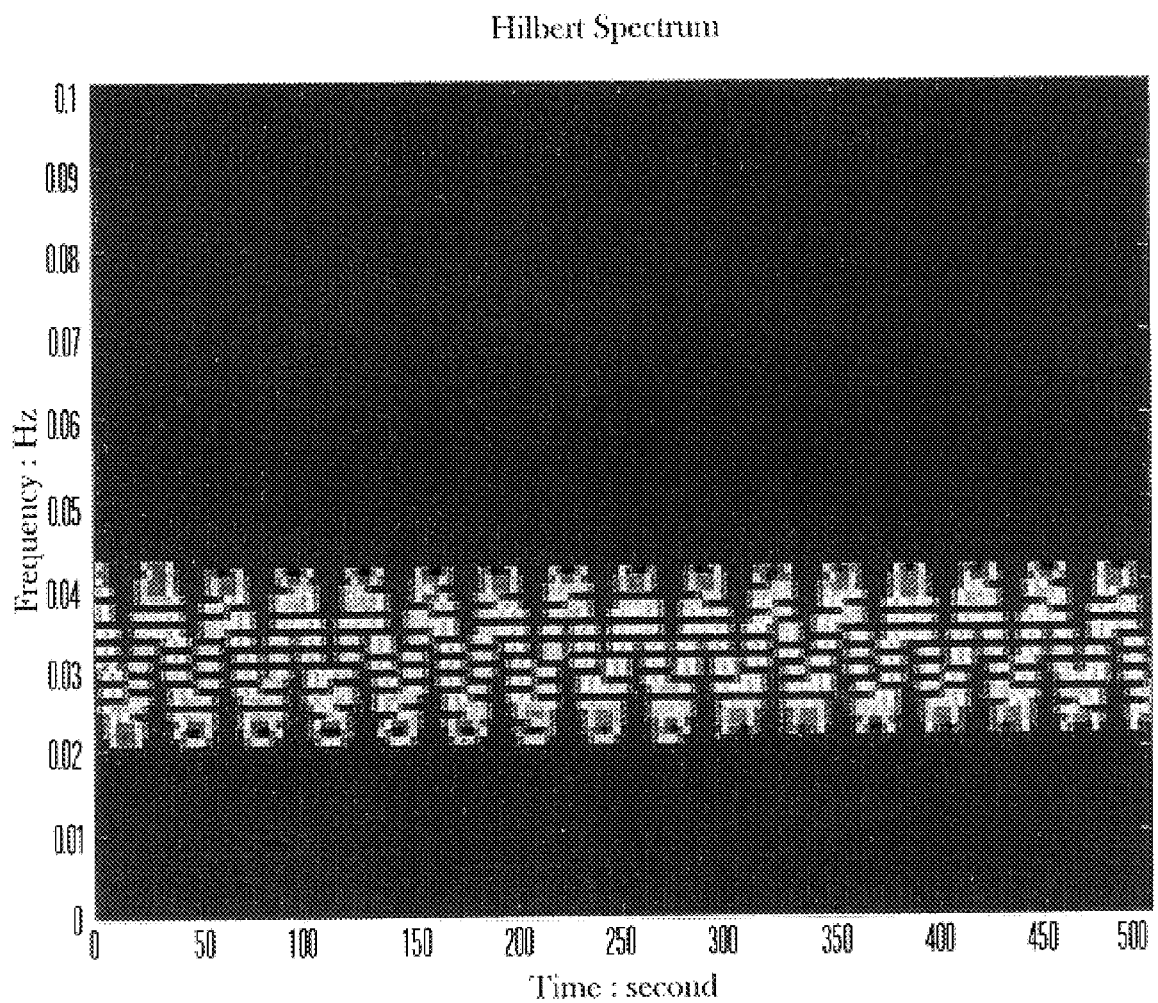
FIG. 9(d) is the Hilbert Spectrum generated by the invention from the Stokes wave shown in FIG. 9(a)

In contrast, the IMF data can be processed by the inventive method to give the Hilbert Spectrum shown in FIG. 9(d). The Hilbert Spectrum has only one frequency band centered around 0.03 Hz, the fundamental frequency of the wave train, but there is an intra-wave frequency modulation with a magnitude range of 0.02 to 0.04 Hz as the model truly represents. This intra-wave frequency modulation has been totally ignored in the past, for the traditional definition of frequency is based on the reciprocal of periodicity and Fourier Analysis.

Instantaneous Energy Density

Furthermore, the computer implemented method may also calculate the instantaneous energy density in step 150. The instantaneous energy density, IE, is defined as:

$$IE(t) = \int_\omega H^2(\omega, t) d\omega. \quad (20)$$

Still further, this instantaneous energy density depends on time. Therefore, the IE can be used to check energy fluctuations.

Stationarity

To quantitatively measure the stationarity of a physical signal, the invention utilizes step 165 to calculate various stationarity measurements. Before introducing the preferred stationarity measurements, a brief review of conventional stationarity measurements is presented.

The classic definitions of stationarity are dichotomous: a process is either stationary or nonstationary. This crude definition is only qualitative in nature. Such definitions are both overly stringent and useless at the same time: few data sets can satisfy the rigor of these definitions; consequently, no one even bothers using them to check stationarity of the signal. As a result, data as nonstationary as earthquake and seismological signals are routinely treated as stationary (see, for example, Hu, et al., 1996., *Earthquake Engineering*. Chapman & Hall, London).

Sometimes, for some obviously nonstationary data, two less stringent definitions are invoked: piece-wise stationary and asymptotically stationary. These definitions are still dichotomous.

To quantify the statistical processes further, an index is needed to give a quantitative measure of how far the process deviates from stationarity. A prerequisite for such a definition is a method to present the data in the frequency-time space.

With the energy-frequency-time distribution (Hilbert Spectrum) described above, stationarity of the physical signal may be quantitatively determined. Therefore, the invention introduces an index of stationarity as follows and calculates a Degree of Stationarity in step 165.

The first step in defining the Degree of Stationarity, $DS(\omega)$, is to find the mean marginal spectrum, $n(\omega)$, as $$n(\omega) = \frac{1}{T} h(\omega). \quad (21)$$

Then, the Degree of Stationarity may be defined as:

$$DS(\omega) = \frac{1}{T} \int_0^T \left(1 - \frac{H(\omega, t)}{n(\omega)}\right)^2 dt, \quad (22)$$

Again, the value of $DS(\omega)$ can be determined by the computer. Therefore, the specialized computer 410 according to the invention can be treated as a stationary meter.

For a stationary process, the Hilbert spectrum cannot be a function of time. Then, the Hilbert Spectrum will consist of only horizontal contour lines and $DS(\omega)$ will then be identically zero. Only under this condition will the marginal spectrum be identical to the Fourier spectrum, then the Fourier spectrum will also make physical sense. On the other hand, if the Hilbert spectrum depends on time, the index will not be zero, then the Fourier spectrum will cease to make physical sense.

Figure 8A:
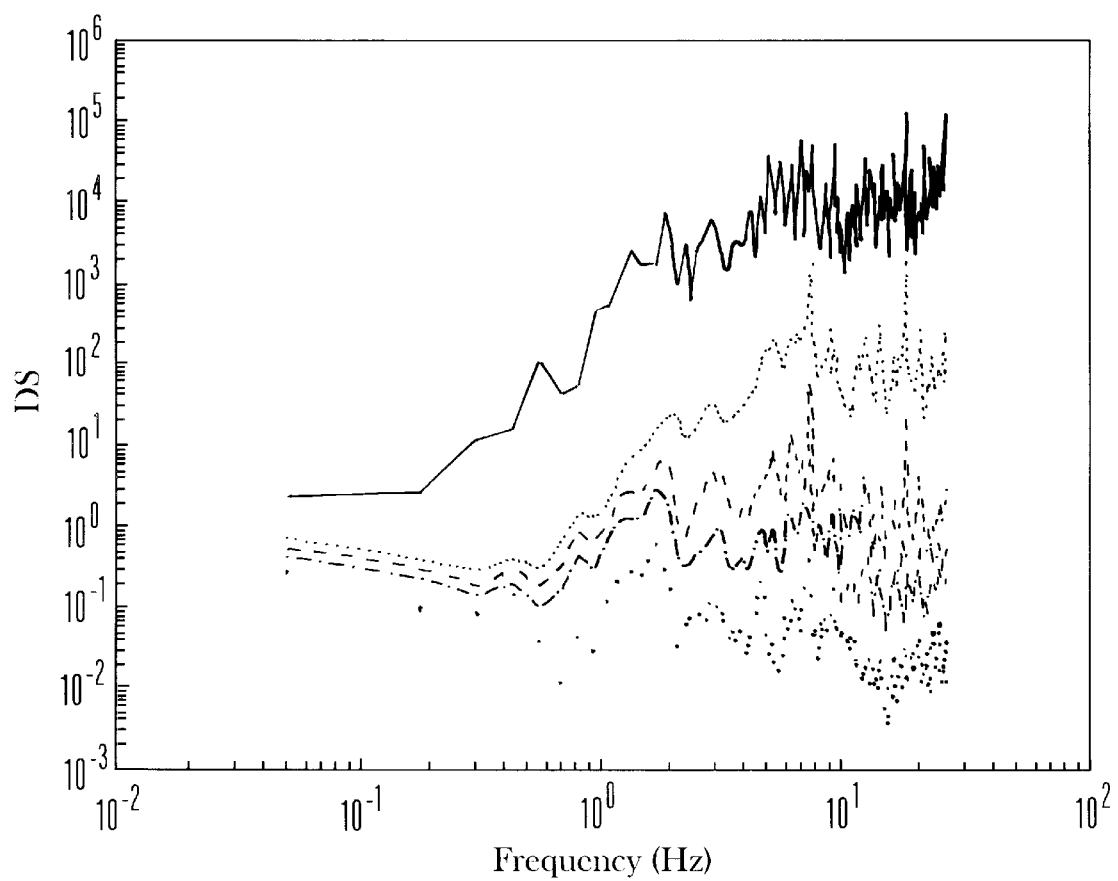
FIG. 8(a) is a graph illustrating the Degree of Stationarity and Degree of Statistical Stationarity which were generated from the wind speed signal of FIG. 4(a) with time averages of 10, 50, 100 and 300.
Figure 8B:
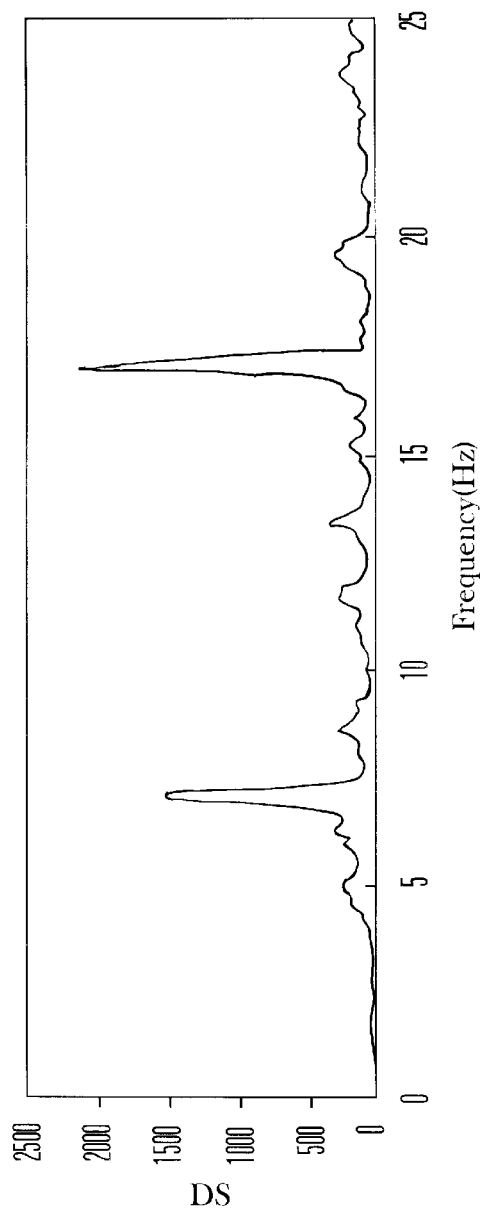
FIGS. 8(b) and (c) are sections of the wind speed data that was used by the invention to produce the Degree of Stationarity shown in FIG. 8(a)
Figure 8C:
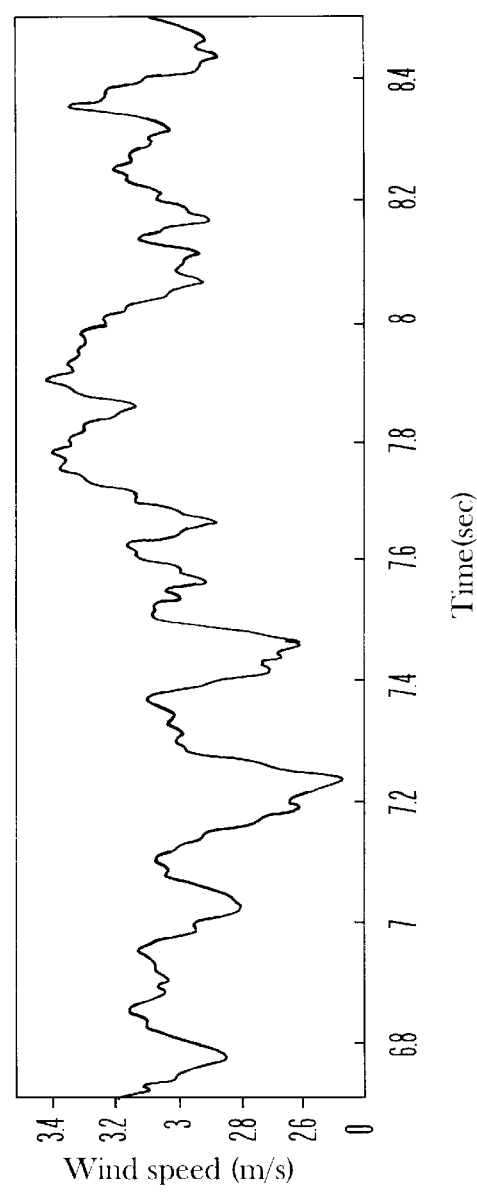

In general, the higher the index value, the more nonstationary is the process. The DS for the wind data is shown in FIG. 8(*a*). As the index shows, the data are highly nonstationary especially for the high frequency components.

Eq. (22) defines the stationarity as a function of frequency. This is necessary because certain frequency components can be nonstationary while other components remain stationary. An example is sporadic riding wind-generated waves on otherwise uniform swell: the low frequency swell component is stationary, while the high frequency wind waves are intermittent, and hence nonstationary.

The degree of stationarity can also be a function of time implicitly, for the definition depends on the time length of integration in Eq. (22). Therefore, a process can be piecewise stationary. On the other hand, for a singular outburst in an otherwise stationary signal, the process can be regarded as almost stationary if a long time integral is performed, but nonstationary the integral only encompasses the immediate neighborhood of the outburst.

Stationarity can be a complicated property of the process: for any signal shorter than a typical long wave period, the process may look transient. Yet as the signal length gets longer, the process can have many longer wave periods and becomes stationary. On the other hand, the signal can be locally stationary while in a long time sense nonstationary. An index is therefore not only useful but also necessary to quantify the process and give a measure of the stationarity.

The invention also calculates a Degree of Statistic Stationarity in step 165. The degree of stationarity defined in Eq. (22) can be modified slightly to include statistically stationary signals, for which the Degree of Statistic Stationarity, $DSS(\omega, \Delta T)$, is defined as $$DSS(\omega, \Delta T) = \frac{1}{T} \int_0^T \left(1 - \frac{\overline{H(\omega, t)}}{n(\omega)}\right)^2 dt, \quad (23)$$

where the over-line indicates averaging over a definite but shorter time span, $\Delta T$, than the overall time duration of the data, T. For periodic motions, the $\Delta T$ can be the period. Such a time scale, however, is hard to define precisely for high dimensional, nonstationary dynamic systems.

Even with this difficulty, the definition for DSS could be more useful in characterizing random variables from natural phenomena. Furthermore, DSS will depend on both frequency and the averaging time span. For the wind data taken as an example, the DSS is given in FIG. 8(*a*) with $\Delta T=10$, 50, 100, and 300 time steps respectively. The results show that while the high frequency components are nonstationary, they can still be statistically stationary. Two frequency bands at 7 and 17 Hz are highly nonstationary as the DSS averaged at 100 time steps shown in FIG. 8(*b*). These components are intermittent as can be seen in the IMF components and the marginal spectrum. A section of the original wind data is also plotted in FIG. 8(*c*) to demonstrate that there are indeed prominent 7 and 17 Hz time scale oscillations.

Display of Selected Results

The invention displays various results of the above-described computer implemented method in step 190. These displays are extremely useful in analyzing the underlying physics of the physical phenomenon being studied as described above. Furthermore, particular examples of these displays and the increased understanding of the underlying physics which these displays permit are discussed in the following section.

For example, the invention generates various Hilbert spectra displays in the display step 190. As mentioned above, both color coded maps and contour maps may be employed to display the Hilbert spectra in display step 190. In addition, the color coded maps convey information to the operator in a uniquely accessible way permitting a more thorough and deeper understanding of the physical phenomenon and may be considered as necessary to analyze some physical phenomena.

The displays generated by the invention in display step 190 are central to the invention because they allow an operator to analyze the underlying physics of the physical phenomenon being studied.

The display step 190 outputs displays to display 450. As mentioned above, display 450 includes devices such as a cathode ray tube and a flat panel display. As an alternative, display step 290 may generate a hard copy output by utilizing printer 460 or may send the generated display to output device 470.

Observational Data from Laboratory and Field Experiments

This section discusses a variety of geophysical energy signals which illustrate the usefulness of the invention.

Earthquake Signals

One particular application of the invention to geophysical signals is the analysis of earthquakes. As mentioned above, conventional methods cannot reveal detailed information in the dispersion properties, the wave form deformation, and the energy-frequency distribution of earthquakes because the signals representing the earthquake are nonlinear and nonstationary.

As explained above, both nonstationarity and nonlinearity can induce artificial frequency smearing and reduce the true energy density of the earthquake signal.

To illustrate the advantages of the computer implemented method disclosed herein, the following analyzes the well-tested data from the El Centro earthquake.

Figure 10A:
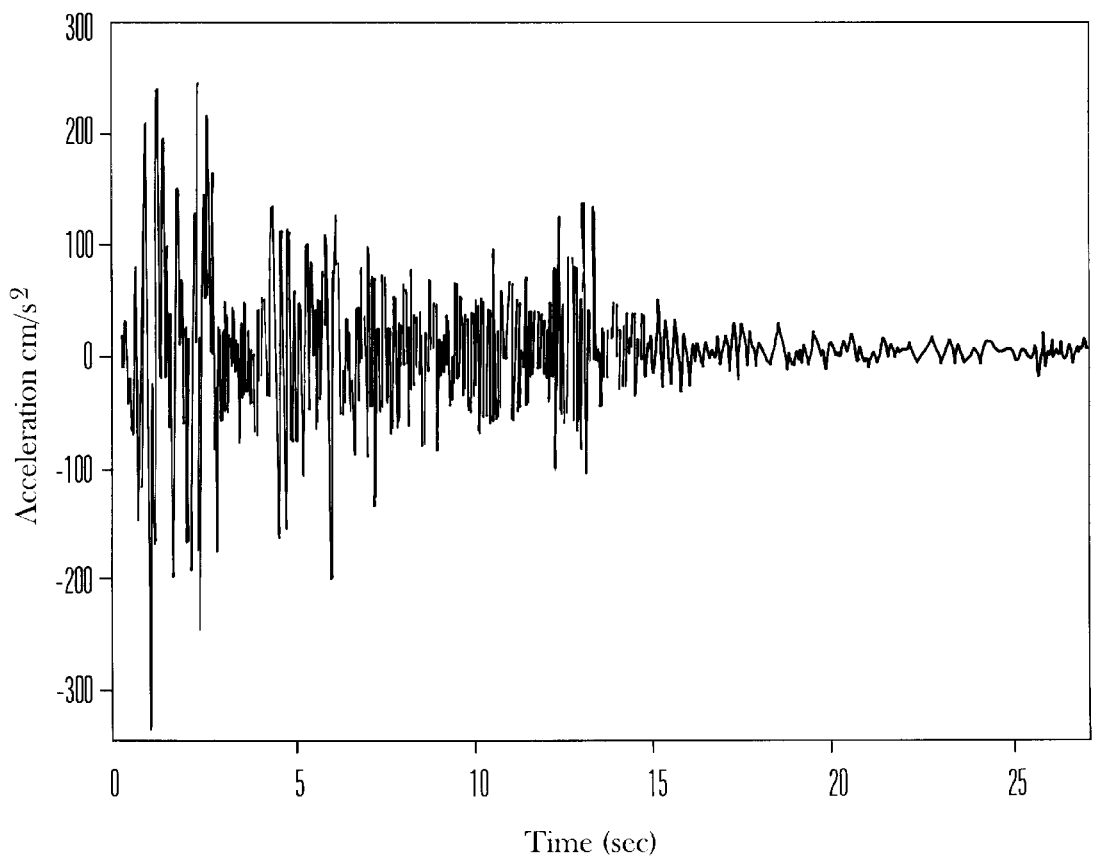
FIG. 10(a) is an earthquake signal representative of the El Centro earthquake.
Figure 10B:
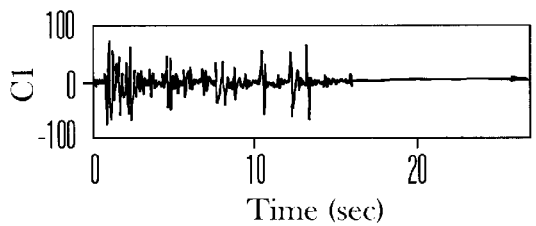
FIGS. 10(b)–(k) show the ten intrinsic mode functions which are extracted from the El Centro earthquake signal by the EMD method of the invention.
Figure 10G:
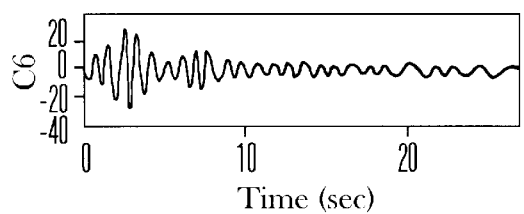
Figure 10C:
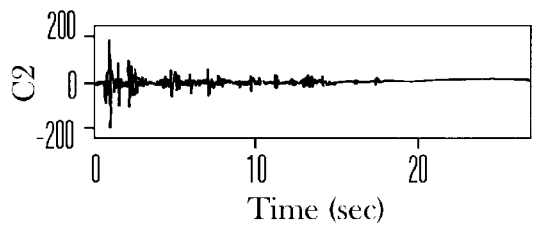
Figure 10H:
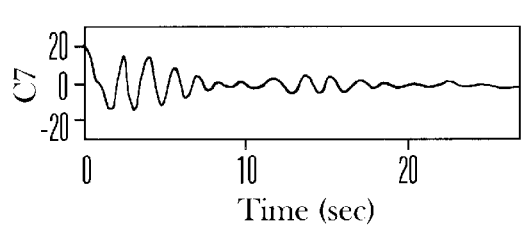
Figure 10D:
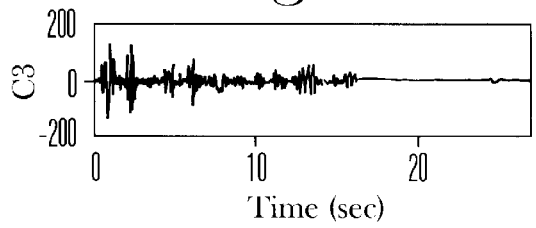
Figure 10I:
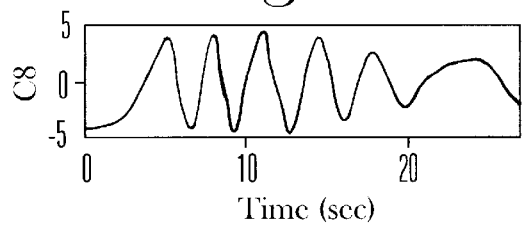
Figure 10E:
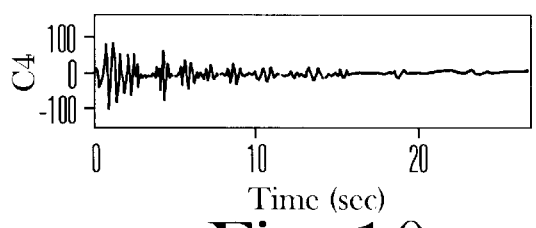
Figure 10J:
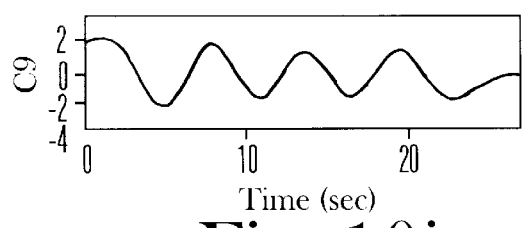
Figure 10F:
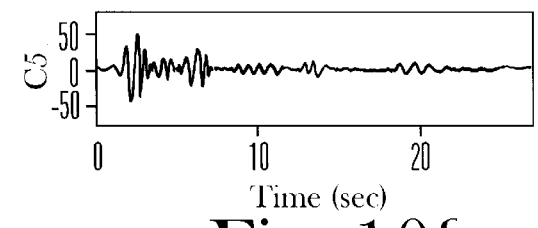
Figure 10K:
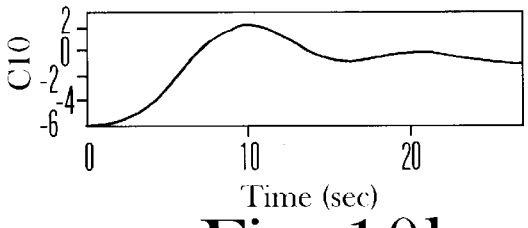
Figure 11A:
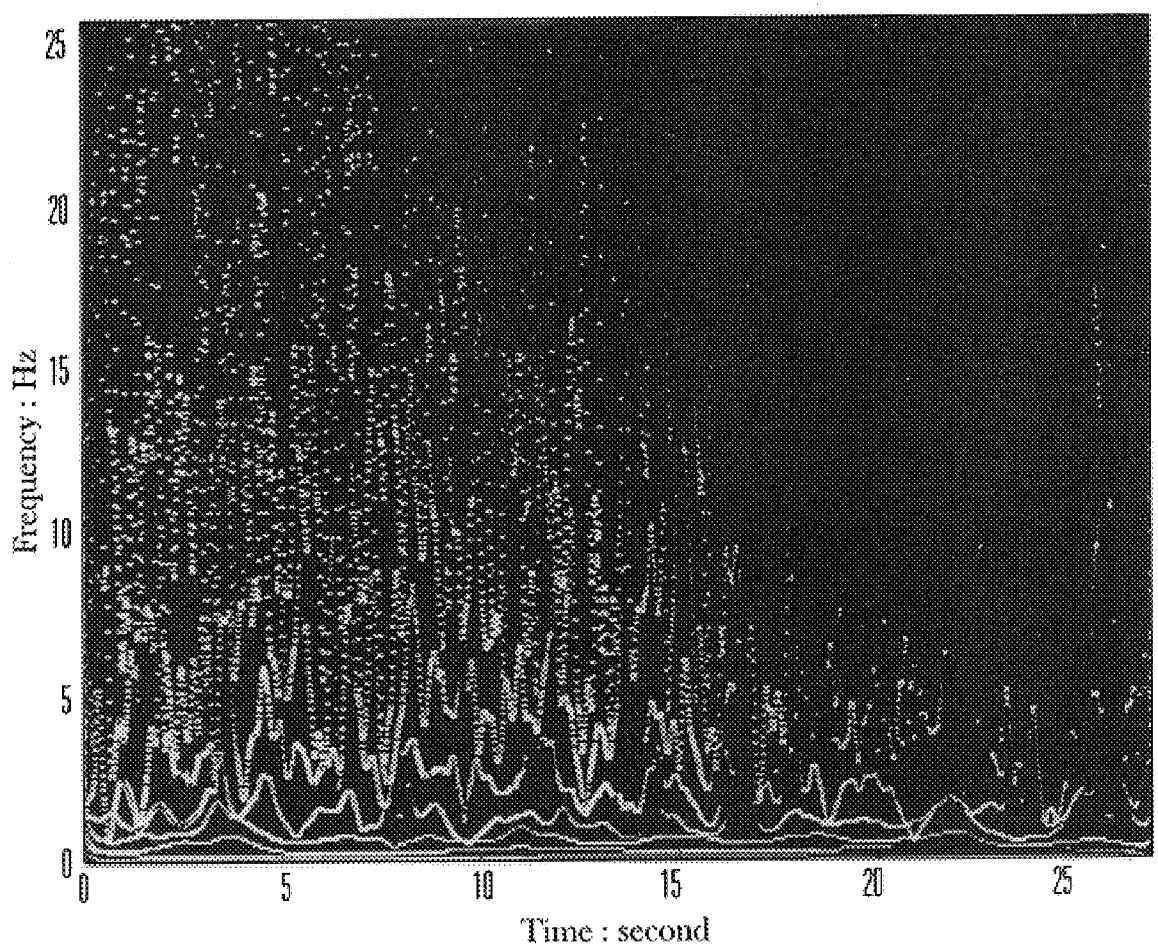
FIG. 11(a) is the Hilbert Spectrum generated by the invention from the El Centro earthquake signal shown in FIG. 10(a)

The original El Centro earthquake signal is shown in FIG. 10(a). These signals, when decomposed by computer implemented EMD, produce ten IMF components as shown in FIGS. 10(b)–(k). Furthermore, the corresponding Hilbert spectrum may be determined as shown in FIG. 11(a). From the Hilbert spectrum, one can see the diffused energy in the high frequency range, while persistent energy resides along horizontal belts below 1 Hz.

Figure 11B:
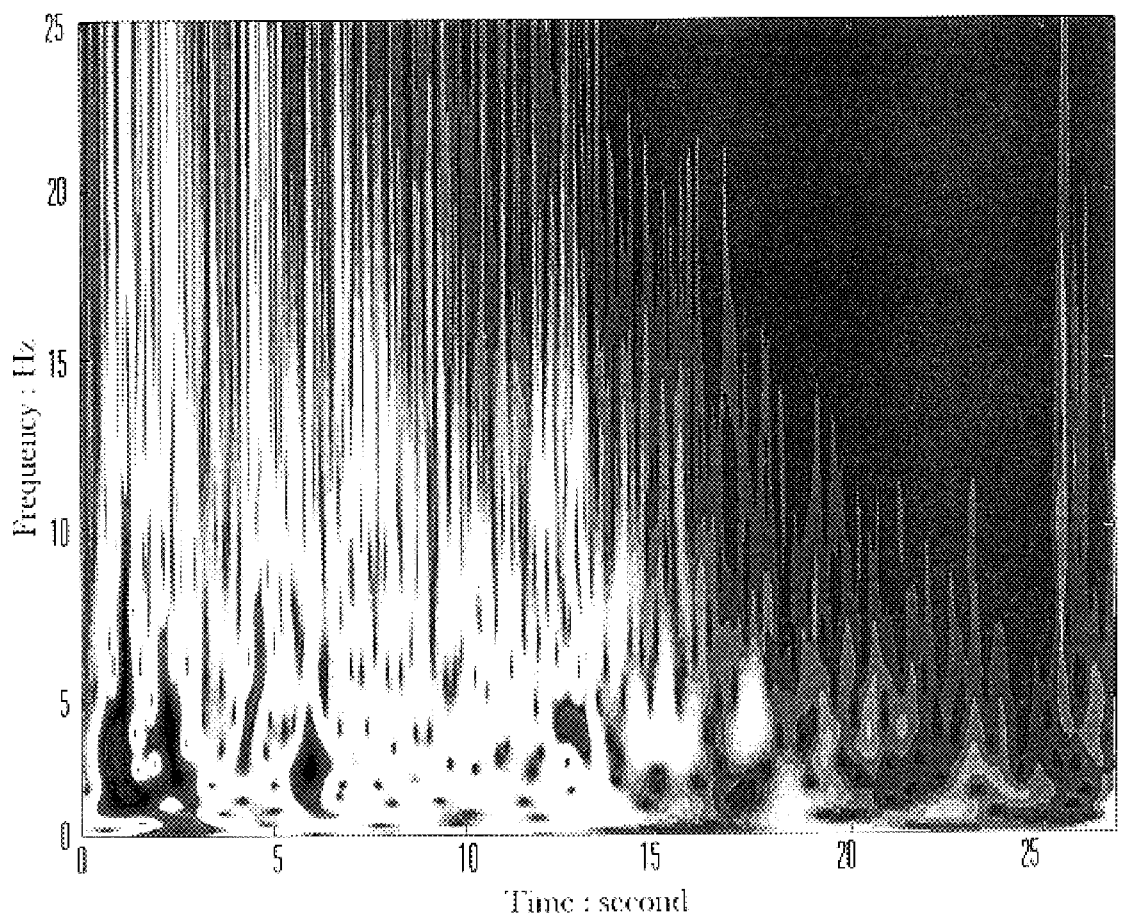
FIG. 11(b) is a conventional Morlet Wavelet spectrum of the El Centro earthquake signal shown in FIG. 10(a)

To assure the Hilbert spectrum is a valid representation of the energy-frequency-time distribution, a standard Morlet Wavelet analysis was applied to the same data. The result is given in FIG. 11(b). Direct comparison between the Hilbert spectrum and the Wavelet analysis is not easy, for the Hilbert spectrum gives too many details.

Figure 11C:
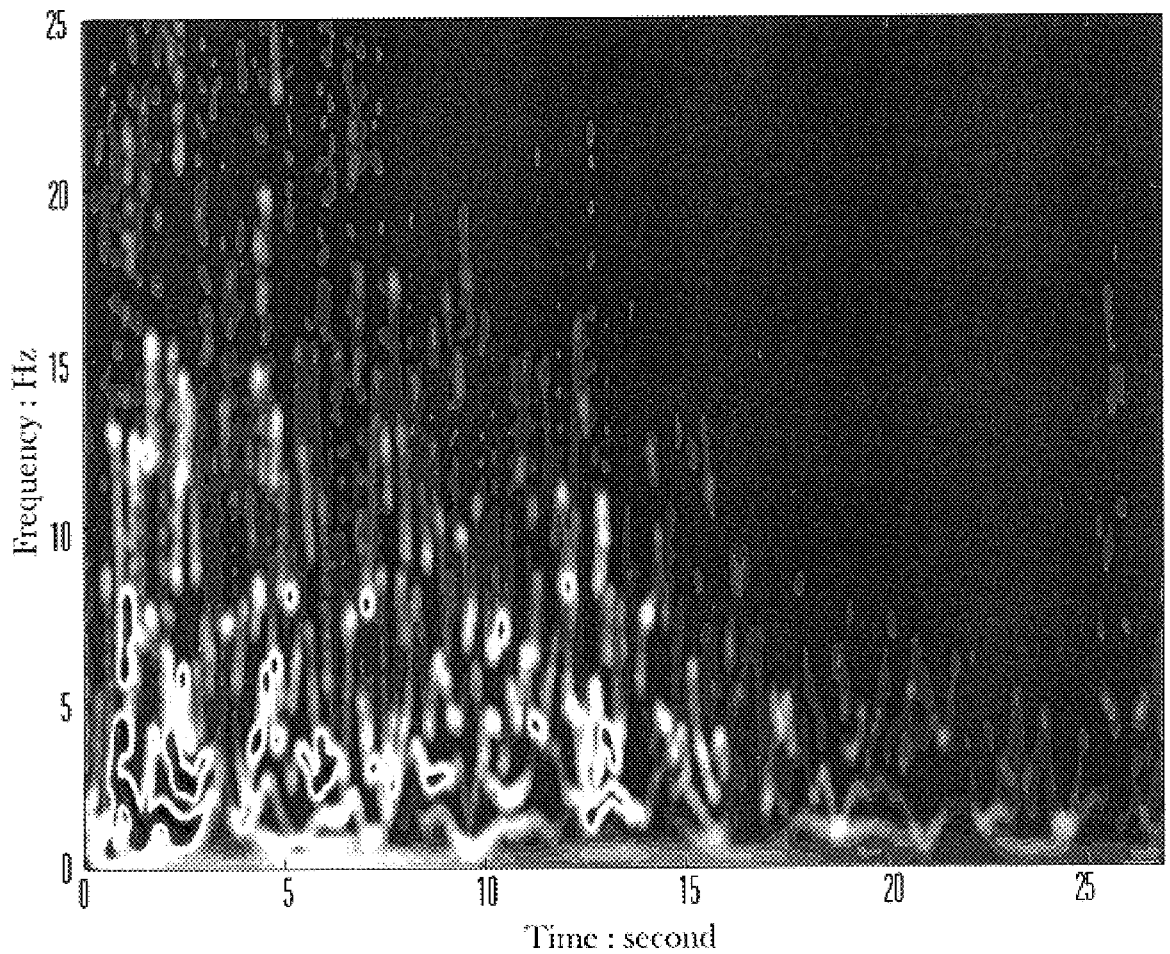
FIG. 11(c) shows the Hilbert Spectrum of FIG. 11(a) after smoothing by a 15×15 weighted Gaussian smoothing filter.
Figure 12A:
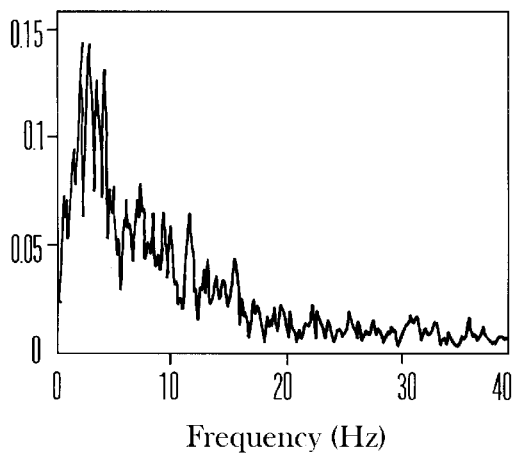
FIGS. 12(a)–(d) compare the marginal Hilbert spectrum with the fourier spectrum of the El Centro earthquake signal with FIG. 12(a) showing the fourier spectrum with full frequency range, FIG. 12(b) showing the fourier spectrum for the detailed 5 Hz range, FIG. 12(c) showing the marginal spectrum with full frequency range, FIG. 12(d) showing the marginal spectrum for the detailed 5 Hz range.
Figure 12B:
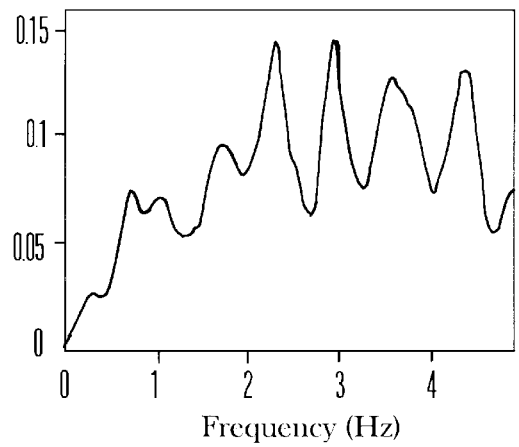
Figure 12C:
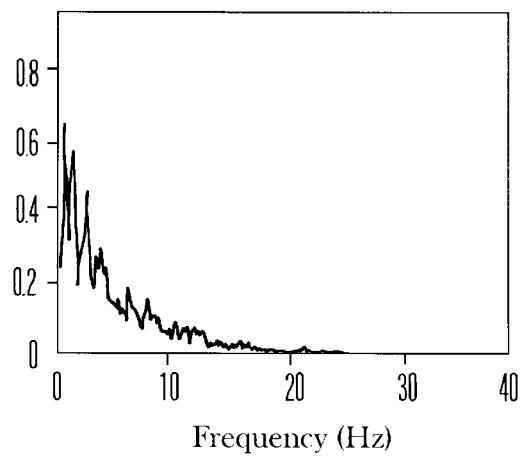
Figure 12D:
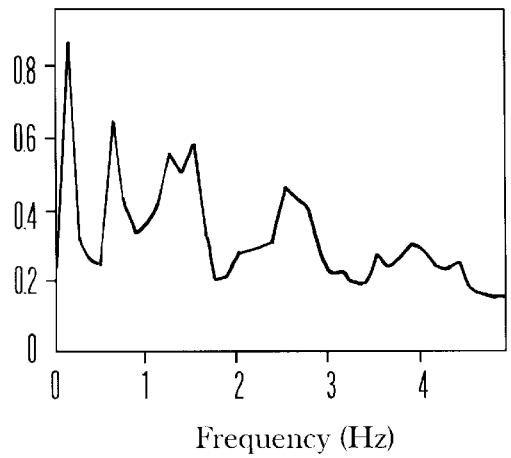
Figure 13A:
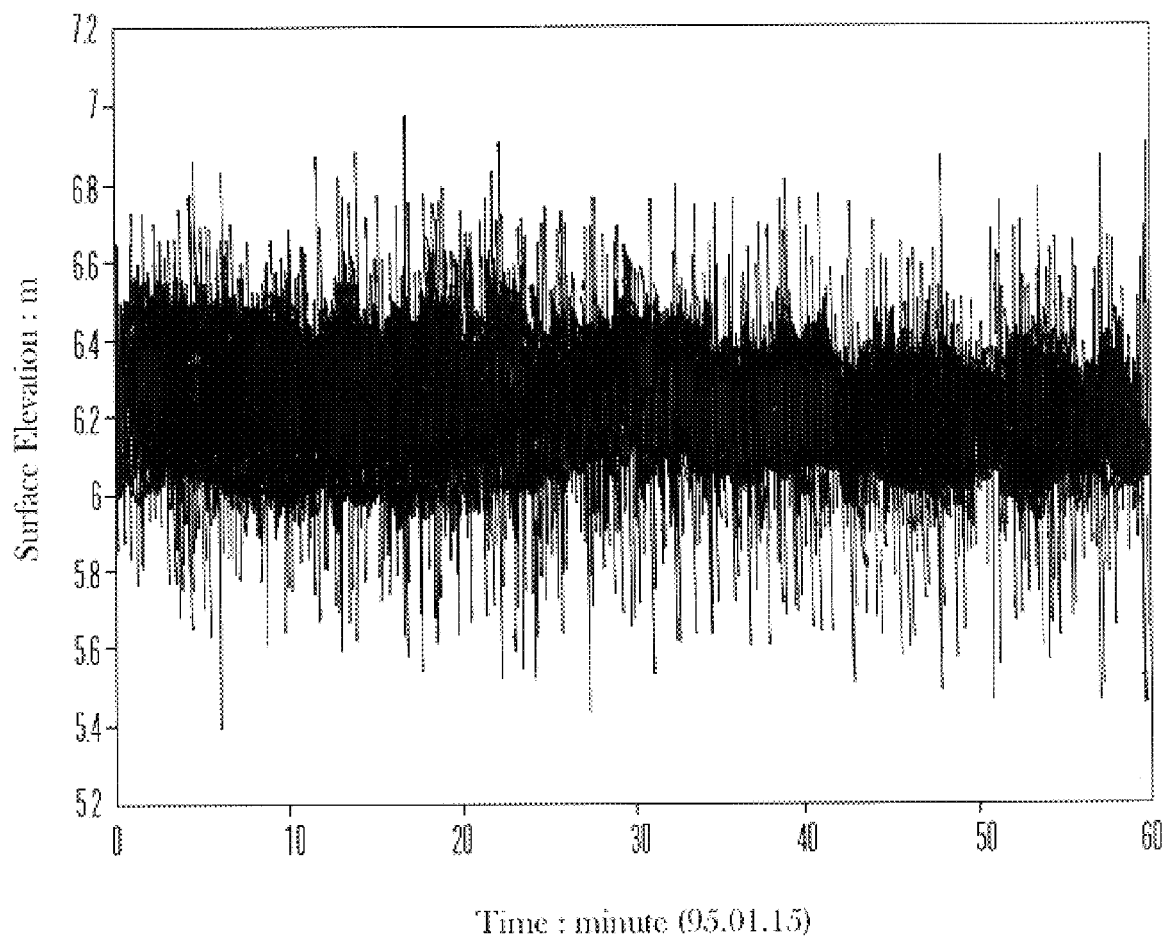
FIG. 13(a) is an ocean wave signal taken from a tidal station.
Figure 13B:
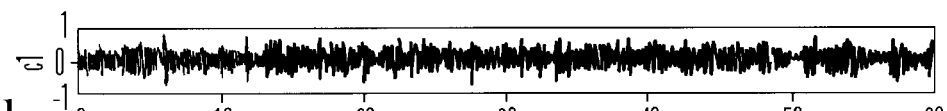
FIGS. 13(b)–(i) show the eight intrinsic mode functions which are extracted from the ocean wave signal of FIG. 13(a) by the EMD method of the invention.
Figure 13C:
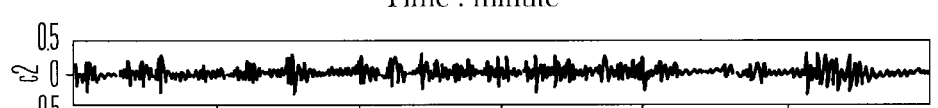
Figure 13D:
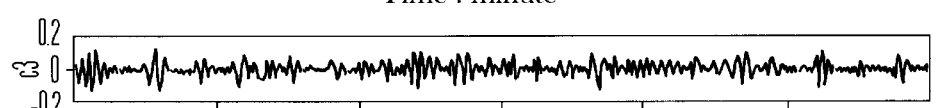
Figure 13E:
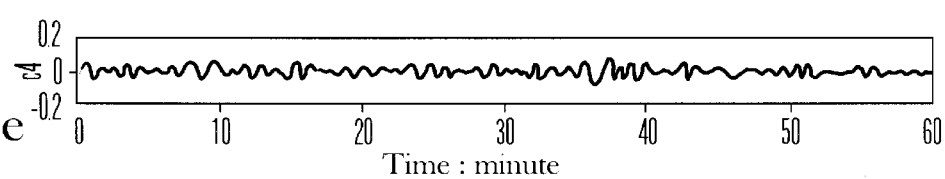
Figure 13F:
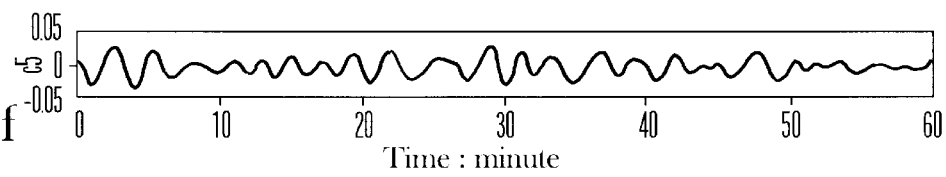
Figure 13G:
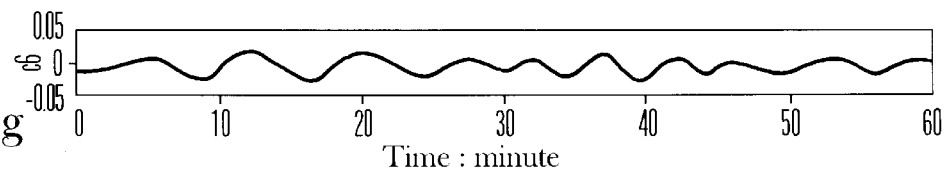
Figure 13H:
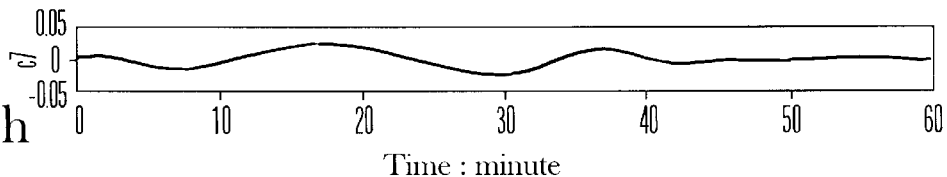
Figure 13I:
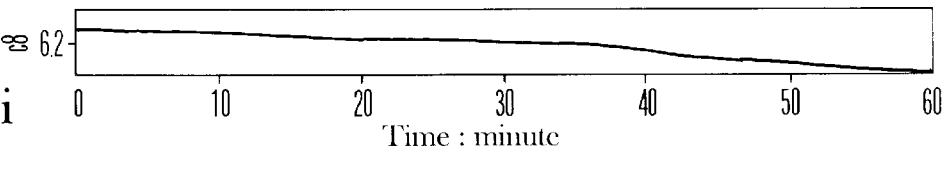

A 15×15-point smoothing performed in step 155 results in the smoothed spectrum shown in FIG. 11(c). Now the similarity is reassuring: they show a similar pattern of energy concentration in the low frequency range. But the difference really calls for alternatives: being Fourier based, the Wavelet result gives much more pronounced high frequency components than does the Hilbert spectrum, a built-in deficiency in the Fourier analysis.

Other than the Hilbert spectrum, the marginal spectrum and the corresponding Fourier spectrum are presented in FIG. 12(a)–(d). Although the results are presented with linear scales and in terms of frequency rather than period, the energy-frequency distribution with further smoothing is consistent with the previous analyses of the data shown in Newmark, N. M. and E. Rosenblueth, 1971, "Fundamentals of Earthquake Engineering", Prentice-Hall, Englewood Cliffs. N.J. The Fourier spectrum has a much wider energy distribution. Consequently, the energy content for any frequency is also much lower than the corresponding values in the Hilbert spectrum. Furthermore, the two spectra have drastically different energy distribution patterns caused by the tendency of energy smearing of the Fourier spectrum. While both spectra give a decreasing trend in energy density as a function of frequency, the Fourier spectrum shows a conspicuous lack of energy in the low frequency range (less than 1 Hz), as shown in the detailed spectra covering only 0 to 5 Hz frequency range. The low frequency range critical to high-rise buildings is severely under-represented.

This peakiness of energy located at a very narrow frequency range can cause resonance oscillation of buildings, and has been observed at Mexico City during the 1985 earthquake to have caused great destruction. The oscillation could not be duplicated by any linear model. The new Hilbert spectral analysis introduced here clearly identifies the new oscillation mode. Such oscillation modes would have been totally obscured by Fourier spectral analysis. From the Fourier spectra, there are no clear cut corner frequency or frequencies for one to construct the envelope spectrum (Aki and Richards, 1980, "Quantitative Seismology", W. H. Freeman, San Francisco). There are also no discernible stationary segments as postulated by the time history envelope method.

Water Wave Signals

Another application of the computer implemented method is water wave propagation. As mentioned above, the frequency of water waves will downshift as they propagate due to the interaction of weakly nonlinear wavetrains. Known data analysis techniques, however, has rendered proof of this theory nearly impossible.

With the resolution power of the present invention, however, it is possible to show that the wave evolution process is not continuous and gradual, but local and discrete: that the well-known frequency downshift is a cumulation of discrete fusion of n to (n−1) waves, also known as 'crest pairing' (Ramamonjiarisoa and Mollo-Christensen, 1979, "Modulation Characteristics of Sea Surface Waves", J. Geophys. Res., 84, 7,769–7,775. ), and 'lost crest' (Lake and Yuan, 1978, "A New Model for Nonlinear Gravity Waves, Part I., Physical Model and Experimental Evidence", J. Fluid Mech., 88, 33–62). Some results previously reported by Huang, et al., 1996, "The Mechanism for Frequency Downshift in Nonlinear Wave Evolution", Adv. Appl. Mech., 32, 59–111, illustrate this application of the Hilbert spectral analysis.

Figure 15A:
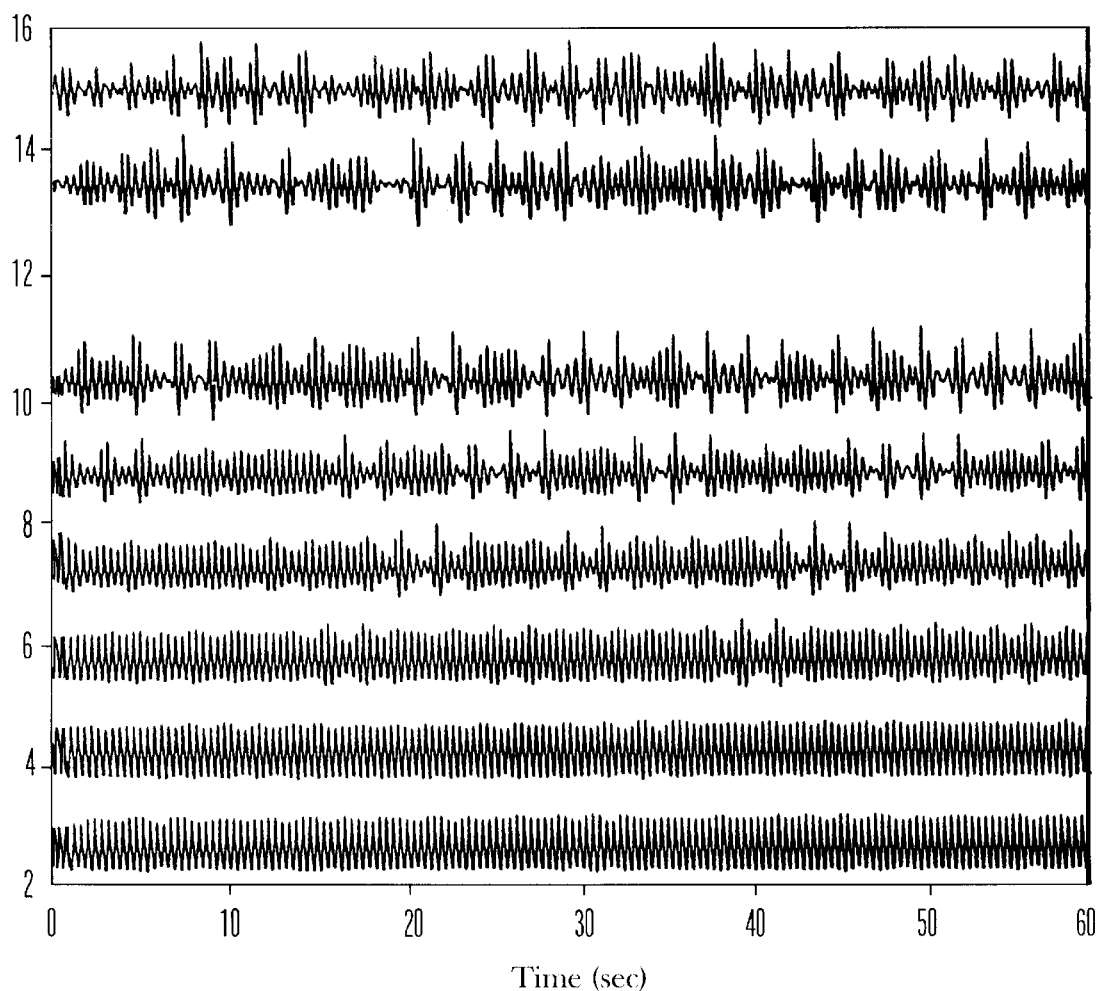
FIG. 15(a) is a water wave signal representing a water surface elevation changes from mechanically generated water waves.

The data were collected in the wind-wave tank at NASA Wallops Flight Facility (Huang and Long, 1980, "An Experimental Study of Surface Elevation Probability Distribution and Statistics of Wind Generated Waves", J. Fluid Mech., 101, 179–200; and Huang, et al., 1996, "The Mechanism for Frequency Downshift in Nonlinear Wave Evolution", Adv. Appl. Mech., 32, 59–111). Surface elevations were recorded at eight stations along the tank for a mechanically generated sinusoidal wave. Huang, et al., 1996, "The Mechanism for Frequency Downshift in Nonlinear Wave Evolution", Adv. Appl. Mech., 32, 59–111 used the Hilbert transform and examined the change of the phase of the wave trains. The waves are mechanically generated by a wave-maker driven at 2.5 Hz with the raw data of the test for all eight stations given in FIG. 15(a).

Figure 15B:
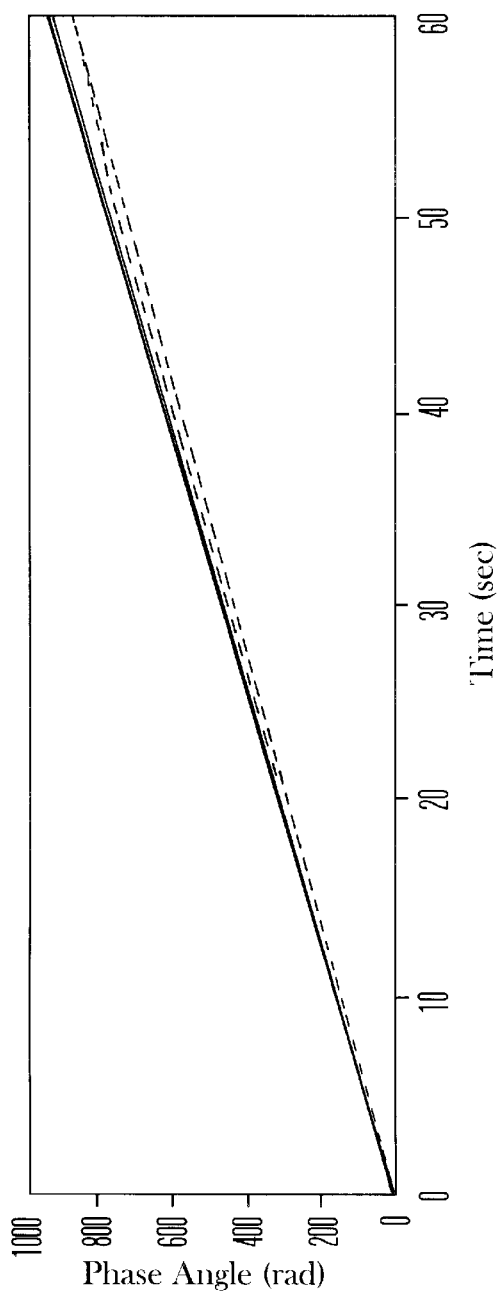
FIG. 15(b) shows the unwrapped phase functions generated from the water wave signal of FIG. 15(a)
Figure 15C:
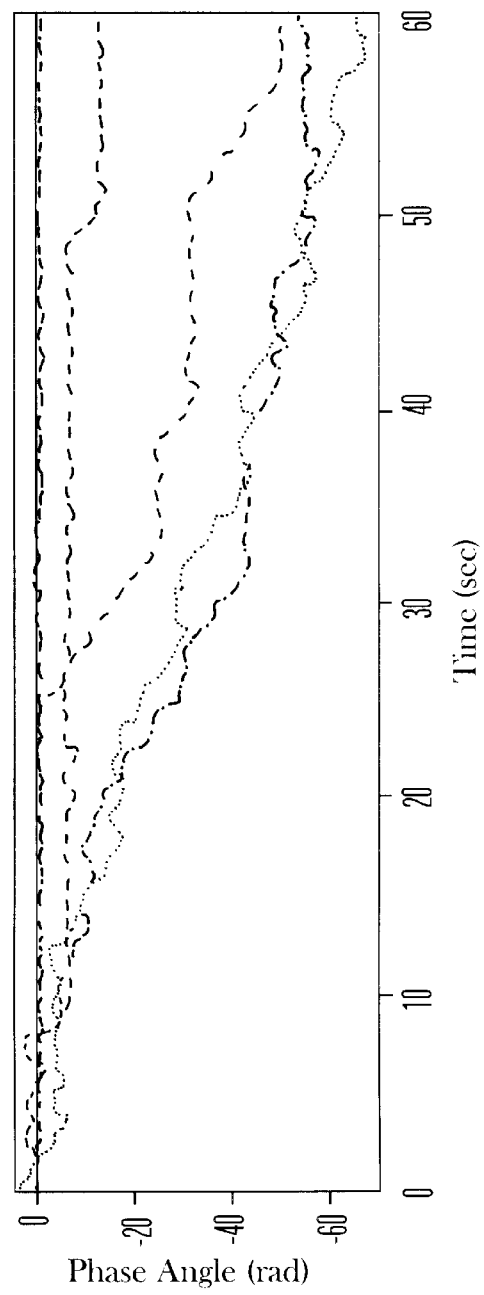
FIG. 15(c) shows the phase change relative to the values at station 1 which senses the water wave signal shown in FIG. 15(a)
Figure 15D:
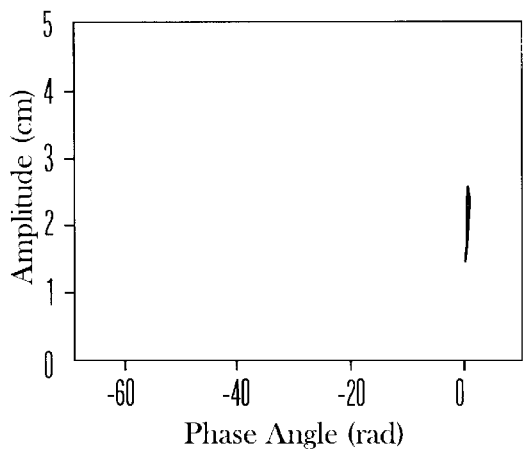
FIGS. 15(d)–(g) are phase amplitude diagrams for stations 2,4,5 and 6, respectively each of which senses the water wave signal shown in FIG. 15(a) at a different location.
Figure 15E:
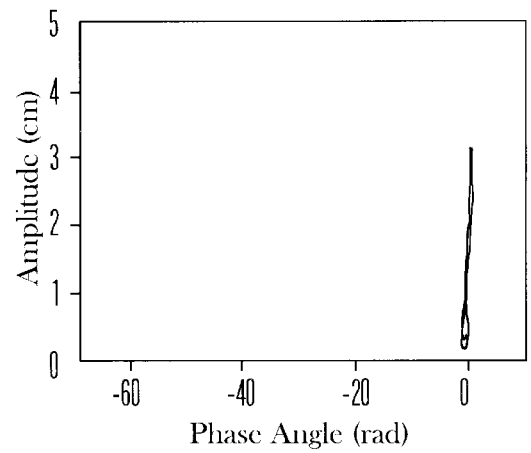
Figure 15F:
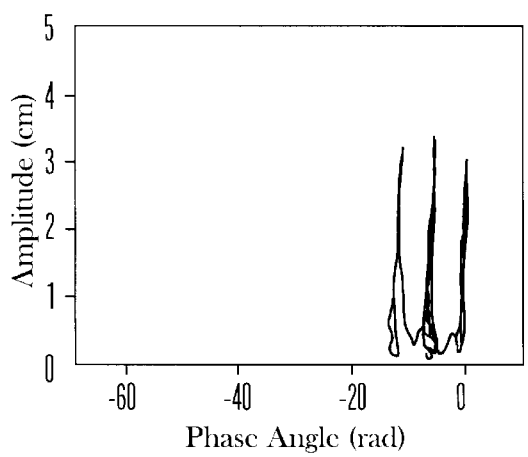
Figure 15G:
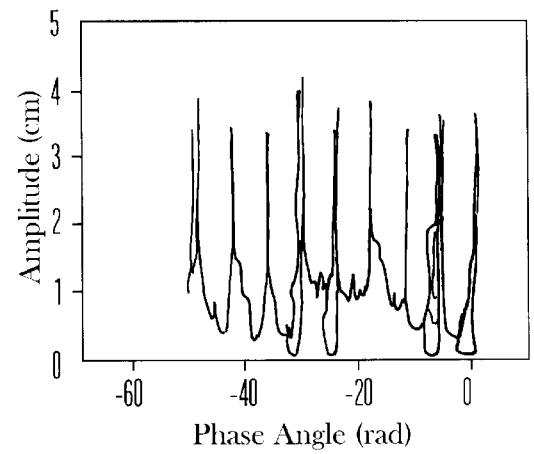
Figure 15H:
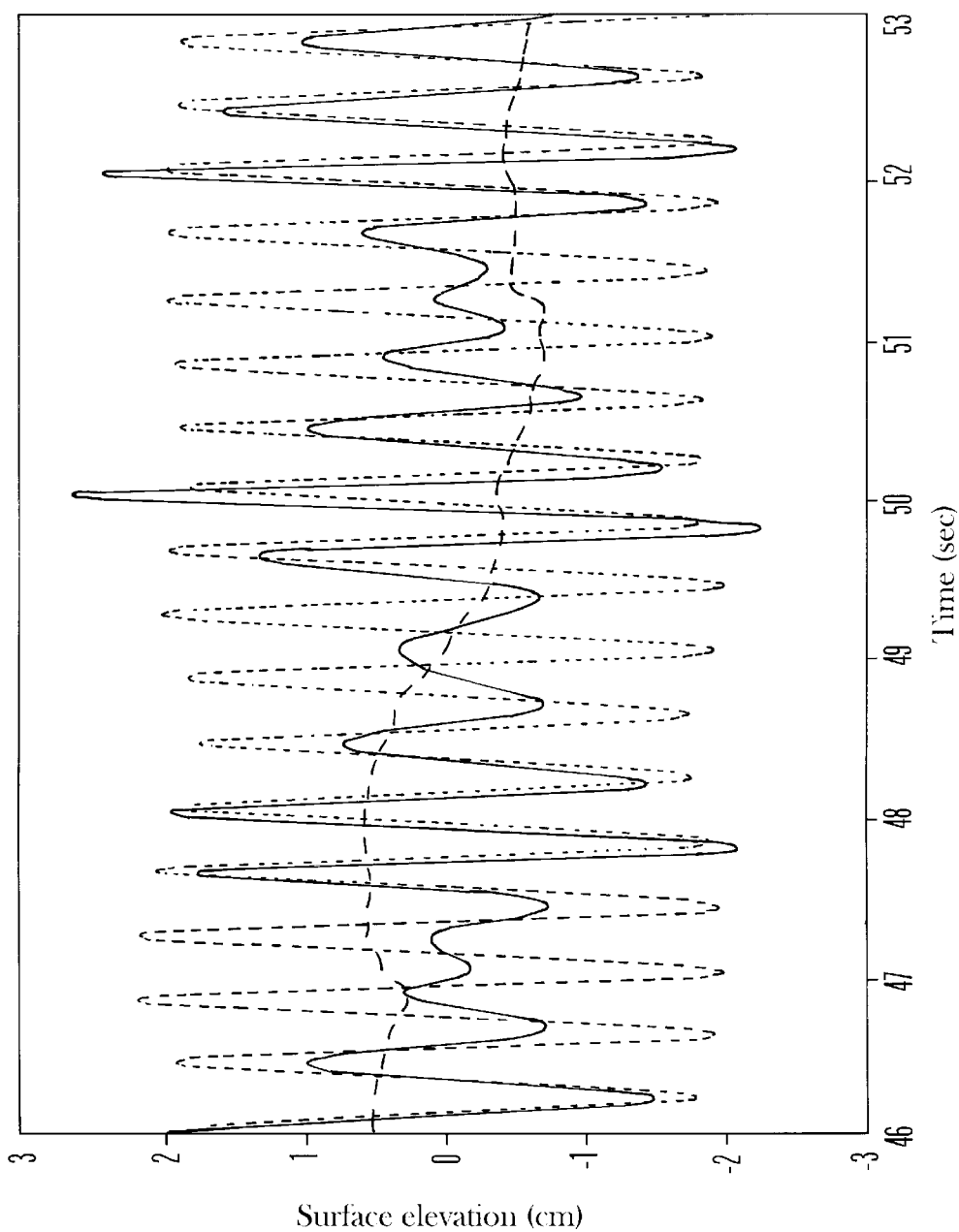
FIG. 15(h) is a two way comparison of a water wave profile change at the location of a phase jump.
Figure 15I:
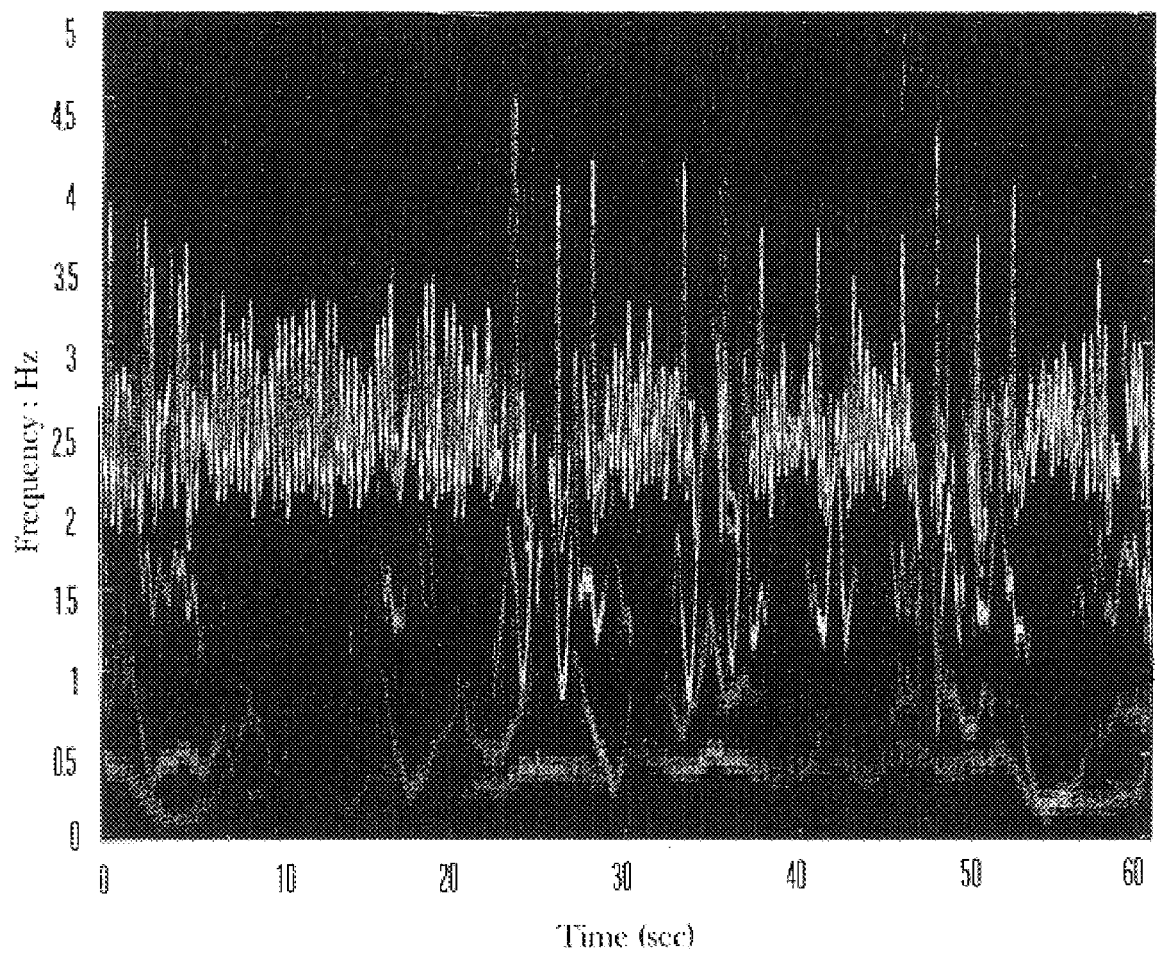
FIG. 15(i) shows a Hilbert Spectrum of a water wave signal for the purpose of illustrating water wave evolution analysis according to the invention.
Figure 15J:
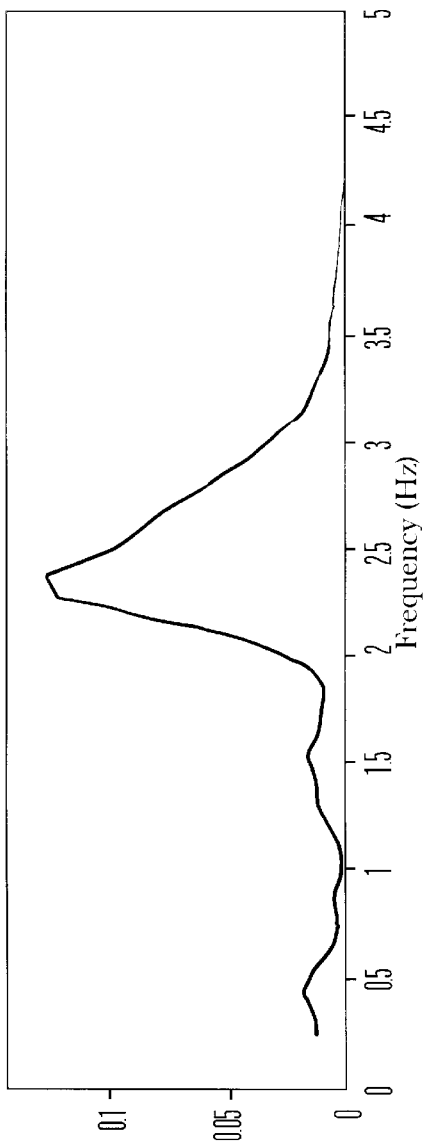
FIG. 15(j) shows a marginal spectrum of a water wave signal according to the invention.
Figure 15K:
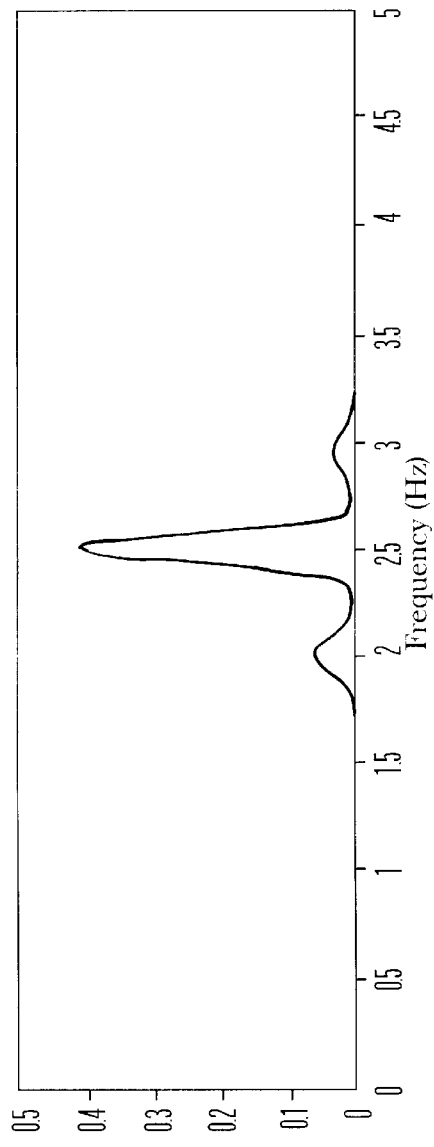
FIG. 15(k) is a conventional fourier spectrum of the same water wave signal processed in FIG. 15(j)
Figure 15L:
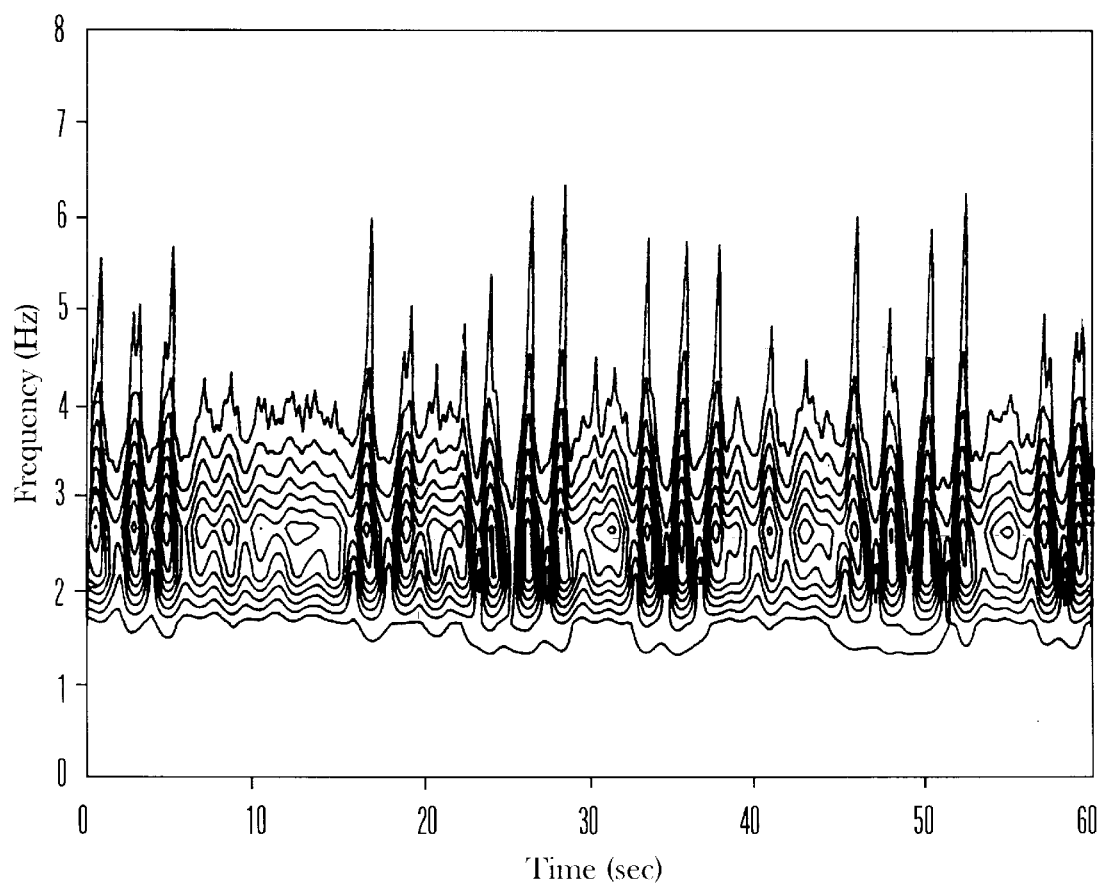
FIG. 15(l) a conventional Morlet Wavelet spectrum of the same water wave signal processed in FIG. 15(j)
Figure 15M:
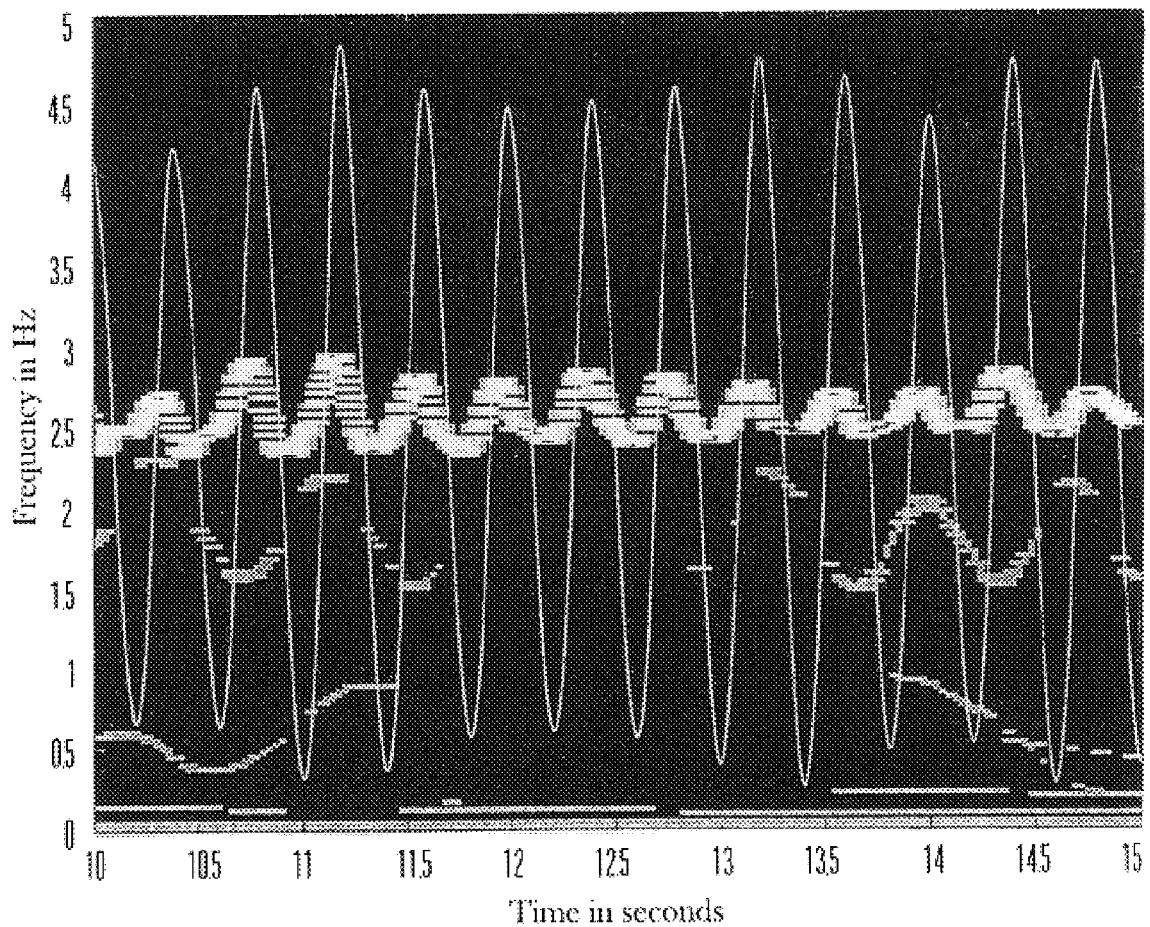
FIG. 15(m) is a water wave signal plotted together with its Hilbert spectrum which is generated by the invention.
Figure 15N:
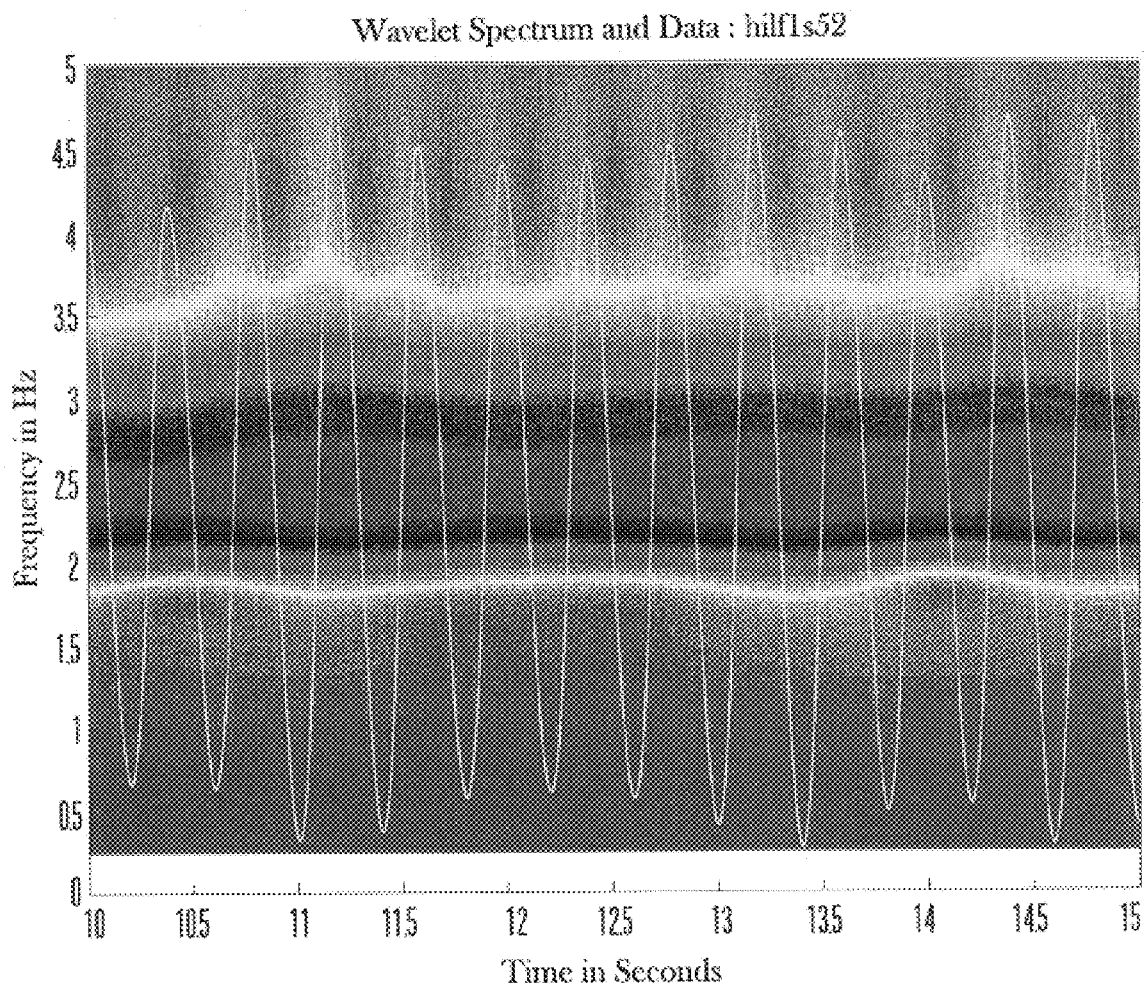
FIG. 15(n) is a water wave signal plotted together with a conventional Wavelet Spectrum.

After performing the Hilbert transform on the data, the unwrapped phase functions for all eight stations are shown in FIG. 15(b), which indeed suggests the gradual change of the phase function. The decrease in the slope of the phase function indicates the decrease of the mean frequency. The slopes of the first four stations, however, stay almost identical to that of the first station. The first phase function that shows any deviation from this initially closely clustered group is at station 5. To this scale, the frequency change seems small and gradual.

To examine the variation in more detail, take the difference of the phase functions of all stations with respect to the first station and use it as an initial condition. The difference is shown in FIG. 15(*c*), from which the changes of the phase functions are the result of a series of steps with the sharp jumps confined in very short time spans.

To quantify these phase variations, plot the phase change with respect to that of the first station in phase-amplitude diagrams as illustrated in FIGS. 15(*d*)–(*g*) for stations 2, 4, 5 and 6, respectively. The phase-amplitude diagram for station 5 shows that the phase starts to jump, which reflects the sudden shift of the phase function shown in FIG. 15(*c*). These phase changes are very similar to the phase dislocations. As the number of jumps increases, the phase function seems to become a continuous and almost smooth sloped line. But even for those cases, the amount of phase change involved in each jump, as revealed by the amplitude-phase diagram, is still constant for all the phase jumps: $2\pi$. The $2\pi$ jump means a loss of exactly one wave in the process.

Now examine the wave elevation data in detail at the jump points. The time series data is expanded and displayed in FIG. 15(*h*) in a two-way comparison. By superimposing the data from station 5 with its phase difference from station 1, the jump in the phase is easily associated with a single wave within one wave period. Then superimpose the raw elevation data from station 5 on those from station 1 as also shown in FIG. 15(*h*). As is apparent, all the wave peaks line up except at the location of the jump, where two waves become one. There is a loss of one wave in each phase jump event. All the changes are local, abrupt, and discrete.

The Hilbert Spectrum is shown in FIG. 15(*i*), in which one can identify very local events of abrupt change of frequency at the 25 and 48 seconds locations. The Hilbert spectrum reveals the typical intra-wave frequency modulations of the Stokian water waves, and the more striking local shifts of frequency to a lower value at the locations coinciding with the phase jumps shown in FIG. 15(*c*). Another interesting phenomenon shows up in the marginal spectrum given in FIG. 15(*j*), where there is a much wider frequency distribution than expected caused by the intra-wave frequency modulations. Furthermore, there is also a slight tendency of energy being shifted to the subharmonics frequency. Whether this energy flux is related to the subharmonic instability studied by Longuet-Higgins, 1978, Longuet-Higgins, M. S., 1978, "The Instabilities of Gravity Waves of Finite Amplitude in Deep Water, II, Subharmonics", Proc. Roy. Soc. Lond., A360, 489–505. deserves further investigation. The Fourier spectrum, given in FIG. 15(*k*), shows only sidebands and harmonics without any suggestion of the local nature of the wave evolution. Again, the Morlet Wavelet analysis from the same data, shown in FIG. 15(*l*), fails to resolve any of the local changes.

Using the computer implemented method of this invention, one can examine the evolution of weakly nonlinear wave trains in detail. Although the processes have always been assumed to be stationary globally, this invention reveals that the processes are actually abrupt and local. Such variations are locally inhomogeneous; thus, they cannot be analyzed adequately by Fourier analysis.

Furthermore, the local variations are abrupt, and discrete, having the typical characteristics of particles. The frequency downshift is a cumulated effect of fusions of two waves into one or three waves into two. The fusion processes are irreversible. This asymmetry is due to preferred direction of downward energy flow. These results also raise concerns of the past assumptions on gradual and continuous variations of the wave number and frequency of a wave train. With the discrete jumps and the particle like nature of the individual wave, there may be a need for a new paradigm to represent the abrupt and discrete changes analytically. This presents a new challenge for nonlinear wave analysis.

Before leaving this section, examine the data from station 1 to illustrate the effects of the nonlinear distortion of the water wave surface. Because the emphasis is on the nonlinear distortion, the optional smoothing step 110 may be applied to smooth the data by a weighted running average so that the small irregularity will not cause mode mixing. A selected section of the data (5 seconds in length) and their Hilbert and Wavelet spectra are given in FIGS. 15(*m*) and 15(*n*) respectively. In FIG. 15(*m*), one can see the intra-wave frequency modulation. The frequency fluctuates within a very narrow range around 2.5 Hz, the frequency the wavemaker was driven. In general, the high local frequency values line up with the peaks, and the low local frequency values line up with the troughs as expected of the Stokes waves. In fact, it has been shown by Huang, et al. (1990a), "Wave Spectra", The Sea, 9, 197–237; and Huang, et al. (1990b), "The Probability Structure of the Ocean Surface", The Sea, 9, 335–366, that the gravity water wave can be approximated well by the Stokes model. On more detailed examination, however, the alignment is not perfect: there is a slight but systematic shift of the phase toward the wave front, an indication of the front-back asymmetry of the wave profile.

In Wavelet result shown in FIG. 15(*n*), one cannot see any intra-wave frequency modulation anymore. Instead, there are harmonics again line up with the wave front, those alignments confirm the Hilbert spectrum result: the waves are front and back asymmetry. In the Wavelet spectrum, the energy containing frequency range is much wider than that is in the Hilbert spectrum, an indication of energy leakage of the Wavelet analysis. This comparison illustrates that the nonlinear wave distortion can indeed be explained by the much more physical interpretation as the intra-wave frequency modulation.

Another application of the computer implemented method is to analyze ocean waves. To illustrate this application, the following analyzes field data of ocean waves that were collected by the NOAA New Tidal Gauge, located at Duck, N.C., at the high data rate of 1 Hz. FIG. 13(*a*) shows the raw data for 60 minutes. This is typical ocean wave data from a field station: random and almost statistically stationary.

In the past, such ocean wave data was treated with Fourier analysis. In fact, the studies of the wave spectra from Fourier analysis have been a main subject of the wave research (see, for example, Huang, et al., 1990a, "Wave Spectra", The Sea, 9, 197–237.

This data when subject to the computer implemented EMD method yields 8 components as shown in FIGS. 13(*b*)–(*i*), with the last component indicating the tidal variation. The Hilbert spectrum is given in FIG. 14(*a*).

For comparison, the corresponding Wavelet spectrum is shown in FIG. 14(*b*). While both spectra show a energy concentration around 0.1 Hz, the Wavelet spectrum gives a much more continuous distribution in time, and much wider spread of energy consisting primarily of the harmonics in the frequency axis.

To examine the results in detail, a short section of the data covering only 5 minutes is plotted in three ways. First, the Hilbert and the Wavelet spectra are plotted separately with the corresponding surface elevation of the wave data in FIGS. 14(c) and 14(d), respectively. In this expanded form, the Hilbert spectrum is very different from the Wavelet spectrum. Then, the two different spectra are also plotted together with the Hilbert spectrum in contour lines superimposed on the Wavelet spectrum in FIG. 14(e). In these presentations, they both show the similar locations of energy concentration in time and frequency axes, but the Hilbert spectrum gives a sharper and more refined definition of the energy contour in FIGS. 14(c) and 14(e). Take the data and the spectra near 57 minute location for example: The data show a packet of high amplitude low frequency waves with frequency increasing and amplitude decreasing both before and after the packet. Both of these trend are vividly portrayed by the Hilbert spectrum, but they are only vaguely suggested in the Wavelet spectrum. These variations suggested that the ocean waves are nonstationary, a conclusion supported by Huang, et al., 1996, "The Mechanism for Frequency Downshift in Nonlinear Wave Evolution", Adv. Appl. Mech., 32, 59–111.

Figure 14A:
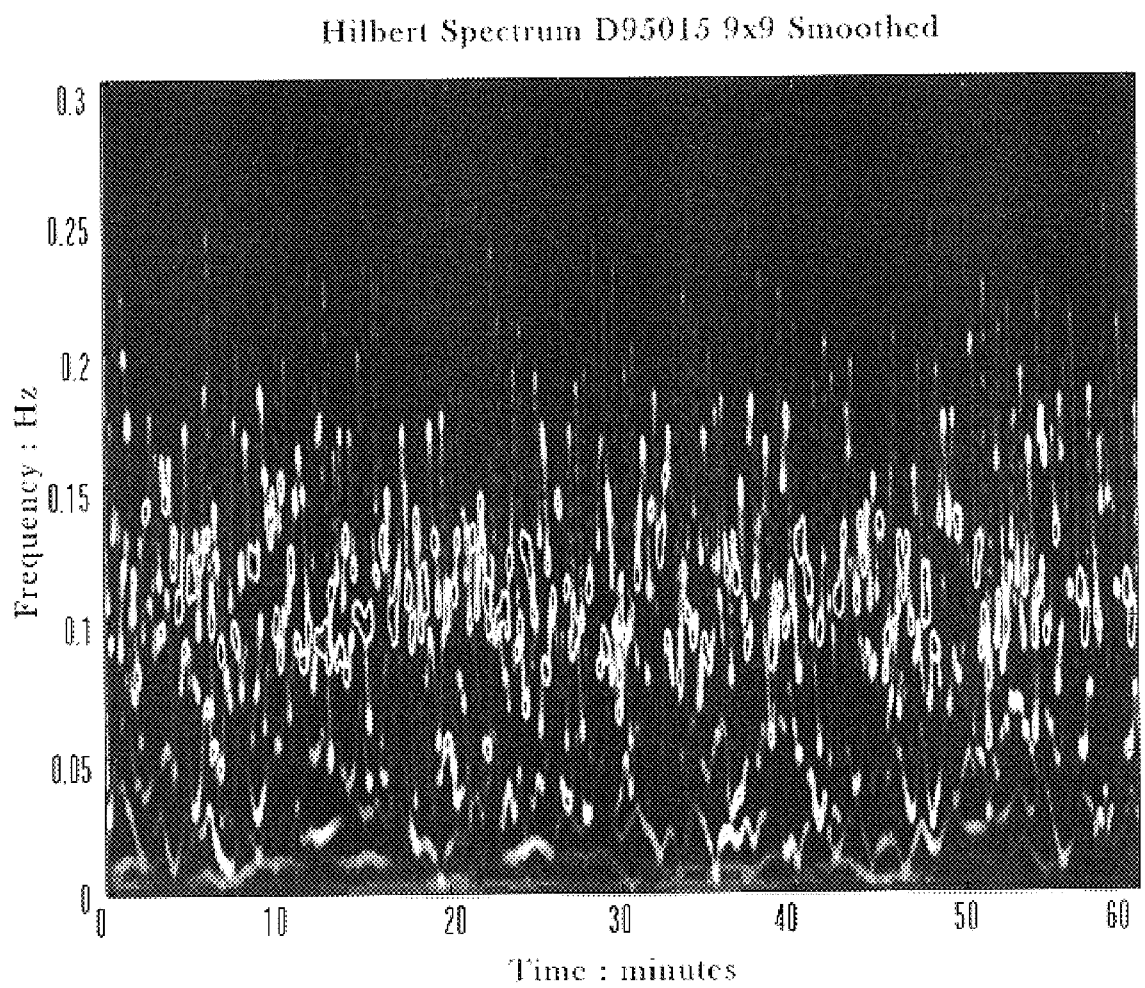
FIG. 14(a) is the Hilbert Spectrum generated by the invention from the ocean wave signal shown in FIG. 13(a) after smoothing by a 9×9 weighted Gaussian smoothing filter.
Figure 14B:
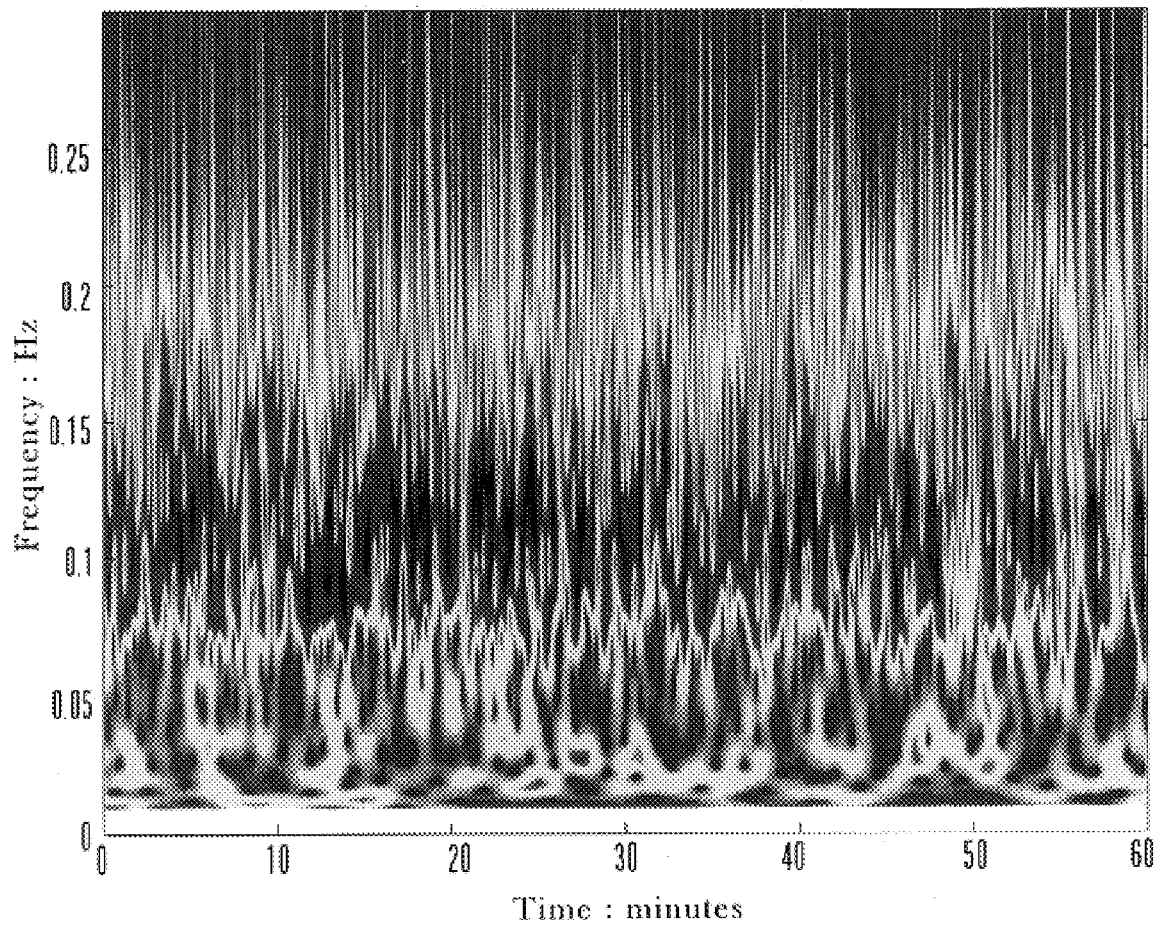
FIG. 14(b) is a conventional Morlet Wavelet spectrum of the ocean wave signal shown in FIG. 13 (a)
Figure 14C:
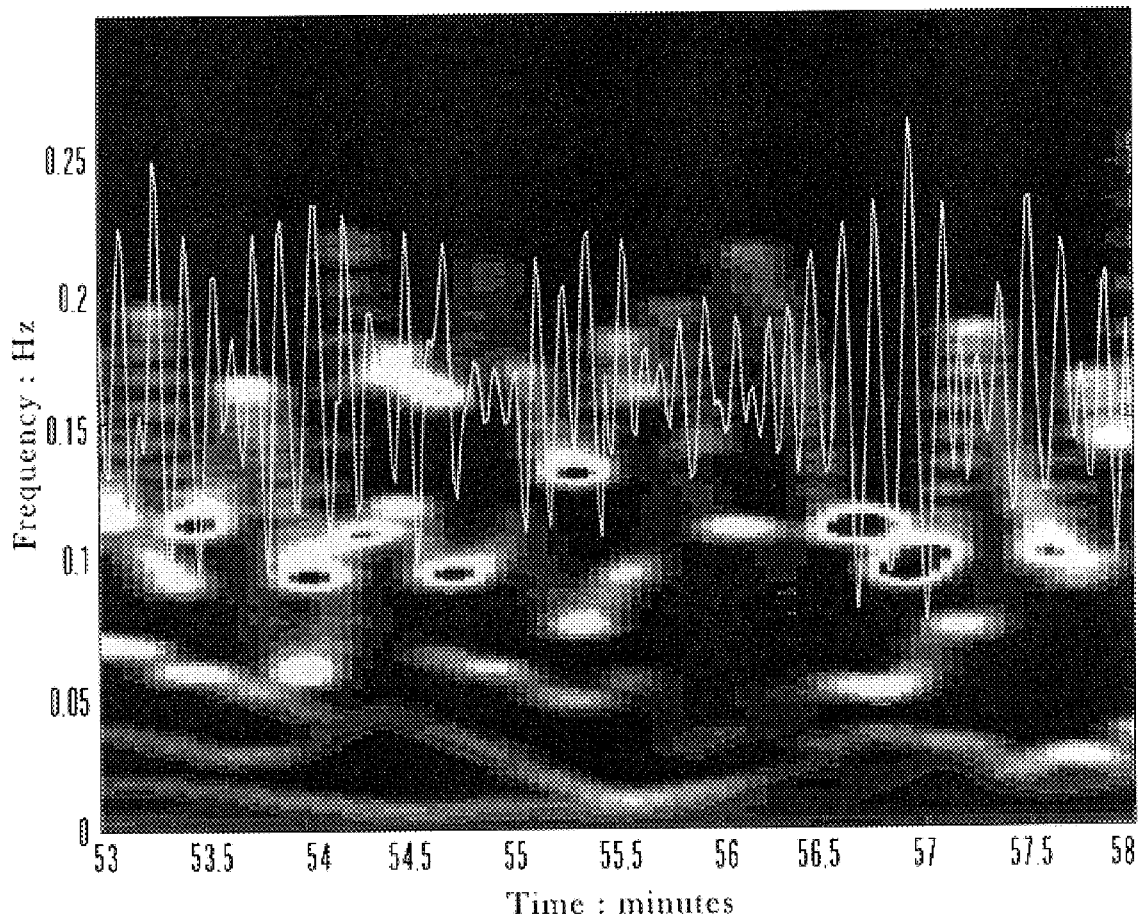
FIG. 14(c) shows the Hilbert Spectrum from a 5-minute section of the ocean wave signal plotted together with the ocean wave signal in an arbitrary scale.
Figure 14D:
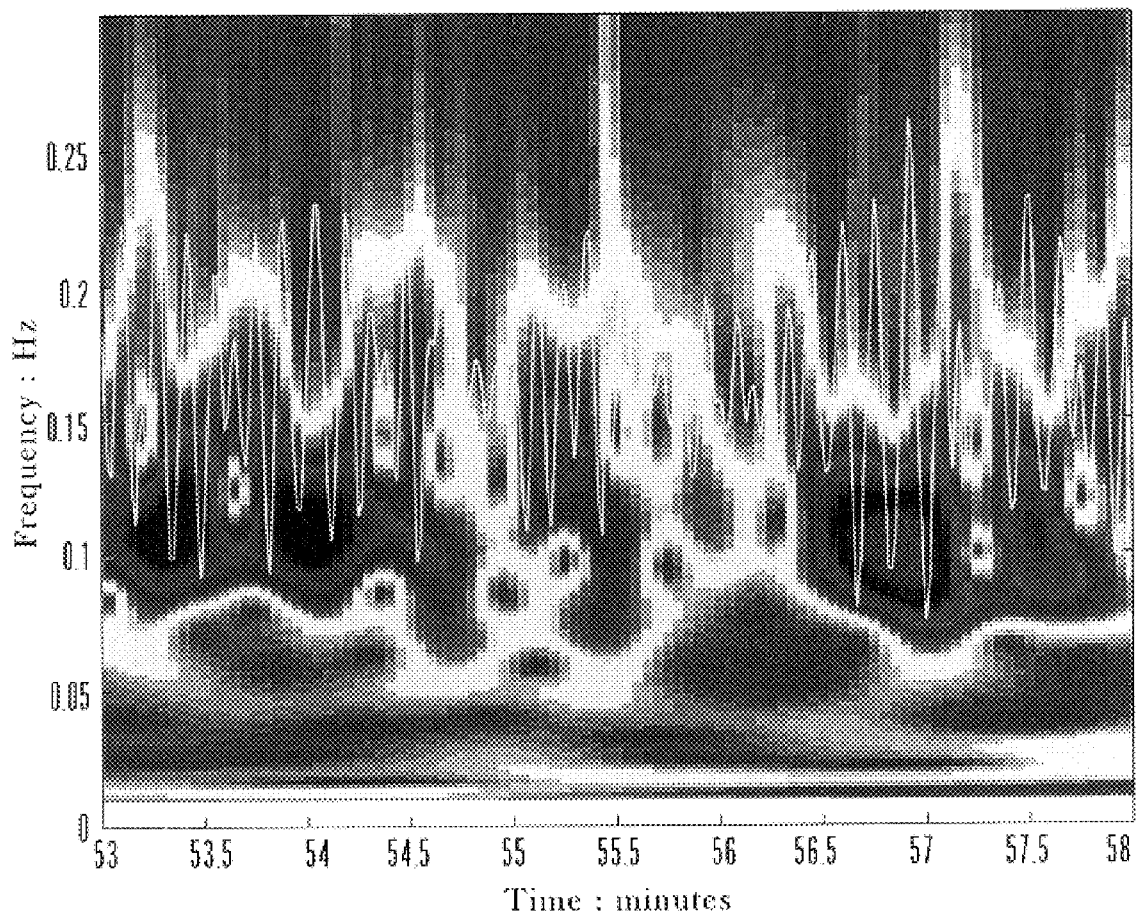
FIG. 14(d) shows a conventional Wavelet spectrum the same 5-minute section of the ocean wave signal from FIG. 14(c) plotted together with the ocean wave signal in an arbitrary scale.
Figure 14E:
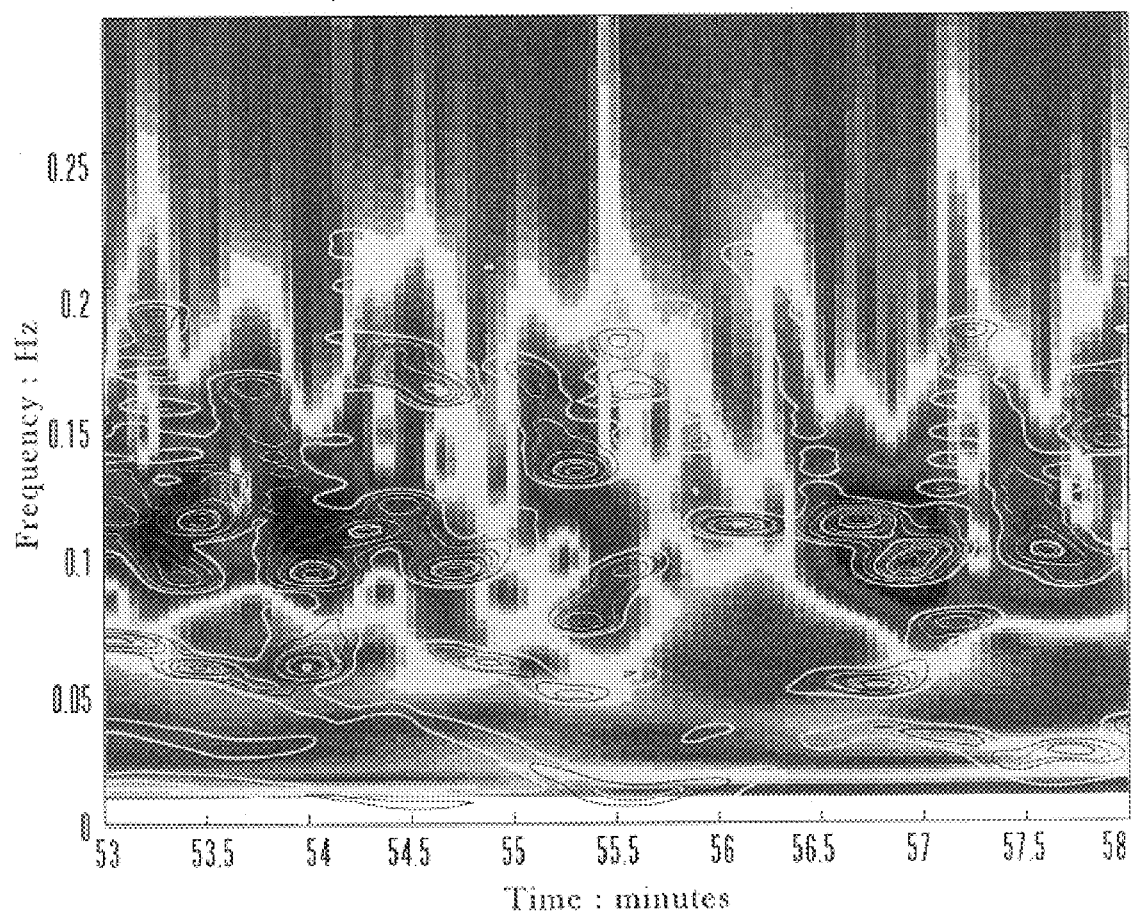
FIG. 14(e) compares the Wavelet and Hilbert spectra of the ocean wave signal.
Figure 14F:
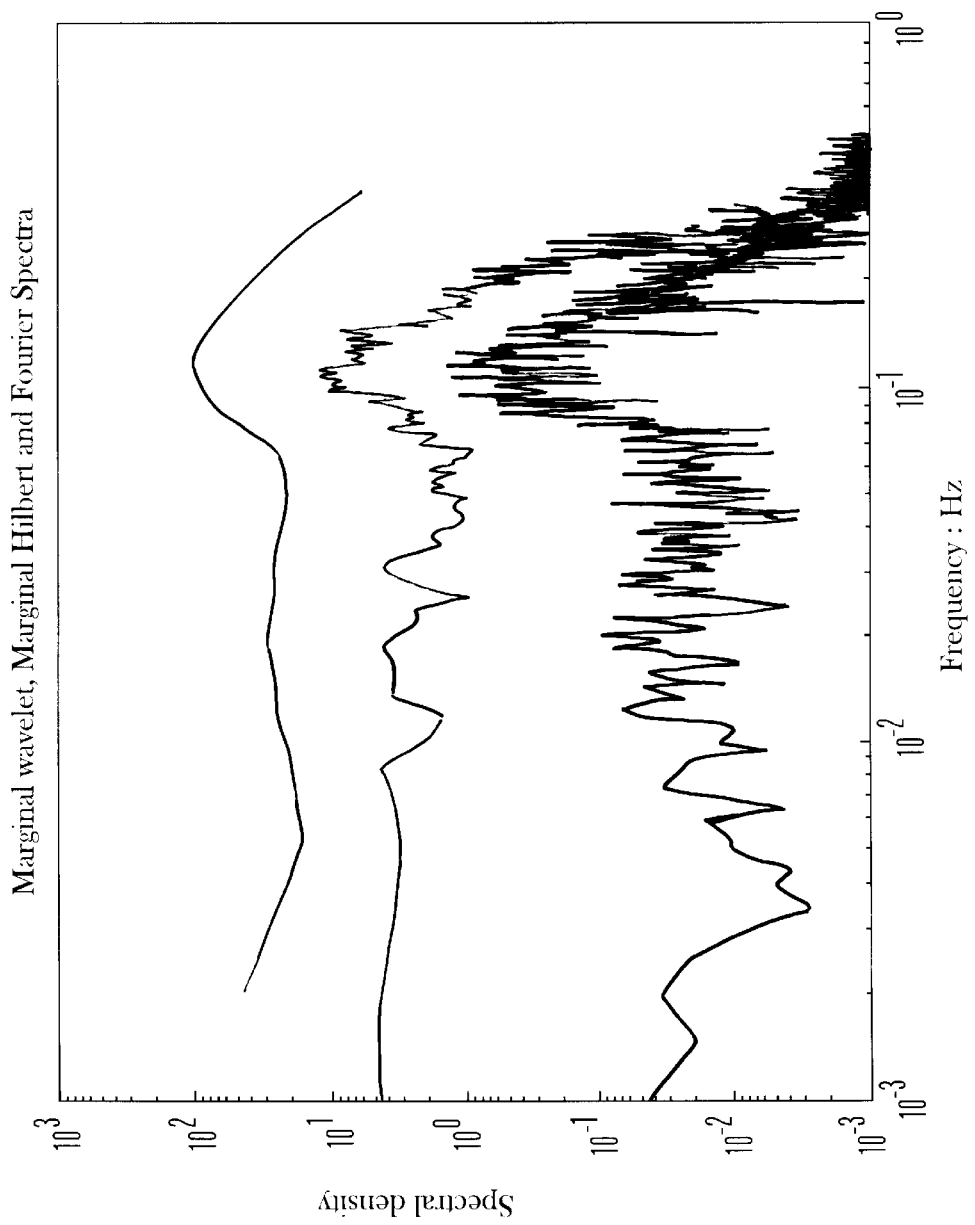
FIG. 14(f) compares the fourier spectrum (bottom line), marginal Hilbert spectrum (middle line) and Wavelet spectrum (top line) generated from the ocean wave signal.

Finally, let us also compare the marginal spectra from both the Hilbert and Wavelet spectra with that of Fourier spectrum in FIG. 14(f), in which the values of the spectra are staggered for clarity: the top line is the Wavelet result, the middle one is the Hilbert spectrum, and the bottom is the Fourier spectrum. The contrast is similar to the cases discussed in the calibration and validation section: due to the leakage, the Wavelet spectrum is totally devoid of detail. While the Hilbert and direct Fourier spectra both show rich frequency contents, the lack of high harmonics due to either the nonlinear or the nonstationary effects in the Hilbert spectrum suggest that the Hilbert Spectrum can portray the energy-frequency presentation more precisely.

Tide and Tsunami signals

Figure 16A:
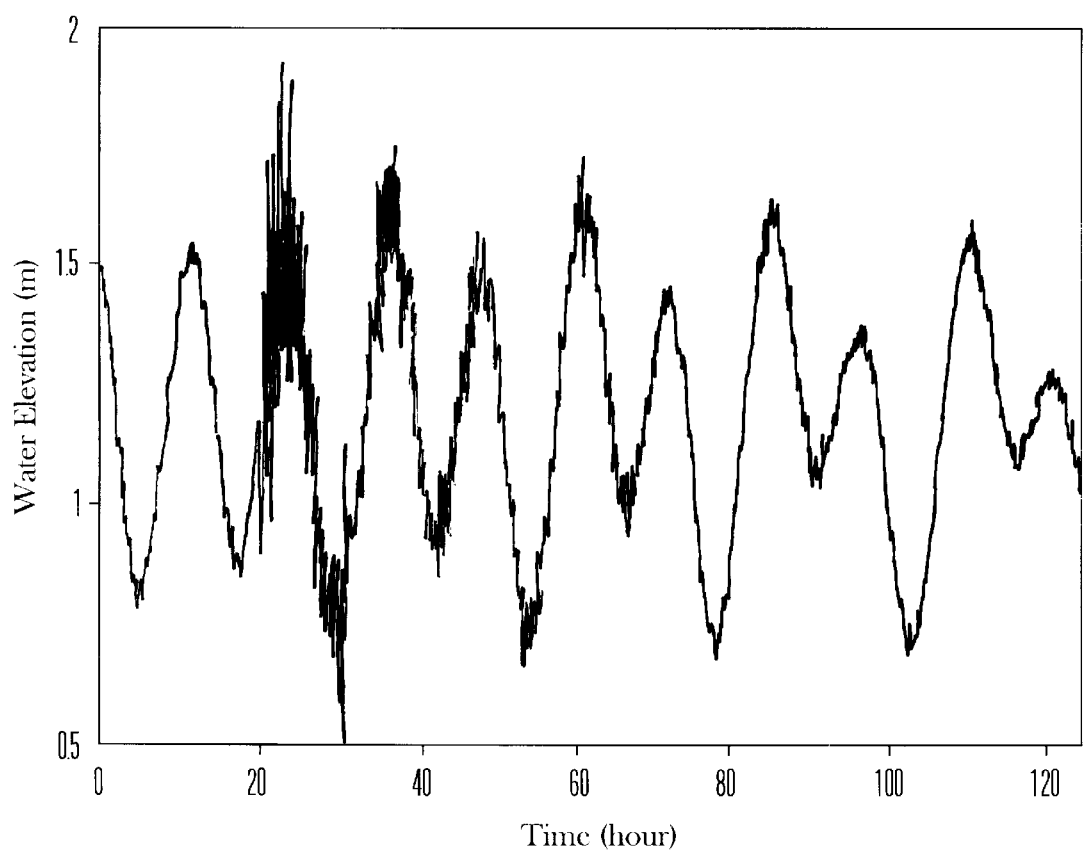
FIG. 16(a) is a combined tidal signal and tsunami signal collected inside the Kahului Harbor in Maui Hawaii from Oct. 4 to Oct. 9, 1994.
Figure 16B:
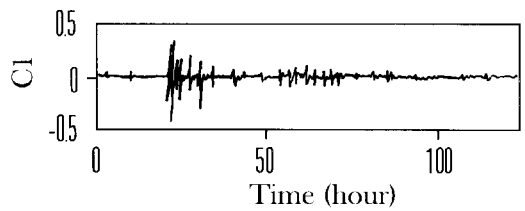
FIGS. 16(b)–(i) show the eight intrinsic mode functions which are extracted from the combined tidal signal and tsunami signal of FIG. 16(a) by the EMD method of the invention.
Figure 16F:
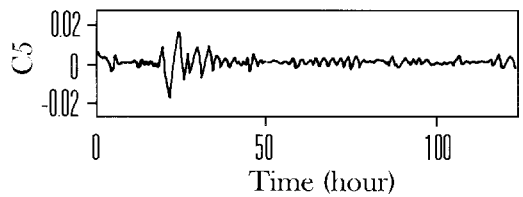
Figure 16C:
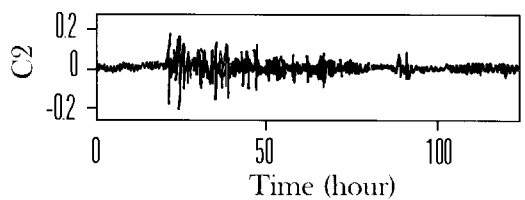
Figure 16G:
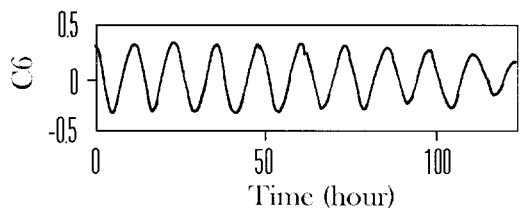
Figure 16D:
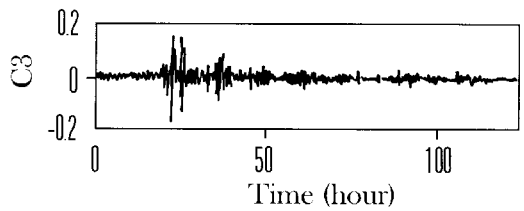
Figure 16H:
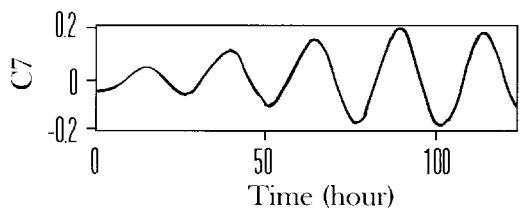
Figure 16E:
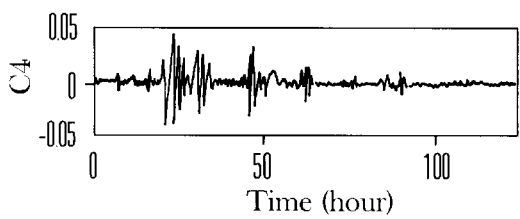
Figure 16I:
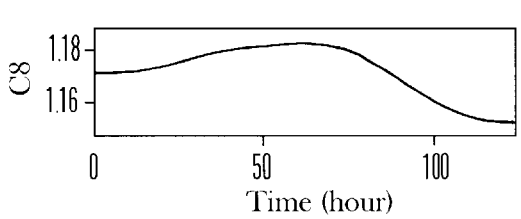

The field wave data selected here were also collected by a NOAA New Tidal Gauge. This gauge, located inside Kahului Harbor, Maui, is capable of recording data at 1 minute steps. FIG. 16(a) shows the raw data from the tidal gauge for five days from Oct. 4 to Oct. 9, 1994. On Oct. 5, tsunami induced waves arrived at the site and created a water level changes of the magnitude comparable to that of the tidal signal. Although the tidal data is traditionally analyzed with Fourier expansion, the added tsunami waves are transient. The combination, therefore, makes the whole time series nonstationary. Filtering cannot remove the tsunami signal cleanly, for the transient data and the tide will have many harmonic components in the same frequency range.

Figure 17:
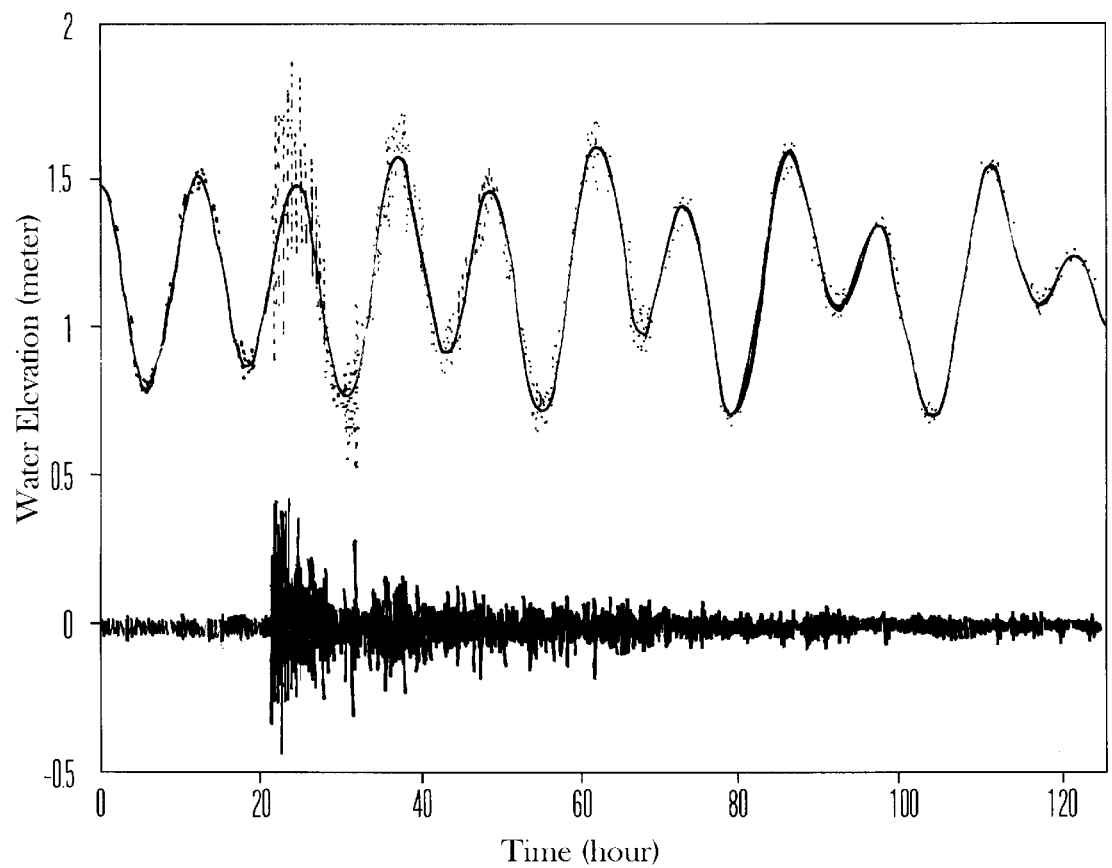
FIG. 17 shows the separation of the tidal signal and the tsunami signal by the IMF components generated by the invention.

The computer implemented EMD Method yields eight IMF components from the data as shown in FIGS. 16(b)–(i). Because the time scales of the tide and the tsunami waves are so different, the 8 IMF components can be easily divided into two groups: the high frequency signal representing the tsunami induced waves, and the last three low frequency components representing the tide. After the IMF's were used to reconstitute the two separate wave motions, the raw data, the tidal component, and the tsunami induced waves are plotted together in FIG. 17. Here, the EMD serves as a filter to separate the tide and the transient tsunami without any ambiguity.

Figure 18A:
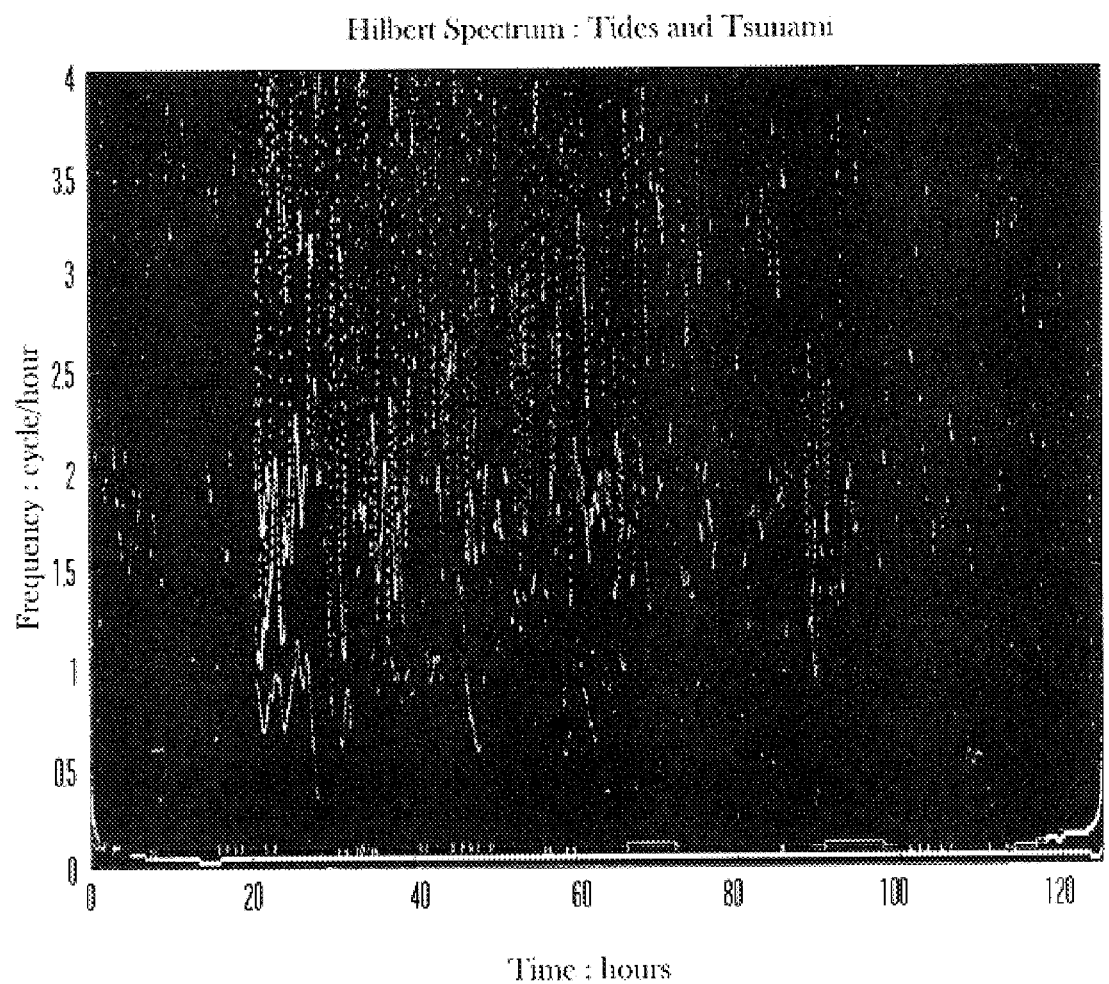
FIG. 18(a) shows the corresponding Hilbert Spectrum for the combined tidal signal and tsunami signal of FIG. 16(a)

FIG. 18(a) gives the Hilbert spectrum for both the tsunami and the tides from which the arrival time and the frequency change of the tsunami waves are clearly shown in this energy-frequency-time distribution. Besides the clear dispersion properties of the tsunami waves, there are two more interesting new observations: First, the variations of the tsunami wave frequency are phase locked with the tidal cycle. Second, the tsunami waves in the Harbor lasted many tidal cycles, with a frequency of half a cycle per hour. Such a period would not fit into the limited space inside the harbor of Kahului. The more likely explanation is for the tsunami waves being trapped in the bay, which have a much larger area for the wave to propagate.

Figure 18B:
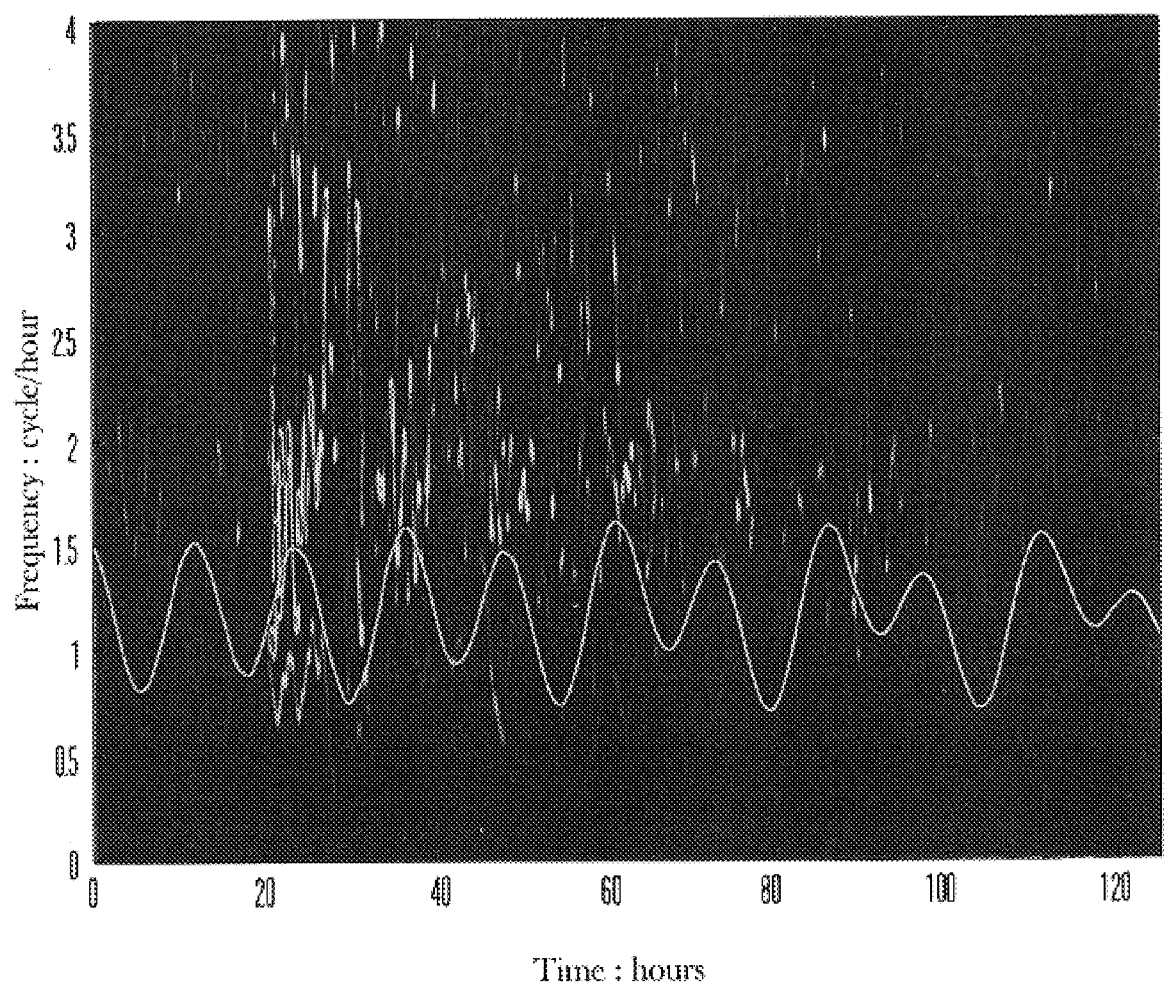
FIG. 18(b) shows the corresponding Hilbert Spectrum for the tsunami signal component.
Figure 18C:
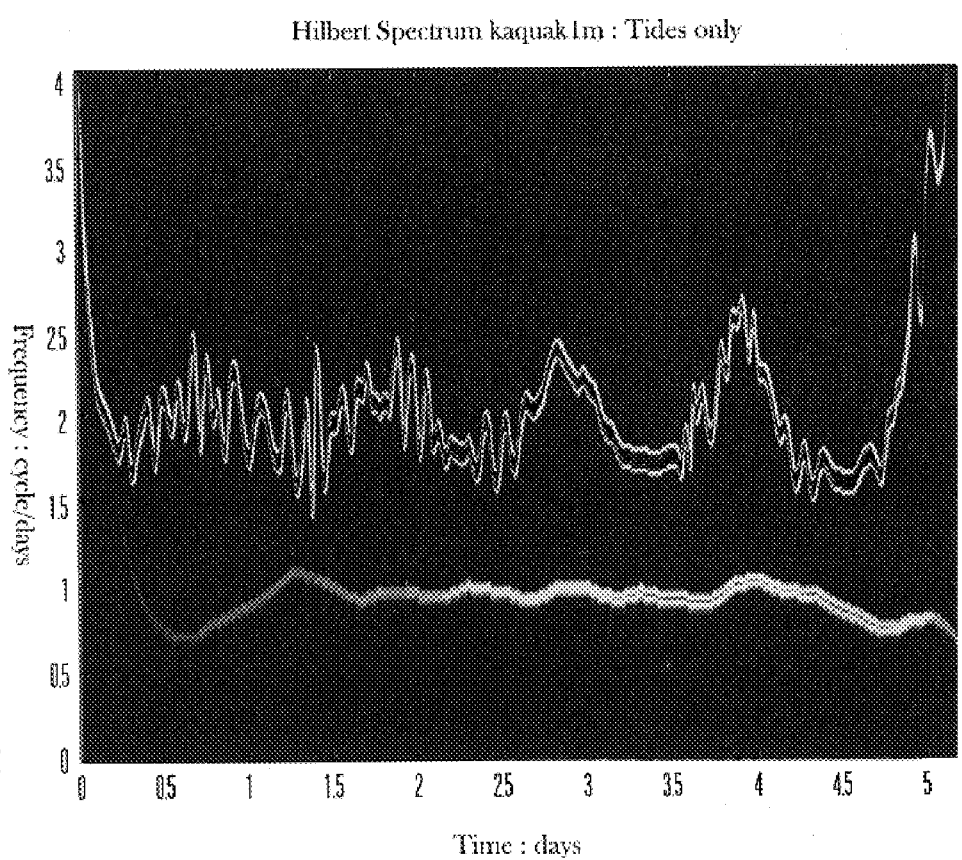
FIG. 18(c) shows the corresponding marginal Hilbert spectrum for the tidal signal component.

In the above presentation of FIG. 18(a), the energy in the tides dominates the energy in the tsunami thereby making the tsunami less prominent in FIG. 18(a). By using the versatile properties of the Hilbert spectrum, the invention can present the two phenomena separately: FIG. 18(b) shows only the tsunami components. Without the tide, the tsunami becomes clear. The tide components are also plotted over it to show the phase lock of the tsunami and the tides. FIG. 18(c) shows only the tidal components. One can see that in the Hilbert presentation, no harmonics are required, but the frequency has to be variable.

As a demonstration of the versatility of the Hilbert Spectral Analysis, the tidal components can be selected to construct the Hilbert spectrum. The result is given in FIG. 18(c), in which both the diurnal and semi-diurnal tides are clearly shown.

Figure 18D:
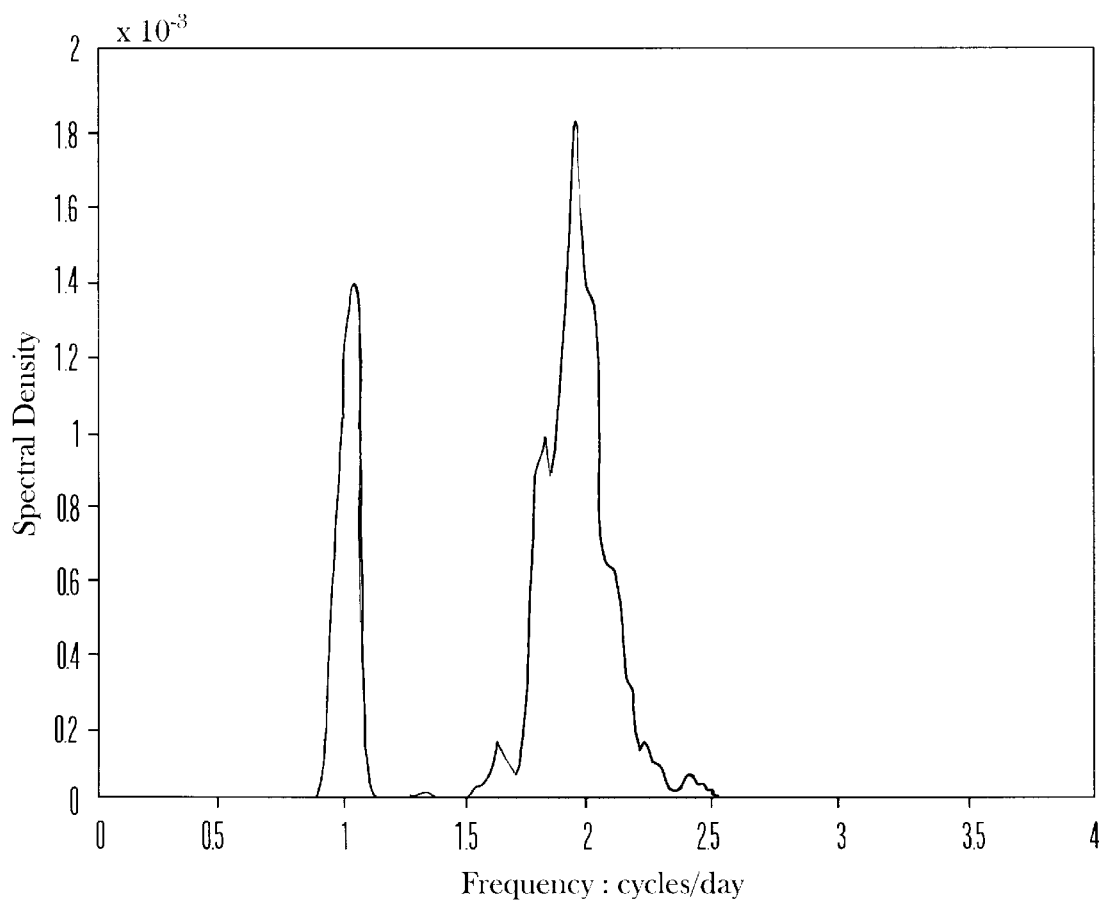
FIG. 18(d) shows the marginal spectrum of the tidal signal component.

In the marginal spectrum of the tidal components in FIG. 18(d), however, the frequency for the semi-diurnal tide is much more variable, especially at the time when the tsunami just arrived, and towards the end of the measurement period. This variability seen in the marginal spectrum raises an interesting problem: whether there is interaction between the tide and the tsunami.

Compared to the traditional Fourier spectrum, the marginal spectrum again shows the absence of the harmonics. The reason seems to be clear: the tidal waves measured at a coastal station should be nonlinear, for the shallow water propagation is governed by a nonlinear equation. The absence of the harmonics raise a question concerning the best way to present the tidal data. Should one use harmonic analysis? Or should one accept the intra-wave frequency modulation to represent the nonlinearity? This is another interesting question for further studies. Based on the discussion so far, it seems that the intra-wave frequency modulation representation would be more physical.

Altimeter Data from the Equatorial Ocean

Figure 19A:
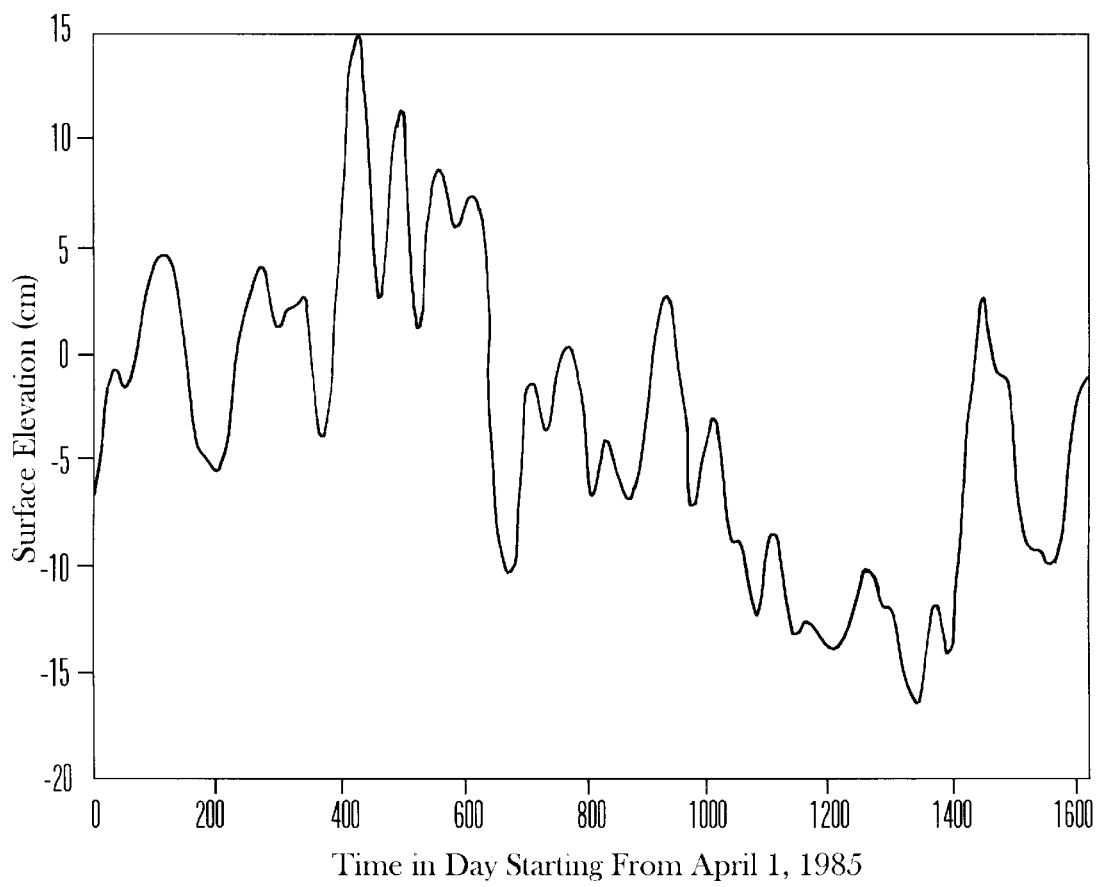
FIG. 19(a) shows ocean surface elevation signal taken by an orbiting satellite altimeter at 174E on the equator on Apr. 1, 1985.

Satellite altimetry has been a powerful technique for large scale ocean circulation studies (Huang, et al., 1978, "Ocean Surface Measurement Using Elevation from GEOS-3 Altimeter", J. Geophys. Res., 83, 4,673–4,682; Robinson, et al., 1983, "A Study of the Variability of Ocean Currents in the Northwestern Atlantic Using Satellite Altimetry", J. Phys. Oceanogr., 13, 565–585). Because of the importance of the equatorial region in determining the global climate pattern, the altimeter data have been used extensively to study the dynamics of this area (Miller, et al., 1988, "GEOSAT Altimeter Observation of Kelvin Waves and the 1986–1987 El Niño", Science, 239, 52–54; and Miller, et. al., 1990, "Large-Scale Meridional Transport in the Tropic Pacific Ocean During the 1986–87 El Niño From GEOSAT", J. Geophys. Res. 95, 17,905–17,919; Zheng, et al., 1994, "The Effects of Shear Flow on Propagation of Rossby Waves in the Equatorial Oceans", J. Phys. Oceanogr., 24, 1680–1686.; and Zheng, et al., 1995, "Observation of Equatorially Trapped Waves in the Pacific Using Geosat Altimeter Data", Deep-Sea Res., (in press)). The accepted view of the equatorial dynamics is the propagation of Kelvin waves forced by variable wind stress (Byod, 1980, "The Nonlinear Equatorial Kelvin Waves", J. Phys. Oceanogr., 10, 1–11; and Zheng, et al., 1995, "Observation of Equatorially Trapped Waves in the Pacific Using Geosat Altimeter Data", Deep-Sea Res., (in press). In this model, the wave propagation will leave a surface elevation signature of the order of 10 cm, which can be measured by the satellite altimeter. Such continuous data available now are derived from both crossover and collinear differences (Miller and Cheney, 1990, "Large-Scale Meridional Transport in the Tropic Pacific Ocean During the 1986–87 El Ni ño From GEOSAT", J. Geophys. Res. 95, 17,905–17,919), covering the period from April 1985 to September 1989. The final data have a spatial resolution of 8° longitude by 1° latitude. A typical time series on the Equator sea surface elevation data at 174° E. longitude is given in FIG. 19(a).

Limited by the data length and complicated by the dynamics, all the past investigators have encountered problems in processing this obviously nonstationary data.

Figure 19B:
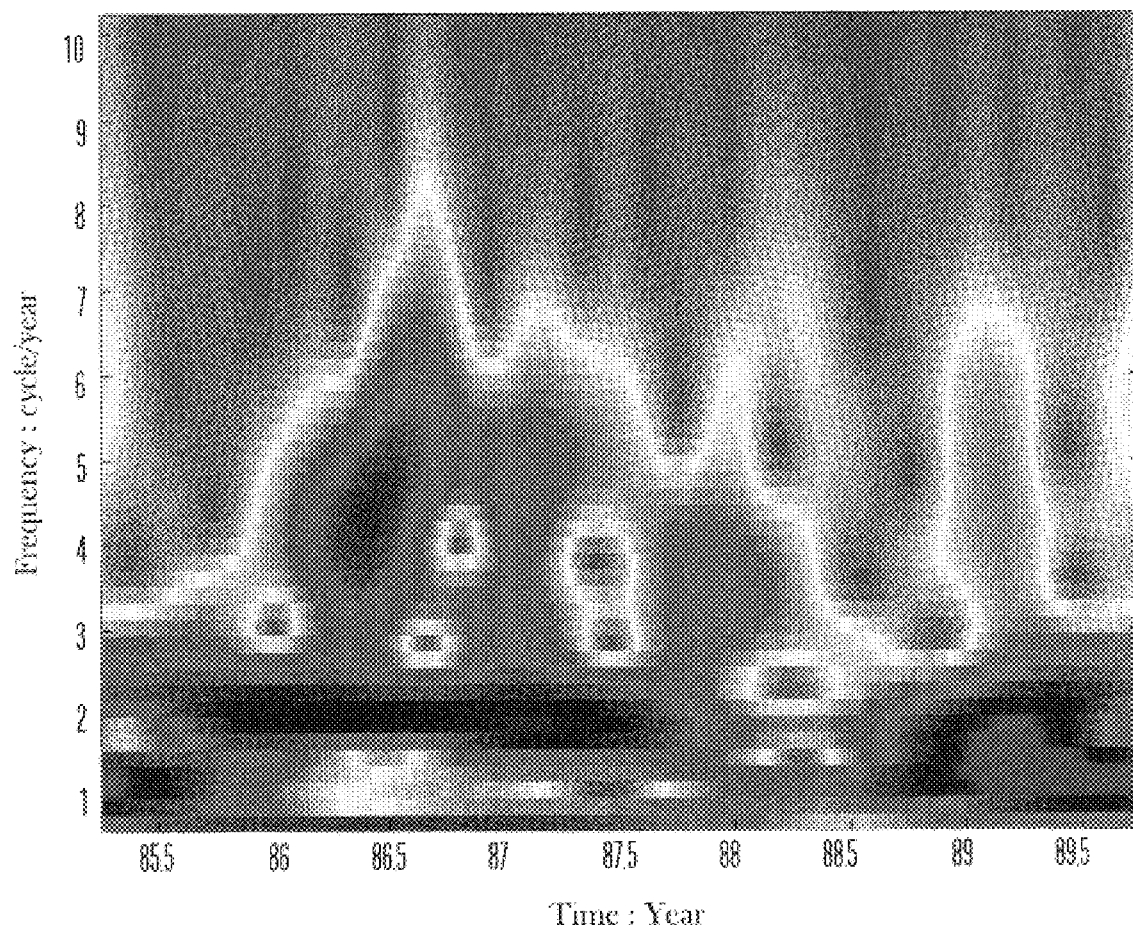
FIG. 19(b) shows the conventional Morlet Wavelet Spectrum generated from the ocean surface elevation signal shown in FIG. 19(a)
Figure 19C:
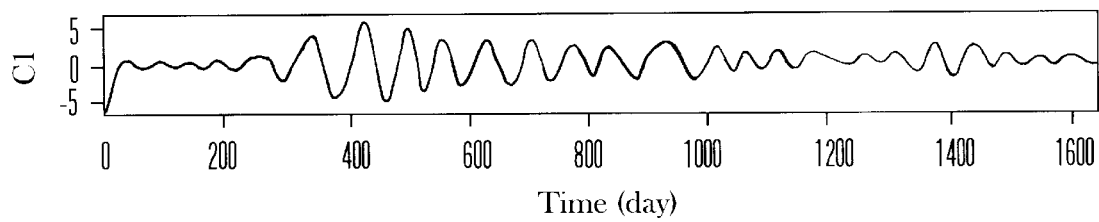
FIGS. 19(c)–(g) show the five intrinsic mode functions which are extracted from the ocean surface elevation signal shown in FIG. 19(a) by the EMD method of the invention.
Figure 19D:
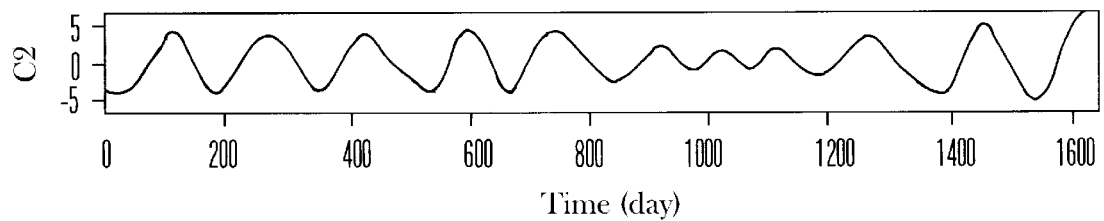
Figure 19E:
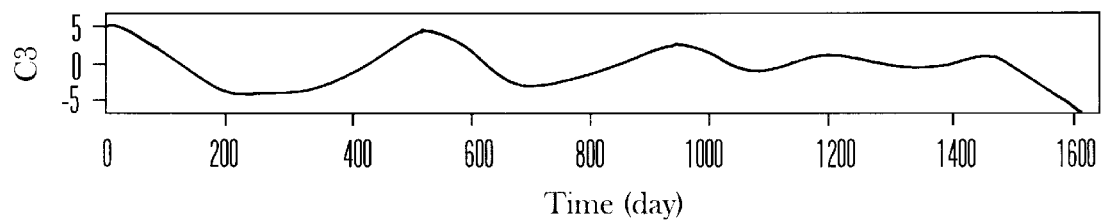
Figure 19F:
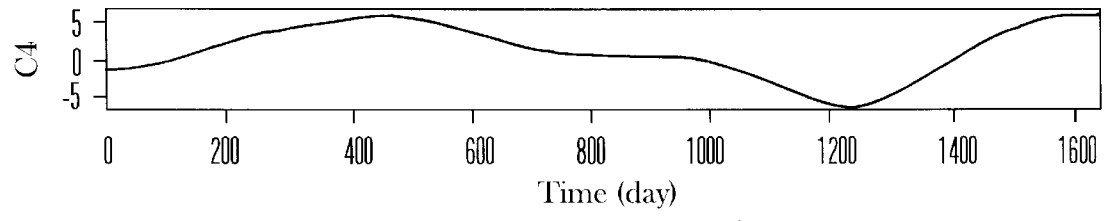
Figure 19G:
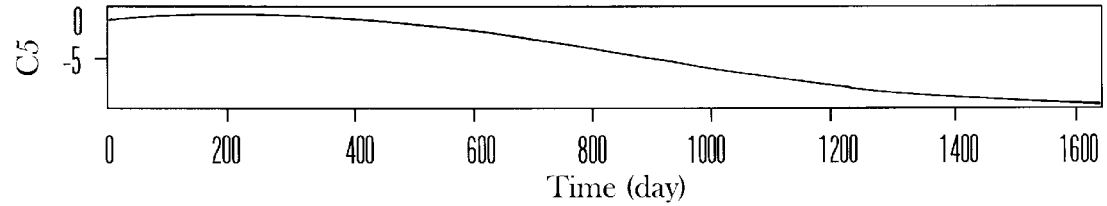

The data has been analyzed with two methods: the Wavelet analysis and the Hilbert spectral analysis. Although the Wavelet results, given in FIGS. 19(b) shows the fluctuation of energy as functions of time and frequency, the energy distribution as function of time and frequency are too diffused to yield any quantitative information.

Figure 19H:
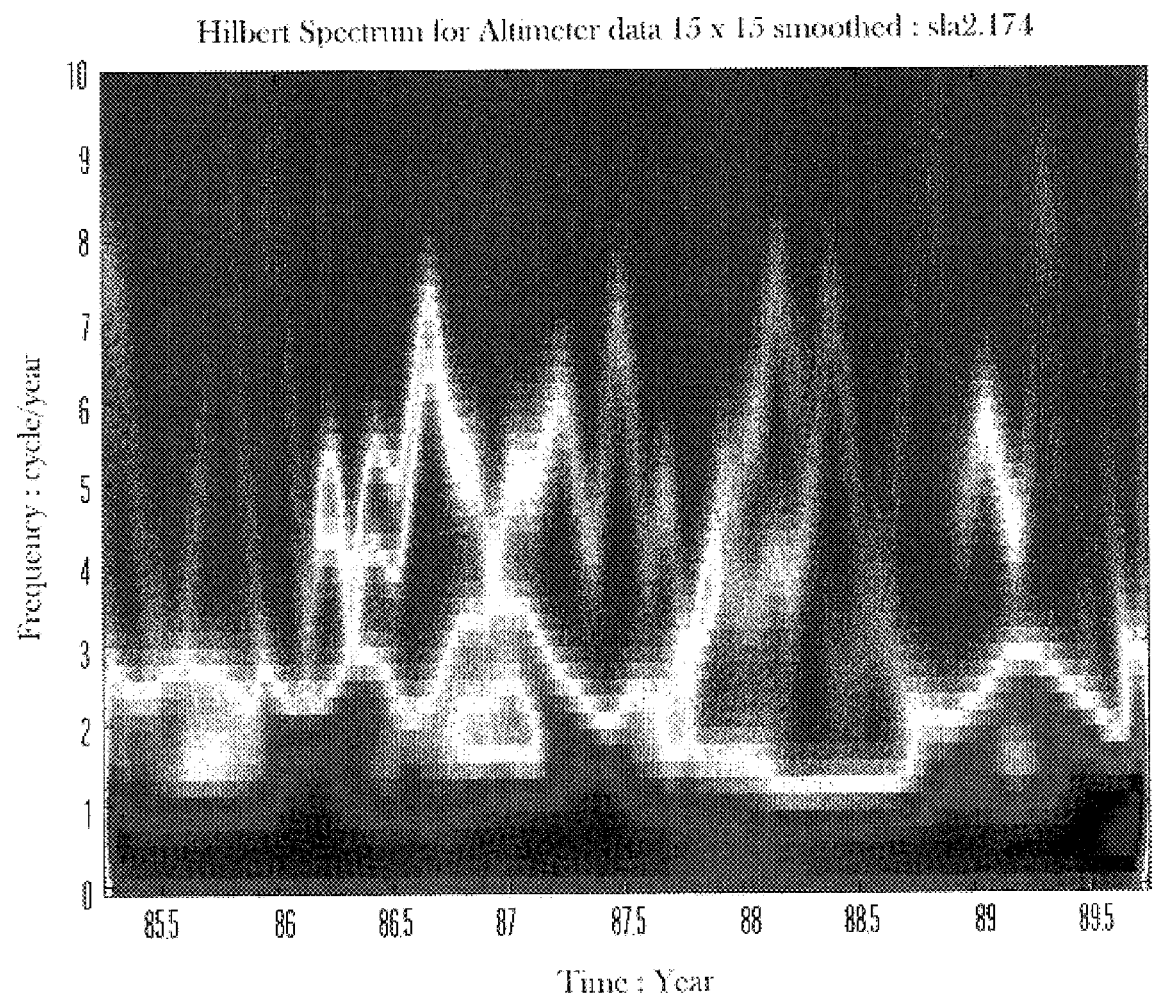
FIG. 19(h) shows the Hilbert Spectrum generated from the ocean surface elevation signal shown in FIG. 19(a) by the invention.

The computer-implemented EMD method on the same sets of data yields four IMF components and a residual trend as shown in FIGS. 19(c)–(g). The corresponding Hilbert spectrum is given in FIG. 19(h). The sharpness of the frequency-time resolution in the Hilbert Spectrum is obvious. The most important properties of the wave are the strong intra-wave frequency modulations. Each wave group will have a frequency change over 1.2 to 9.6-cycle per year within a period of 50 to 200 days. When we started the investigation of data using Hilbert spectral analysis, this was the first time we encountered the strong intra-wave frequency modulation. The curious frequency variations resulted in the re-examination of the classical nonlinear systems, which eventually clarified the role of intra-wave frequency modulations.(See Huang et al., 1998, The Empirical Mode Decomposition and The Hilbert Spectrum for Nonlinear and Nonstationary Time Series Analysis, Proc. R. Soc. Lond. A 454, 903–995, Great Britain.

In the present example, one can argue that, with the ocean depth as a small fraction of the horizontal extent, the low frequency geophysical wave motions are in shallow water, then the wave motions must be governed by nonlinear equations. Although frequency modulation phenomena are known to exist in Wavelet Analysis, the strength and the clearness of the modulations as shown here are seldom seen in other natural phenomena by other time-frequency distribution methods.

The dynamics of the equatorial Kelvin waves has been discussed extensively by Zheng et al (1995). They concluded that steady wind cannot excite sustained Kelvin waves, but the variable wind, especially the westerly wind burst, can cause resonant interactions of the excited Kelvin waves with an intrinsic frequency at $(1.0\pm0.2)\times10^{-2}$ cpd, or 0.22 to 0.34 cycle per year. A prevailing band of energy can be easily seen in FIG. 19(h). At around 400 days after the starting date of the data, a combination of strong low frequency (less than 0.5 cpy) and high frequency (4 to 5 cycles per year) events occurred, which coincides with the onset of the 1986–1987 El Niño. Although the Hilbert spectrum show some energy distribution anomaly, more data is needed to deduce the characteristics of such special events as El Niño.

Wind Signals

Finally, let us return to wind data collected in a laboratory to further illustrate applications of the computer-implemented Sifting Process and Hilbert spectral analysis procedures. In the smoothed form, the Hilbert Spectrum looks similar to the Wavelet analysis result, yet they are still different. Two prominent differences stand out: the first one is the absence of the higher harmonics in the Hilbert Spectrum compared with the Wavelet result. The second one is the appearance of frequency modulated ridges of energy in the Hilbert Spectrum. Both characteristics of the Hilbert Spectrum are new and significant.

In the Hilbert spectrum, we can see the increase in energy density with time, especially after 10 sec following the initiation of the data. Most of the new energy is in the 2 to 5 Hz range with strong continuous frequency modulation rather than the richness of high harmonic components in the Wavelet analysis. As the frequency modulation is the signature of nonlinear mechanisms, the Hilbert spectrum clearly shows the nonlinear properties of the turbulent flows.

Figure 20A:
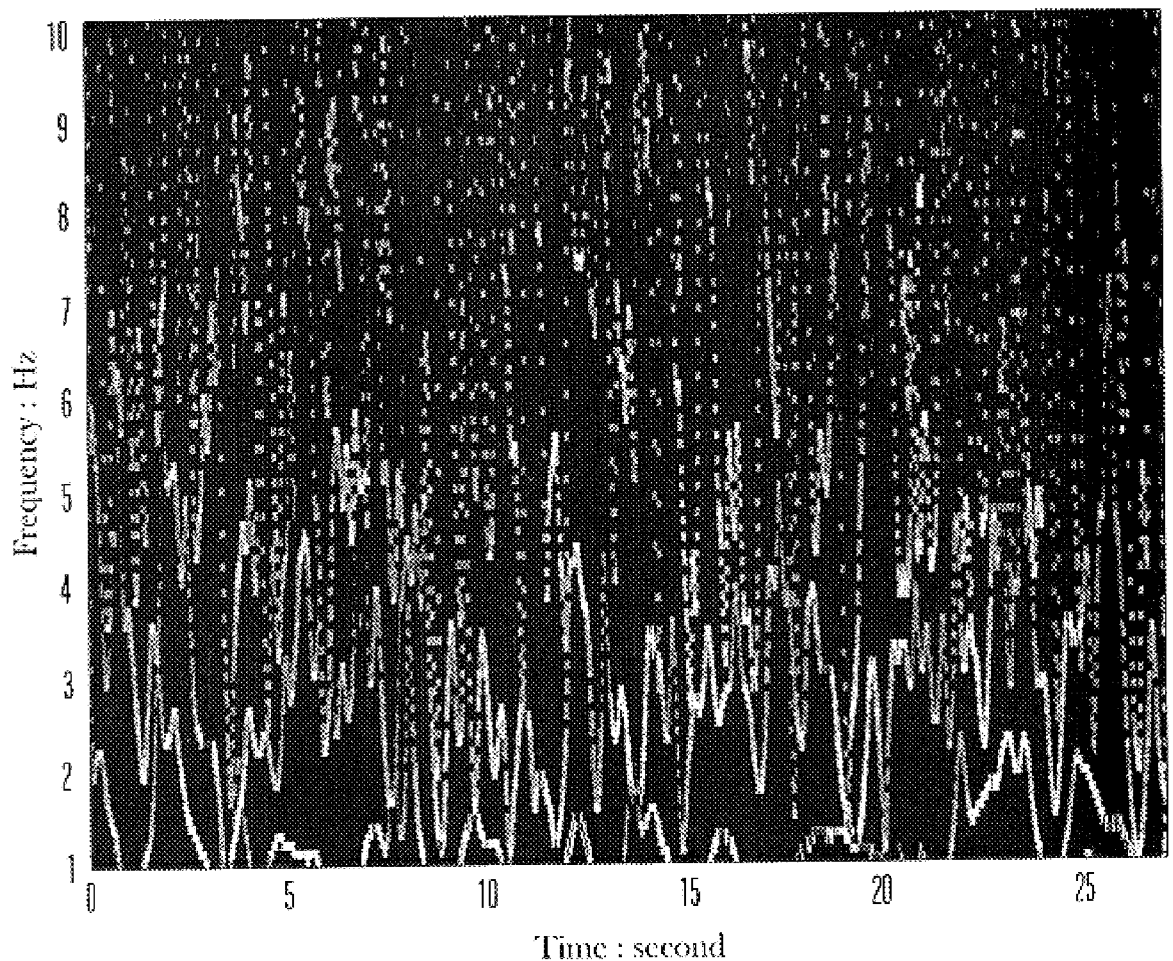
FIG. 20(a) is a special Hilbert Spectrum with only the energy containing IMFs (c2 to c6) generated from a wind speed signal.

From the IMF components, we can see that $c_2$ through $c_6$ are of the same magnitude. Collectively, they represent the bulk of the turbulent energy. All these components are highly intermittent, as indicated by the stationarity index study. Even after averaging, the DSS still indicates strong peaks at 7 and 17 Hz, which correspond to the first two peaks of the marginal spectrum in FIG. 7.4. These frequency ranges are represented by $c_2$ and $c_6$ components. In order to study the energy in this frequency range in detail, a special Hilbert spectrum for $c_2$ to $c_6$ components is constructed as in FIG. 20(a). From this special Hilbert spectrum, no overall change is detected, but the intermittency is apparent. According to Liu, S. D. and S. K. Liu, 1994, "Solitary Wave and Turbulence", Shanghai Scientific and Technological Education Publishing House, Shanghai pg 127, nonlinearity and intermittency are common properties of turbulent flows.

Figure 20B:
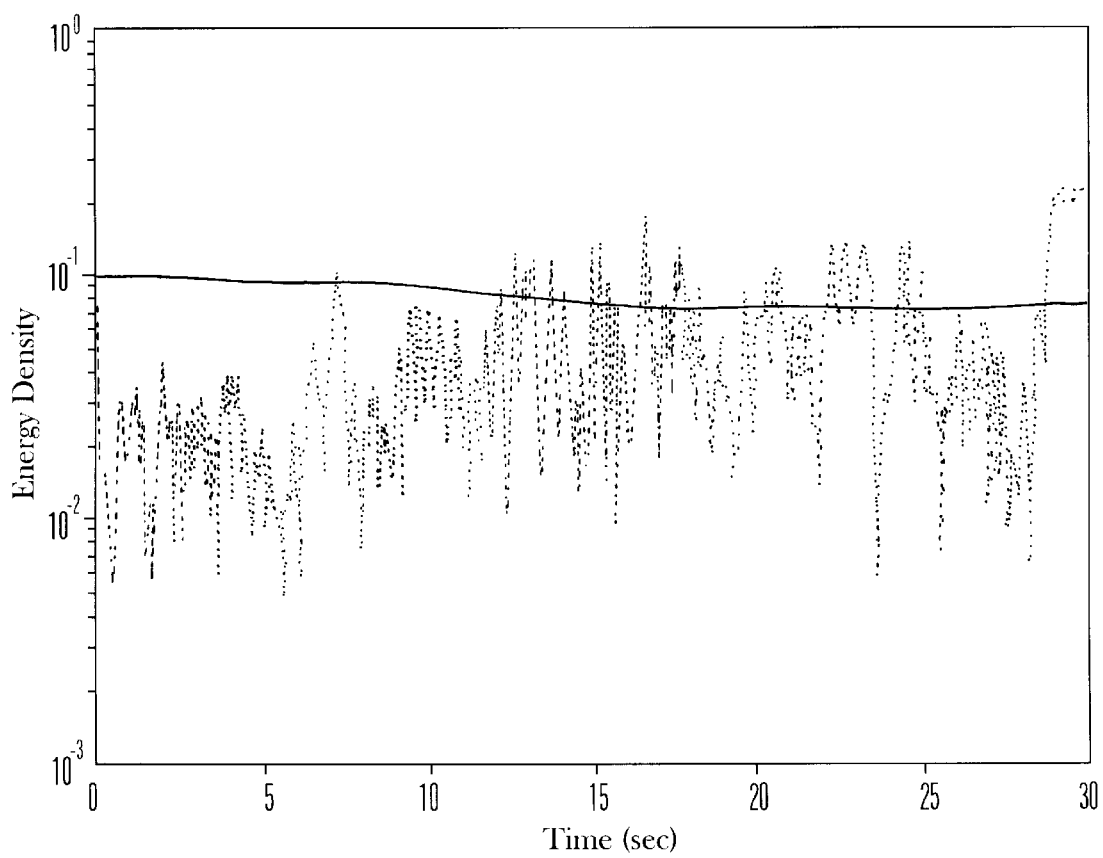
FIG. 20(b) shows the instantaneous energy density of the fluctuating components of the wind speed signal (dotted line) and the overall energy density with the trend (solid line) which are generated by the invention.
Figure 21:
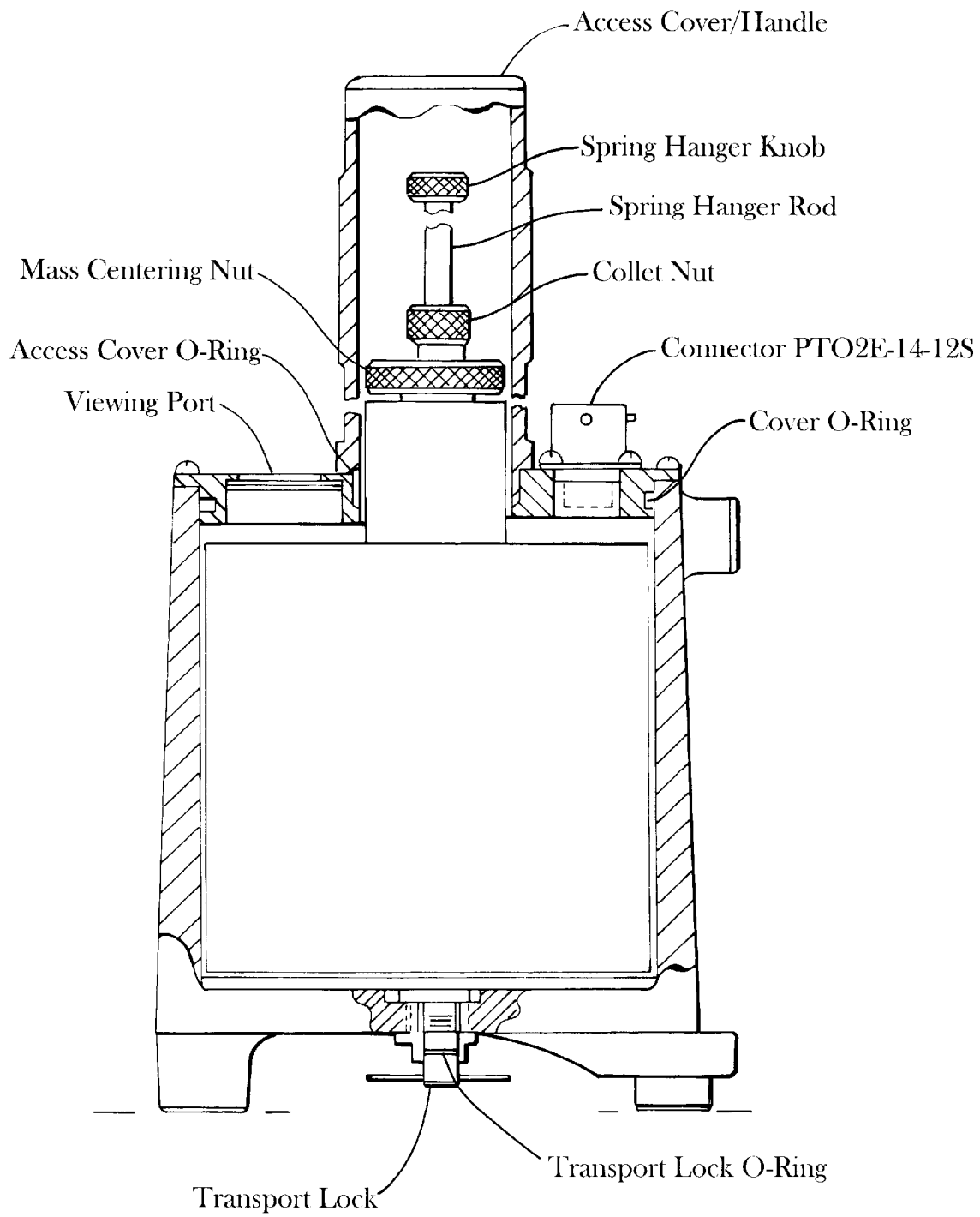
FIG. 21 shows a typical seismometer detecting an earthquake and generating an earthquake signal representative thereof.
Figure 22:
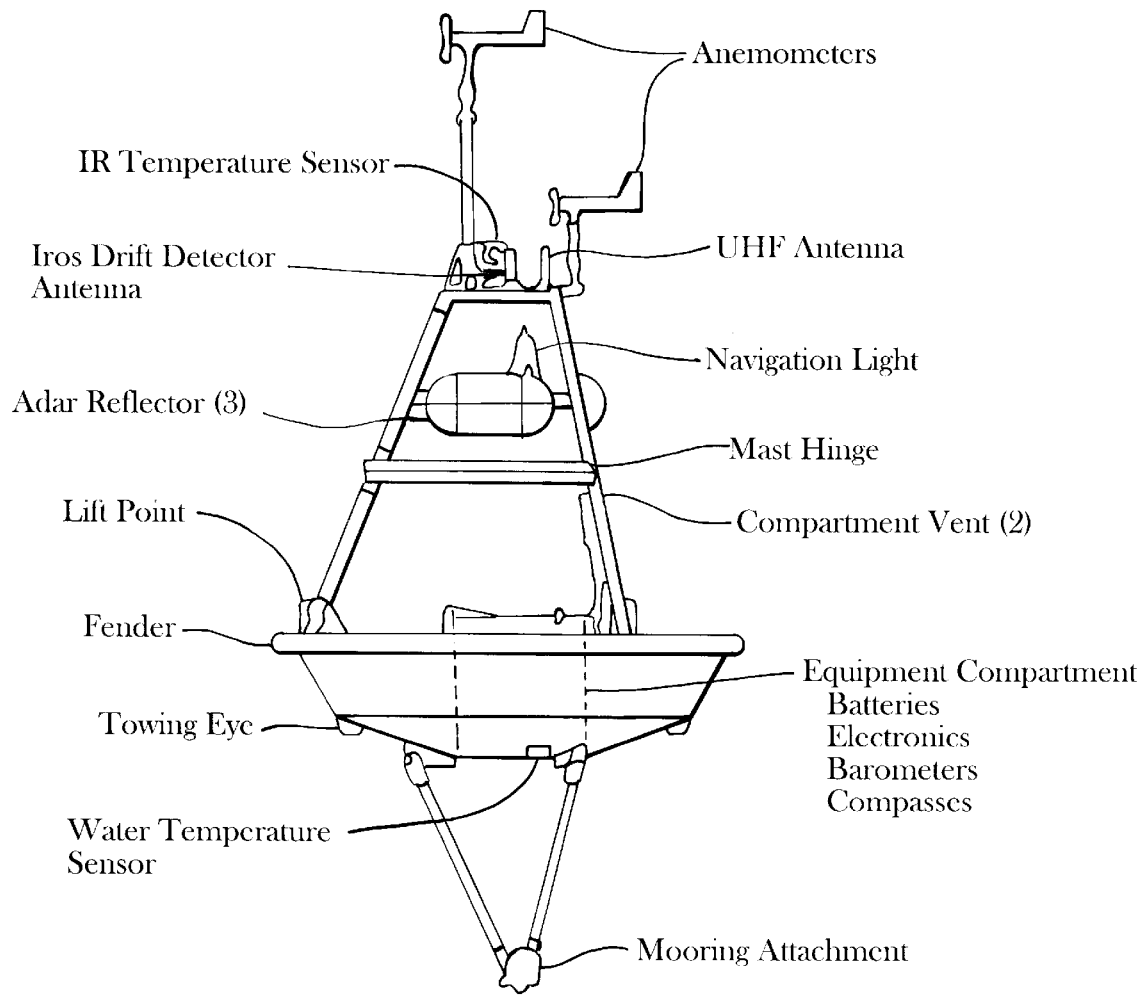
FIG. 22 shows an ocean wave sensor in a field station for detecting an ocean wave and generating an ocean wave signal indicative thereof.
Figure 23:
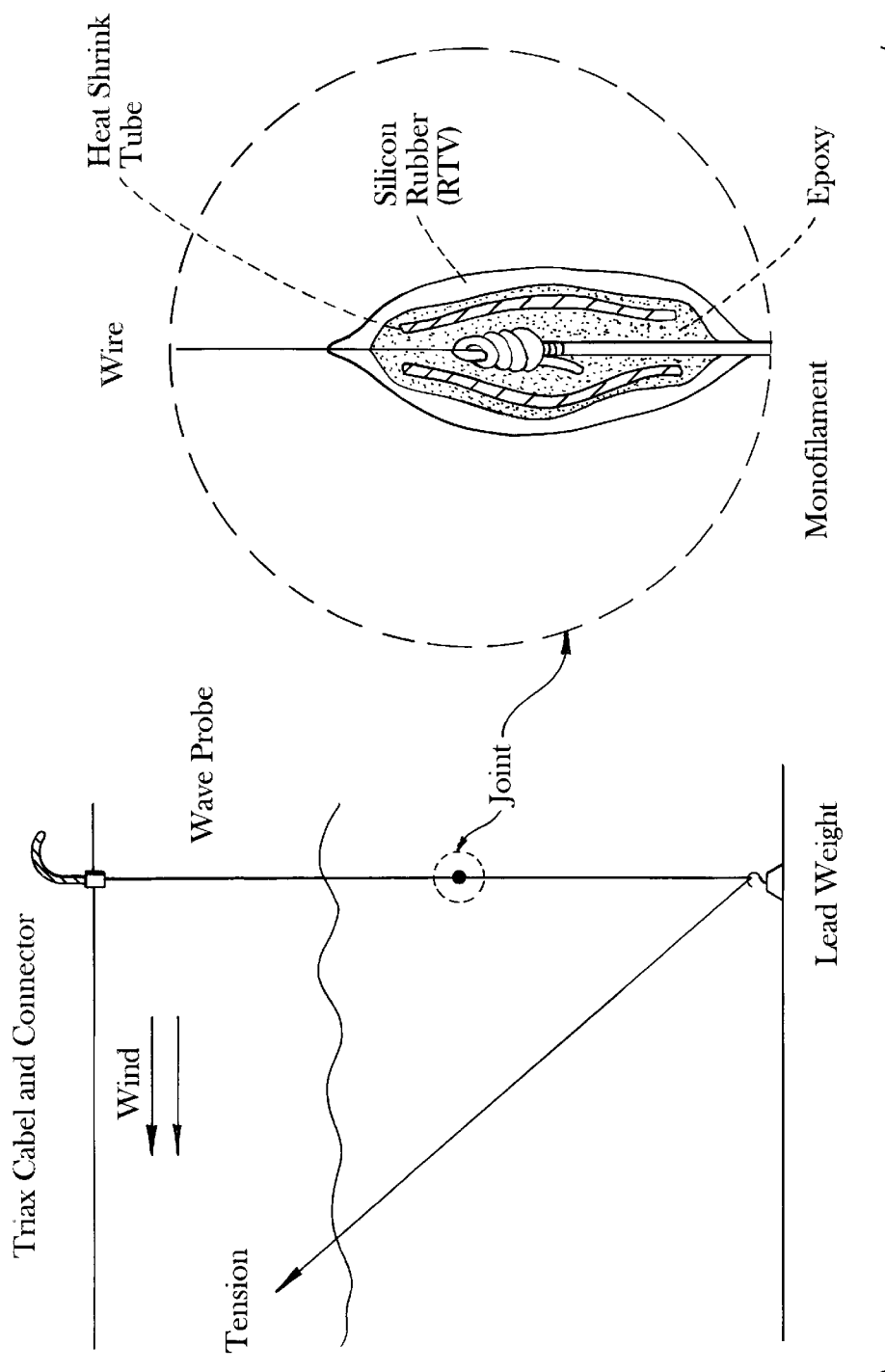
FIG. 23 shows a wave sensor detecting mechanically generated waves and generating a wave signal indicative thereof.
Figure 24:
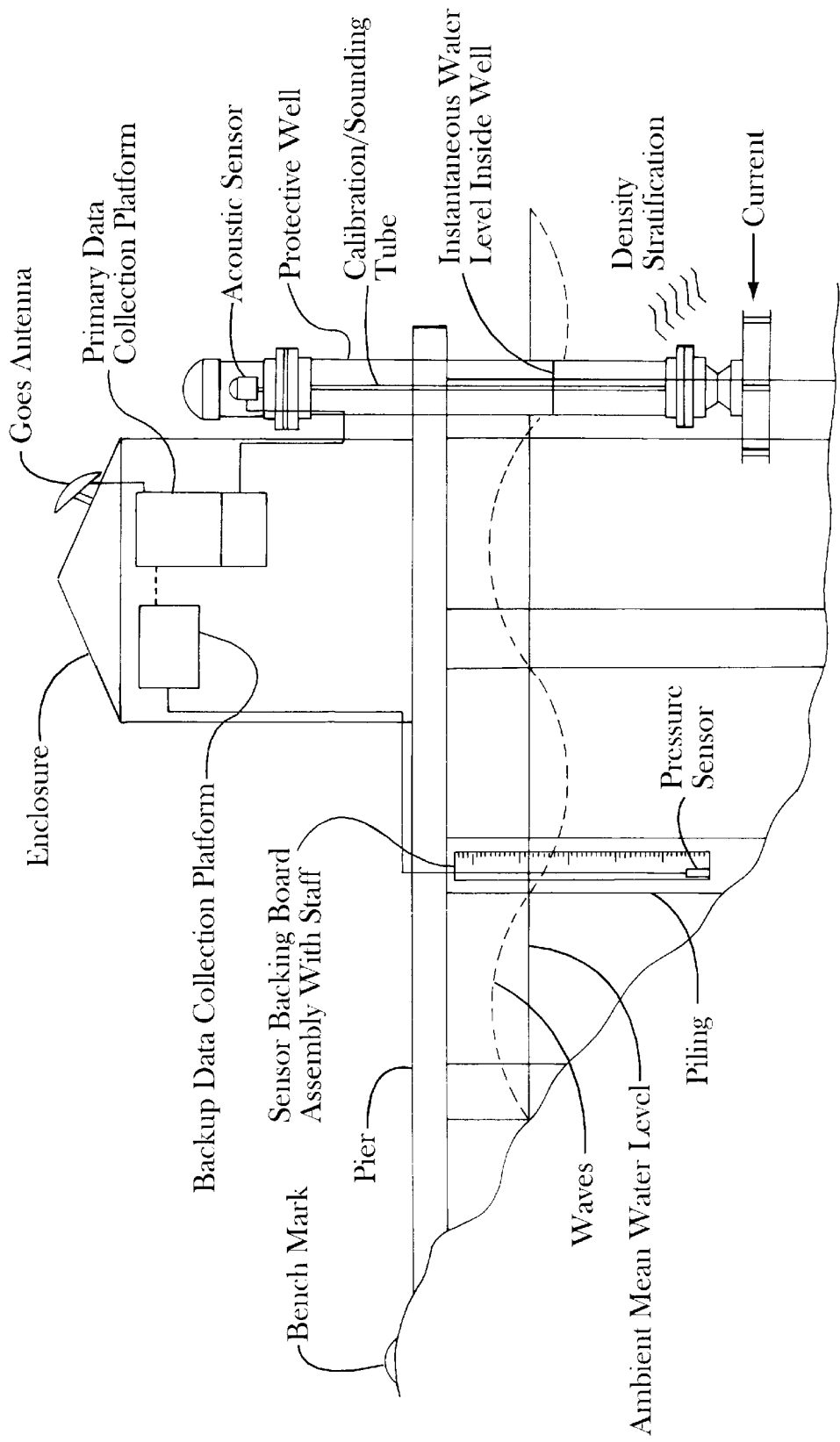
FIG. 24 shows a tidal gauge detecting tidal fluctuations and tsunamis and generating a combined tidal signal and tsunami signal indicative thereof.
Figure 25:
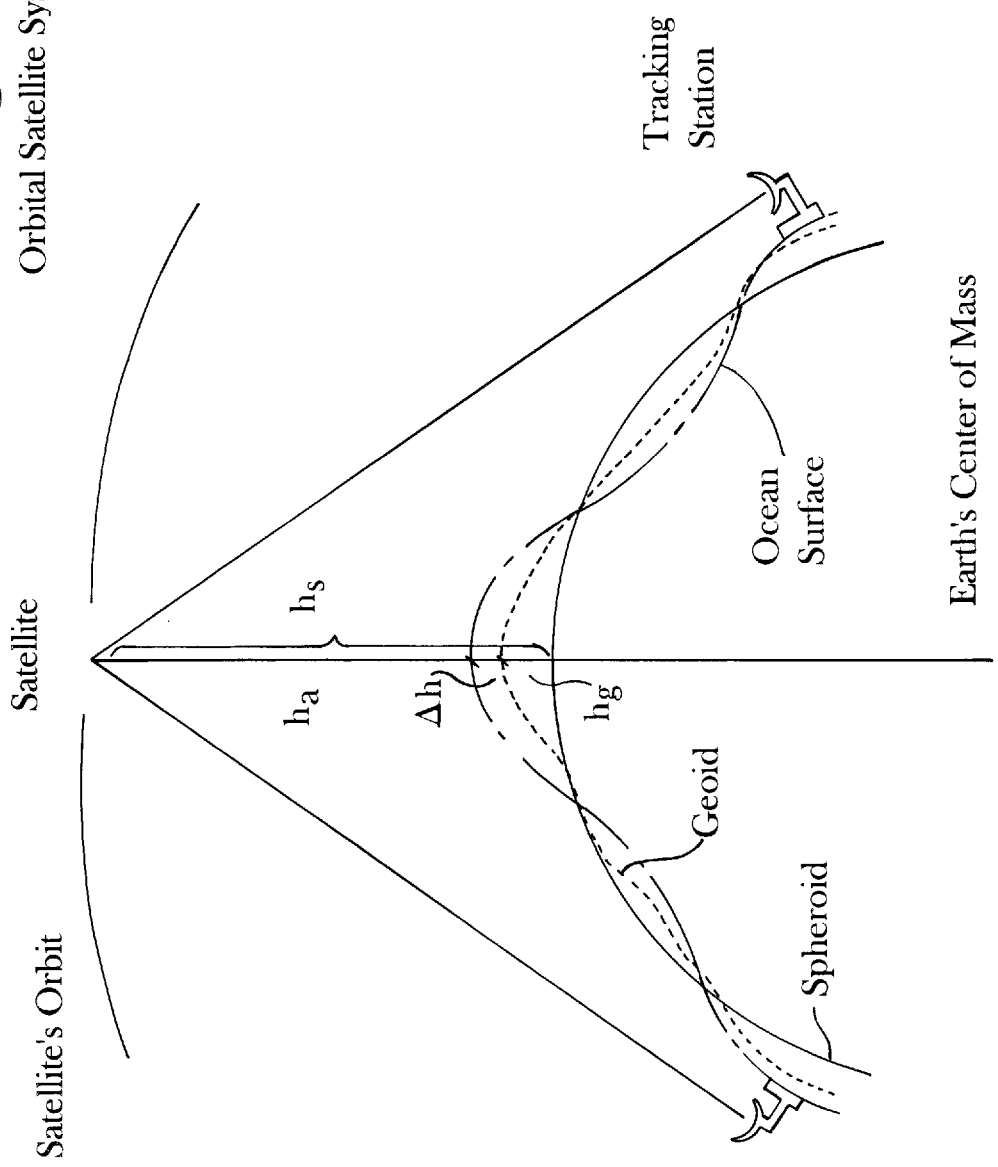
FIG. 25 shows an orbital satellite equipped with an altimeter detecting ocean surface elevation and generating an ocean surface elevation signal indicative thereof.

Next, examine the instantaneous energy density as shown in FIG. 20(b). As expected, the fluctuating components of the wind contain relatively low energy compared with the mean wind, or the trend, as shown by the dotted line. If the energy of the trend is added to the fluctuation, the overall energy is quite leveled, but the density is too high to be shown with the fluctuating components. In FIG. 20(b), the overall energy density has been divided by 100 in order to plot the two curves together for comparison. Because the total energy is dominated by the mean wind, it is preferably omitted when constructing the Hilbert spectrum. It can easily overwhelm all the other components; therefore, it should not be included unless specially justified.

Construction of the special Hilbert spectrum with selected IMF components is an equivalent of band pass filtering through EMD, yet it is different from the Fourier band pass filtering, for there is no stationarity requirement as in the Fourier analysis.

ALTERNATIVE EMBODIMENTS

As described above, the invention constructs upper and lower envelopes 20, 30 with a cubic spline in steps 210 and 230, respectively. This cubic spline fitting, however, has both overshoot and undershoot problems. These problems can be alleviated by using more sophisticated spline methods, such as the taut spline in which the tension of the spline curve can be adjusted.

Another alternative is higher-order spline fitting. Although such higher-order spline fitting may be more accurate, it will, however, introduce more inflection points or extrema, and consume more computing time. Therefore, it is not recommended as a standard operation. Only in special cases, it may be tried.

As the spline fitting procedure is time consuming, more efficient methods can be devised by using simple mean values of successive extrema instead of computing the envelope-mean. In this way, only one spline fitting is required rather than two. Although this alternative is easier and faster to implement, the shortcomings are more severe amplitude averaging effects when the neighboring extrema are of different magnitudes. The successive-mean method will have a stronger forcing to reach uniform amplitudes, in which the true physics associated with amplitude will be destroyed. Therefore, the successive-mean method should only be applied where the amplitudes of the physical signal components are constants.

Either the envelope mean or the successive mean method, when applied with the requirement of absolute symmetry, will produce the absurd result of uniform amplitude IMF's. Therefore, the criteria in the Sifting Process should be chosen judiciously. One should avoid too stringent a criterion that we would get uniform amplitude IMF's. On the other hand, one should also avoid too loose a criterion that would produce components deviating too much from IMF's.

It is well known that the most serious problem of spline fitting is at the ends, where cubic splines can have wide swings if left unattended. As an alternative, the invention may utilize a method of adding characteristic waves at the ends of the data span. This confines the large swings successfully.

The method of adding characteristic waves is not conventional. In contrast, the conventional window that is often applied to Fourier transform data results in loss of useful data. To avoid this data loss and to confine swings at the ends of the data span, the invention extends the data beyond the actual data span by adding three additional characteristic waves at each end of the data span.

The characteristic waves are defined by the last wave within the data span at the end of the data span. In other words, a characteristic wave is added to each end of the data span having an amplitude and period matching the last wave within the data span. This characteristic wave is a sinusoidal waveform that is extended three sinusoidal wave periods beyond the data span at each end. This process is repeated at the other end of the data span. In this way, spline fitting at the end of the data span, which can otherwise have a wide swing, is confined. In other words, by adding the extra characteristic waves at the ends beyond the data span, the spline curve will be tied down so that it will not have wild or excessive swings that would otherwise corrupt the data processing and analysis that utilizes these cubic splines.

Other than the spline fitting, the Hilbert transform may also have end effects. Because the first and the last points of the data are usually of different values, the Fourier transform will introduce additional components to bridge over the difference resulting in the well-known Gibbs phenomena. To eliminate it in the Fourier transform, various windows have been adopted (see, for example, Brigham, 1974, *"The fast Fourier Transform"*, Prentice-Hall, Englewood Cliffs, N.J.).

Instead of a window which will eliminate some useful data at the end, the invention again adds two characteristic waves at either end. These waves all start from zero at the beginning, and end at zero at the end. Thus, the annoying Gibbs phenomena are greatly reduced.

Furthermore, one must be careful when analyzing weak signals embedded in a stronger signal. Both the envelope-mean and successive-mean depend on the existence of extrema. If a weak signal is imbedded in a strong signal, the extrema might not even be visible to the eye, but the Sifting Process can still pick them up. If the weak signals are phase locked with, and occur only at the maximum slope regions of the strong signals, then the method will have difficulties in picking up the extrema. In this case, the weak signals will appear as intra-wave frequency modulations.

To process a weak signal embedded in a strong signal, it is necessary to separate them. This can be done by differentiating the signal once before processing. Because differentiation is a linear operator, the operation itself will not create nor annihilate scales. Therefore, such an operation could be used without adversely affecting the results. Final results then can be obtained by integration of the components.

Still further, the Hilbert transform needs over-sampled data to define the instantaneous frequency precisely. In Fourier analysis, the Nyquist frequency is defined by two points per wave, but the frequency is defined for a wave covering the whole data span. In the invention, the instantaneous frequency is defined through a differentiation process, and thus more data points will help defining the frequency more accurately. Based on the inventor's experience, a minimum number of data points to define a frequency is five (or four $\Delta t$'s). The lack of fine time steps can be alleviated through interpolating more points between available data. As a spline interpretation would also not create nor annihilate scales, it can also be used for the interpolation when the data is very jagged from under-sampled data. The smoothed data though have a longer length and are sometimes easier to process. The interpolation may give better frequency definition.

Particular Limitations of The Invention

The dependence on the existence of scale for mode definition has one limitation: the decomposition method cannot separate signals when their frequencies are too close. In this case, there would not be any characteristic scale: therefore, physically they are identical. This may be the most severe limitation of the invention, but even here, the invented method can still work as well as the Fourier Analysis.

Particular Advantages of The Invention

The strength of the EMD method should be reiterated. EMD is built on the idea of identifying the various scales in the data which are quantities of great physical significance. Therefore, in the Sifting Process, orthogonality is not a consideration, but scales are. Since orthogonal decomposition is a characteristic for linear systems, violating this restriction is not a shortcoming but a breakthrough. Therefore, the decomposed IMF's may or may not be orthogonal. As such, this method can be applied to nonlinear data. Though the IMF's in most cases are practically orthogonal, it is a coincidence rather than a requirement of the EMD.

Another advantage of the method is the effective use of all the data representing the physical phenomenon. In the Sifting Process, the longest scale is defined by the full length of the data. As a result, EMD can define many long period oscillations. As is well known, the Hilbert transform without sifting tends to identify the highest frequency (Boashash, 1992, "Estimating and Interpreting the Instantaneous Frequency of a Signal, Part I: Fundamentals", Proc. IEEE, 80, 520–538.), the extraction of the long period components is indeed a new feature of the EMD.

Finally, though the EMD method will give IMF components, the individual component does not guarantee well-defined physical meaning. This is true for all decompositions, especially for the methods with a priori basis. In most cases, however, the IMF's do carry physical significance. Great caution should be exercised in making such attempts. The rule for interpreting the physical significance of the IMF's is that the scales should be clearly separated. Together with the Hilbert spectrum, the totality of the presentation should give a much more detailed representation of the physical processes than conventional methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A computer implemented method of analyzing a physical signal representative of a physical phenomenon, comprising the computer implemented steps of:

inputting the physical signal representative of the physical phenomenon;

recursively sifting the physical signal via Empirical Mode Decomposition to extract an intrinsic mode function indicative of an intrinsic oscillatory mode in the physical phenomenon; and displaying the intrinsic mode function.

2. The computer implemented method of analyzing a physical signal representative of a physical phenomenon according to claim 1, further comprising the step of:

transforming the intrinsic mode function with a Hilbert transform.

3. The computer implemented method of analyzing a physical signal representative of a physical phenomenon according to claim 1, said recursive sifting step including the substeps of:

identifying local maximum values in the physical signal, constructing an upper envelope of the physical signal from the identified local maximum values, identifying local minimum values in the physical signal, constructing a lower envelope of the physical signal from the identified local minimum values, determining an envelope mean from the upper and lower envelopes, generating a component signal by subtracting the envelope mean from the physical signal, treating the component signal as the physical signal, and recursively performing said sifting step until successive component signals are substantially equal.

4. The computer implemented method of analyzing a physical signal representative of a physical phenomenon according to claim 3, said recursively performing substep including the substep of testing the component signal against a definition of intrinsic mode functions, said sifting step being recursively performed until three successive component signals satisfy the definition of intrinsic mode functions.

5. The computer implemented method of analyzing a physical phenomenon according to claim 3, said recursively performing substep including the substep of computing a standard deviation between successive component functions and comparing the standard deviation to a predetermined threshold value, said sifting step being recursively performed until the standard deviation falls below the predetermined threshold value.

6. The computer implemented method of analyzing a physical signal representative of a physical phenomenon according to claim 3, said recursive sifting step further including the substeps of:

testing the local maximum values for an intermittency in the physical signal;

said constructing an upper envelope step treating local maximum values failing said testing step as local minimum values to construct the upper envelope of the physical signal;

said testing step testing the local minimum values for an intermittency in the physical signal;

said constructing a lower envelope step treating local minimum values failing said testing step as local maximum values to construct the lower envelope of the physical signal.

7. The computer implemented method of analyzing a physical signal representative of a physical phenomenon according to claim 1, further comprising the steps of:

generating a residual signal by subtracting the intrinsic mode function from the physical signal;

treating the residual signal as the physical signal during a next iteration of said recursive sifting step;

iterating said recursive sifting step to generate a second intrinsic mode function indicative of a second intrinsic oscillatory mode in the physical phenomenon; and displaying the second intrinsic mode function.

8. The computer implemented method of analyzing a physical signal representative of a physical phenomenon according to claim 7, further comprising the steps of:

continuing to perform said iterating step to generate an n-th intrinsic mode function indicative of an n-th intrinsic oscillatory mode in the physical phenomenon until the residual signal has less than two extrema, and displaying the intrinsic mode functions.

9. The computer implemented method of analyzing a physical signal representative of a physical phenomenon according to claim 7, further comprising the step of:

continuing to perform said iterating step to generate an n-th intrinsic mode function indicative of an n-th intrinsic oscillatory mode in the physical phenomenon until the residual signal is monotonically increasing or decreasing, and displaying the intrinsic mode functions.

10. The computer implemented method of analyzing a physical signal representative of a physical phenomenon according to claim 8, further comprising the step of:

applying a Hilbert transform to the intrinsic mode function to generate a Hilbert spectrum, and displaying the Hilbert spectrum.

11. The computer implemented method of analyzing a physical signal representative of a physical phenomenon according to claim 10, further comprising the step of:

calculating a marginal spectrum from the Hilbert spectrum, and displaying the marginal spectrum.

12. The computer implemented method of analyzing a physical signal representative of a physical phenomenon according to claim 10, further comprising the step of:
   calculating an instantaneous frequency from the transformed intrinsic mode functions, and
   displaying the instantaneous frequency.

13. The computer implemented method of analyzing a physical signal representative of a physical phenomenon according to claim 10, further comprising the step of:
   calculating an instantaneous energy density from the transformed intrinsic mode functions, and
   displaying the instantaneous energy density.

14. The computer implemented method of analyzing a physical signal representative of a physical phenomenon according to claim 10, further comprising the step of:
   calculating a measure of stationarity from the transformed intrinsic mode functions, and
   displaying the measure of stationarity.

15. The computer implemented method of analyzing a physical signal representative of a physical phenomenon according to claim 1, further comprising the steps of:
   detecting the physical phenomenon with a sensor to generate an analog physical signal, and
   converting the analog physical signal to a digital physical signal representative of the physical phenomenon.

16. The computer implemented method of analyzing a physical signal representative of a physical phenomenon according to claim 1, wherein the physical phenomenon is a geophysical phenomenon.

17. The computer implemented method of analyzing a physical signal representative of a physical phenomenon according to claim 16,
   wherein the geophysical phenomenon is an earthquake, an ocean wave, an ocean altitude or a wind,
   wherein the physical signal is a geophysical signal, and wherein said detecting step detects the geophysical phenomenon with a seismometer to generate a geophysical signal representative of earthquake activity, a tidal gauge to generate a geophysical signal representative of ocean wave elevation and frequency, a satellite altimeter to generate a geophysical signal representative of ocean surface altitude or a pitot tube sensor to generate a geophysical signal representative of wind speed.

18. The computer implemented method of analyzing a physical signal representative of a physical phenomenon according to claim 1, wherein the physical signal is nonlinear.

19. The computer implemented method of analyzing a physical signal representative of a physical phenomenon according to claim 1, wherein the physical signal is nonstationary.

20. The computer implemented method of analyzing a physical signal representative of a physical phenomenon according to claim 1, wherein the physical signal is nonlinear and nonstationary.

21. An apparatus for analyzing a physical signal representative of a physical phenomenon, comprising:
   an input device inputting the physical signal representative of the physical phenomenon;
   a sifter recursively performing a Sifting Process on the physical signal using Empirical Mode Decomposition to extract an intrinsic mode function indicative of an intrinsic oscillatory mode in the physical phenomenon; and
   a display displaying the intrinsic mode function.

22. The apparatus for analyzing a physical signal representative of a physical phenomenon according to claim 21, further comprising:
   a Hilbert transformer transforming the intrinsic mode function with a Hilbert transform.

23. The apparatus for analyzing a physical signal representative of a physical phenomenon according to claim 21, said sifter including:
   a local maximum identifier identifying local maximum values in the physical signal,
   an upper envelope constructor constructing an upper envelope of the physical signal from the identified local maximum values,
   a local minimum identifier identifying local minimum values in the physical signal,
   a lower envelope constructor constructing a lower envelope of the physical signal from the identified local minimum values,
   an envelope mean determiner determining an envelope mean from the upper and lower envelopes,
   a component signal generator generating a component signal by subtracting the envelope mean from the physical signal,
   wherein the component signal is treated as the physical signal during said sifter's next recursive sifting Process, and
   wherein said sifter recursively performs the Sifting Process until successive component signals are substantially equal.

24. The apparatus for analyzing a physical signal representative of a physical phenomenon according to claim 23, further comprising:
   a comparator comparing the component signal against a definition of intrinsic mode functions,
   said sifter recursively performing the Sifting Process until said comparator determines that three successive component signals satisfy the definition of intrinsic mode functions.

25. The apparatus for analyzing a physical phenomenon according to claim 23, further comprising:
   a standard deviation calculator calculating a standard deviation between successive component functions,
   a comparator comparing the standard deviation to a predetermined threshold,
   said sifter recursively performing the Sifting Process until the standard deviation falls below the predetermined threshold value.

26. The apparatus for analyzing a physical signal representative of a physical phenomenon according to claim 23,
   a tester testing the local maximum values for an intermittency in the physical signal;
   said upper envelope constructor constructing an upper envelope step by treating local maximum values failing said tester as local minimum values to construct the upper envelope of the physical signal;
   said tester testing the local minimum values for an intermittency in the physical signal;
   said lower envelope constructor constructing a lower envelope by treating local minimum values failing said tester as local maximum values to construct the lower envelope of the physical signal.

27. The apparatus for analyzing physical data from a physical phenomenon according to claim 21, further comprising:

a residual signal generator generating a residual signal by subtracting the intrinsic mode function from the physical signal;

wherein the residual signal is treated as the physical signal during a next iteration of the Sifting Process performed by said sifter;

an iterator iterating the Sifting Process performed by said sifter to generate a second intrinsic mode function indicative of a second intrinsic oscillatory mode in the physical phenomenon; and a display displaying the second intrinsic mode function.

28. The apparatus for analyzing physical data from a physical phenomenon according to claim 27, wherein said sifter continues to perform said Sifting Process to generate an n-th intrinsic mode function indicative of an n-th intrinsic oscillatory mode in the physical phenomenon until the residual signal has less than two local extrema, and wherein said display displays the intrinsic mode functions.

29. The apparatus for analyzing physical data from a physical phenomenon according to claim 27, wherein said sifter continues to perform said Sifting Process to generate an n-th intrinsic mode function indicative of an n-th intrinsic oscillatory mode in the physical phenomenon until the residual signal is monotonically increasing or decreasing, and wherein said display displays the intrinsic mode functions.

30. The apparatus for analyzing physical data from a physical phenomenon according to claim 28, further comprising:

a Hilbert Spectrum generator applying a Hilbert transform to the intrinsic mode function to generate a Hilbert spectrum, wherein said display displays the Hilbert spectrum.

31. The apparatus for analyzing physical data from a physical phenomenon according to claim 30, further comprising:

a marginal spectrum calculator calculating a marginal spectrum from the Hilbert spectrum, wherein said display displays the marginal spectrum.

32. The apparatus for analyzing physical data from a physical phenomenon according to claim 30, further comprising:

an instantaneous frequency calculator calculating an instantaneous frequency from transformed intrinsic mode functions, wherein said display displays the instantaneous frequency.

33. The apparatus for analyzing physical data from a physical phenomenon according to claim 30, further comprising:

an instantaneous energy density calculator calculating an instantaneous energy density from the transformed intrinsic mode functions, wherein said display displays the instantaneous energy density.

34. The apparatus for analyzing physical data from a physical phenomenon according to claim 30, further comprising:

a stationarity calculator calculating a measure of stationarity from the transformed intrinsic mode functions, wherein said display displays the measure of stationarity.

35. The apparatus for analyzing physical data from a physical phenomenon according to claim 21, further comprising:

a sensor detecting the physical phenomenon to generate an analog physical signal, and an analog to digital convertor converting the analog physical signal to a digital physical signal representative of the physical phenomenon.

36. The apparatus for analyzing physical data from a physical phenomenon according to claim 21, wherein the physical phenomenon is a geophysical phenomenon.

37. The apparatus for analyzing physical data from a physical phenomenon according to claim 36, wherein the geophysical phenomenon is an earthquake, an ocean wave, an ocean altitude or a wind and wherein the physical signal is a geophysical signal reproduction of the geophysical phenomenon, the apparatus further comprising:

a seismometer generating a geophysical signal representative of earthquake activity, a tidal gauge generating a geophysical signal representative of ocean wave elevation and frequency, a satellite altimeter generating a geophysical signal representative of ocean surface altitude, or a pitot tube sensor generating a geophysical signal representative of wind speed.

38. The apparatus for analyzing physical data from a physical phenomenon according to claim 21, wherein the physical signal is nonlinear.

39. The apparatus for analyzing physical data from a physical phenomenon according to claim 21, wherein the physical signal is nonstationary.

40. The apparatus for analyzing physical data from a physical phenomenon according to claim 21, wherein the physical signal is nonlinear and nonstationary.

41. An article of manufacture, comprising:

a computer-usable medium including computer-readable program code means, embodied therein, for causing a computer to analyze a physical signal representative of a physical phenomenon, the computer-readable program code means comprising:

computer-readable program code means for inputting the physical signal representative of the physical phenomenon;

computer-readable program code means for recursively sifting the physical signal via Empirical Mode Decomposition to extract an intrinsic mode function indicative of an intrinsic oscillatory mode in the physical phenomenon; and computer-readable program code means for displaying the intrinsic mode function on a display.

42. The article of manufacture according to claim 41, the computer-readable program code means further comprising:

computer-readable program code means for transforming the intrinsic mode function with a Hilbert transform.

43. The article of manufacture according to claim 41, said recursive sifting means including:

computer-readable program code means for identifying local maximum values in the physical signal, computer-readable program code means for constructing an upper envelope of the physical signal from the identified local maximum values, computer-readable program code means for identifying local minimum values in the physical signal, computer-readable program code means for constructing a lower envelope of the physical signal from the identified local minimum values, computer-readable program code means for determining an envelope mean from the upper and lower envelopes, computer-readable program code means for generating a component signal by subtracting the envelope mean from the physical signal, computer-readable program code means for treating the component signal as the physical signal, and computer-readable program code means for recursively operating said sifting means until successive component signals are substantially equal.

44. The article of manufacture according to claim 43, said recursively operating means including:

computer-readable program code means for comparing the component signal to determine whether the component signal satisfies a definition of Intrinsic Mode Functions, wherein the operation performed by said sifting means are recursively performed until three successive component signals satisfy the definition of Intrinsic Mode Functions.

45. The article of manufacture according to claim 43, said recursively operating means including:

computer-readable program code means for computing a standard deviation between successive component functions and comparing the standard deviation to a predetermined threshold value, wherein the operations performed by said sifting means are recursively performed until the standard deviation falls below the predetermined threshold value.

46. The article of manufacture according to claim 43, said recursive sifting means further including:

computer-readable program code means for testing the local maximum values for an intermittency in the physical signal;

said constructing an upper envelope means treating local maximum values failing said testing step as local minimum values to construct the upper envelope of the physical signal;

said testing means testing the local minimum values for an intermittency in the physical signal;

said constructing a lower envelope means treating local minimum values failing said testing step as local maximum values to construct the lower envelope of the physical signal.

47. The article of manufacture according to claim 41, the computer-readable program code means further comprising:

computer-readable program code means for generating a residual signal by subtracting the intrinsic mode function from the physical signal;

computer-readable program code means for treating the residual signal as the physical signal during a next iteration of the operations performed by said recursive sifting means;

computer-readable program code means for iterating the operations performed by said recursive sifting means to generate a second intrinsic mode function indicative of a second intrinsic oscillatory mode in the physical phenomenon; and computer-readable program code means for displaying the second intrinsic mode function.

48. The article of manufacture according to claim 47, the computer-readable program code means further comprising:

computer-readable program code means for continuing the operations performed by said iterating means to generate an n-th intrinsic mode function indicative of an n-th intrinsic oscillatory mode in the physical phenomenon until the residual signal contains less than two local extrema, and computer-readable program code means for displaying the intrinsic mode functions.

49. The article of manufacture according to claim 47, the computer-readable program code means further comprising:

computer-readable program code means for continuing the operations performed by said iterating means to generate an n-th intrinsic mode function indicative of an n-th intrinsic oscillatory mode in the physical phenomenon until the residual signal is monotonically increasing or decreasing, and computer-readable program code means for displaying the intrinsic mode functions.

50. The article of manufacture according to claim 48, the computer-readable program code means further comprising:

computer-readable program code means for applying a Hilbert transform to the intrinsic mode function to generate a Hilbert spectrum, and computer-readable program code means for displaying the Hilbert spectrum.

51. The article of manufacture according to claim 50, the computer-readable program code means further comprising:

computer-readable program code means for calculating a marginal spectrum from the Hilbert spectrum, and computer-readable program code means for displaying the marginal spectrum.

52. The article of manufacture according to claim 50, the computer-readable program code means further comprising:

computer-readable program code means for calculating an instantaneous frequency from the transformed intrinsic mode functions, and computer-readable program code means for displaying the instantaneous frequency.

53. The article of manufacture according to claim 50, the computer-readable program code means further comprising:

computer-readable program code means for calculating an instantaneous energy density from the transformed intrinsic mode functions, and computer-readable program code means for displaying the instantaneous energy density.

54. The article of manufacture according to claim 50, the computer-readable program code means further comprising:

computer-readable program code means for calculating a measure of stationarity from the transformed intrinsic mode functions, and computer-readable program code means for displaying the measure of stationarity.

55. The article of manufacture according to claim 41, wherein the physical signal is a geophysical signal representative of a geophysical phenomenon.

56. The article of manufacture according to claim 55 wherein the geophysical phenomenon is an earthquake, an ocean wave, an ocean altitude, or a wind.

57. The article of manufacture according to claim 41, wherein the physical data from physical signal is nonliner.

58. The article of manufacture according to claim 41, wherein the physical data from physical signal is nonstationary.

59. The article of manufacture according to claim 41, wherein the physical signal is nonlinear and nonstationary.

* * * * *